US010237039B2

(12) United States Patent
Gauvreau et al.

(10) Patent No.: US 10,237,039 B2
(45) Date of Patent: *Mar. 19, 2019

(54) ADAPTIVE CONTROL CHANNEL

(71) Applicant: InterDigital Patent Holdings, Inc., Wilmington, DE (US)

(72) Inventors: Jean-Louis Gauvreau, La Prairie (CA); Martino M. Freda, Laval (CA); Chunxuan Ye, San Diego, CA (US); Rocco Di Girolamo, Laval (CA); Scott Laughlin, Montreal (CA); Marian Rudolf, Montreal (CA); Athmane Touag, Chomedey Laval (CA); Kamraan Nasim Syed, Ottawa (CA)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 14/718,057

(22) Filed: May 20, 2015

(65) Prior Publication Data
US 2015/0256314 A1  Sep. 10, 2015

Related U.S. Application Data

(63) Continuation of application No. 13/739,922, filed on Jan. 11, 2013, now Pat. No. 9,072,107.
(Continued)

(51) Int. Cl.
*H04W 4/00* (2018.01)
*H04L 5/00* (2006.01)
(Continued)

(52) U.S. Cl.
CPC .......... *H04L 5/0053* (2013.01); *H04L 1/0002* (2013.01); *H04L 5/0062* (2013.01);
(Continued)

(58) Field of Classification Search
CPC ... H04L 5/0053; H04L 1/0002; H04L 5/0062; H04W 72/082; H04W 1/1867; H04W 16/14; H04W 16/2806
See application file for complete search history.

(56) References Cited

U.S. PATENT DOCUMENTS

| 5,610,950 A | 3/1997 | Duch |
| 6,603,826 B1 | 8/2003 | Cupo et al. |

(Continued)

FOREIGN PATENT DOCUMENTS

| CN | 1790970 A | 6/2006 |
| CN | 101512922 A | 8/2009 |

(Continued)

OTHER PUBLICATIONS

3rd Generation Partnership Project (3GPP), R1-100038, "On Definitions of Carrier Types", Ericsson, ST-Ericsson, 3GPP TSG RAN WG1 Meeting #59bis, Valencia, Spain, Jan. 18-22, 2010, 5 pages.

(Continued)

*Primary Examiner* — Abdelnabi O Musa
(74) *Attorney, Agent, or Firm* — Condo Roccia Koptiw LLP

(57) ABSTRACT

A wireless network may implement a reduced bandwidth for control information transmitted and/or received on the wireless network. The reduced bandwidth may be used to avoid interference that may be detected from an in-band or adjacent channel. The reduced bandwidth may be used for transmission and/or reception of control information on a cellular or Wi-Fi channel. An eNB or an access point (AP) may signal to a wireless transmit/receive unit (WTRU) information associated with the reduced control channel, such as the power and/or the location of the channel in a frequency band. The control channel may be shifted to avoid a change in interference.

27 Claims, 26 Drawing Sheets

Related U.S. Application Data

(60) Provisional application No. 61/585,587, filed on Jan. 11, 2012.

(51) Int. Cl.
| | |
|---|---|
| *H04W 72/08* | (2009.01) |
| *H04L 1/00* | (2006.01) |
| *H04W 28/06* | (2009.01) |
| *H04L 1/18* | (2006.01) |
| *H04W 16/14* | (2009.01) |

(52) U.S. Cl.
CPC ......... *H04W 72/082* (2013.01); *H04L 1/1867* (2013.01); *H04L 5/0094* (2013.01); *H04W 16/14* (2013.01); *H04W 28/06* (2013.01)

(56) References Cited

U.S. PATENT DOCUMENTS

| | | | |
|---|---|---|---|
| 6,621,874 | B1 | 9/2003 | Farber et al. |
| 8,547,884 | B2 | 10/2013 | Lo et al. |
| 8,610,832 | B2 | 12/2013 | Frerking |
| 2003/0157905 | A1 | 8/2003 | Holmqvist |
| 2006/0121854 | A1 | 6/2006 | Abhishek et al. |
| 2007/0004345 | A1 | 1/2007 | Ono et al. |
| 2008/0070586 | A1 | 3/2008 | Kermoal et al. |
| 2008/0176523 | A1 | 7/2008 | Sutton et al. |
| 2008/0194220 | A1 | 8/2008 | Suzuki |
| 2009/0176457 | A1 | 7/2009 | Christensen et al. |
| 2009/0197556 | A1 | 8/2009 | Iwakuni |
| 2009/0215451 | A1 | 8/2009 | Lim et al. |
| 2010/0014468 | A1* | 1/2010 | Lee .................... H04W 74/006 370/329 |
| 2010/0041347 | A1 | 2/2010 | Prise |
| 2010/0054357 | A1 | 3/2010 | Fujimura et al. |
| 2010/0135235 | A1 | 6/2010 | Ji et al. |
| 2010/0234040 | A1 | 9/2010 | Palanki et al. |
| 2010/0239044 | A1 | 9/2010 | Ringstrom et al. |
| 2010/0246506 | A1* | 9/2010 | Krishnaswamy ... H04W 72/085 370/329 |
| 2011/0032892 | A1* | 2/2011 | Bahl .................... H04L 5/0032 370/329 |
| 2011/0261769 | A1 | 10/2011 | Ji et al. |
| 2011/0299479 | A1* | 12/2011 | Deb .................... H04W 28/18 370/329 |
| 2012/0039284 | A1* | 2/2012 | Barbieri ............. H04W 48/10 370/329 |
| 2012/0263117 | A1* | 10/2012 | Love .................... H04L 5/003 370/329 |
| 2013/0053054 | A1* | 2/2013 | Lovitt ................. H04W 4/028 455/456.1 |
| 2013/0157590 | A1 | 6/2013 | Mo et al. |

FOREIGN PATENT DOCUMENTS

| | | |
|---|---|---|
| CN | 101626625 A | 1/2010 |
| CN | 102227947 A | 10/2011 |

OTHER PUBLICATIONS

3rd Generation Partnership Project (3GPP), R1-100089, "Component Carrier Types in Rel.10", Samsung, 3GPP TSG RAN WG1 #59bis, Valencia, Spain, Jan. 19-23, 2010, 4 pages.
3rd Generation Partnership Project (3GPP), R1-100313, "On the Need of Extension Carriers", Nokia, Nokia Siemens Networks, 3GPP TSG-RAN WG1 Meeting #59bis, Valencia, Spain, Jan. 18-22, 2010, 3 pages.
3rd Generation Partnership Project (3GPP), R1-100358, "Details of Extension Carrier", Panasonic, 3GPP TSG-RAN WG1 Meeting #59bis, Valencia, Spain, Jan. 18-22, 2010, 4 pages.
3rd Generation Partnership Project (3GPP), R1-100359, "Possible Definition of Extension Carrier and Carrier Segment", Panasonic, Motorola, Qualcomm, 3GPP TSG-RAN WG1 Meeting #59bis, Valencia, Spain, Jan. 18-22, 2010, 2 pages.
3rd Generation Partnership Project (3GPP), R1-100407, "Extension Carriers and Carrier Segments in LTE-A", Alcatel-Lucent, Alcatel-Lucent Shanghai Bell, 3GPP TSG-RAN WG1 #59bis, Valencia, Spain, Jan. 18-22, 2010, 3 pages.
3rd Generation Partnership Project (3GPP), R1-100491, "Comparison of Carrier Segment and Extension Carrier for Contiguous Carrier Aggregation", Ntt DoCoMo, 3GPP TSG RAN WG1 Meeting #59bis, Valencia, Spain, Jan. 18-22, 2010, 5 pages.
3rd Generation Partnership Project (3GPP), R1-100670, "Extension Carriers for LTE-A", Qualcomm Incorporated, 3GPP TSG RAN WG1 #59bis, Valencia, Spain, Jan. 18-22, 2010, 3 pages.
3rd Generation Partnership Project (3GPP), R1-100808, "Channel Sounding Capacity Improvements", Huawei, 3GPP TSG RAN WG1 Meeting #59 bis, Valencia, Spain, Jan. 18-22, 2010, 7 pages.
3rd Generation Partnership Project (3GPP), R1-100809, "Carrier Types Offline Discussion", Huawei, RAN1#59bis, Valencia, Jan. 2010, 4 pages.
3rd Generation Partnership Project (3GPP), R1-100812, "Way Forward on Carrier Types", Alcatel-Lucent, Alcatel-Lucent Shanghai Bell, Ericsson, ST-Ericsson, Panasonic, NTT DoCoMo, Qualcomm Inc., Samsung, 3GPP TSG RAN WG1 #59bis, Valencia, Spain, Jan. 18-22, 2010, 2 pages.
European Telecommunications Standards Institute (ETSI), TS 136 211 V10.4.0, "LTE, Evolved Universal Terrestrial Radio Access (E-UTRA), Physical Channels and Modulation (3GPP TS 36.211 version 10.4.0 Release 10)", Jan. 2012, 103 pages.
European Telecommunications Standards Institute (ETSI), TS 136 211 V10.6.0, "Lte, Evolved Universal Terrestrial Radio Access (E-UTRA), Physical Channels and Modulation (3GPP TS 36.211 version 10.6.0 Release 10)", Feb. 2013, 103 pages.
European Telecommunications Standards Institute (ETSI), TS 136 321 V10.4.0, "LTE, Evolved Universal Terrestrial Radio Access (E-UTRA), Medium Access Control (MAC) Protocol Specification (3GPP TS 36.321 version 10.4.0 Release 10)", Jan. 2012, 56 pages.
European Telecommunications Standards Institute (ETSI), TS 136 321 V10.7.0, "LTE, Evolved Universal Terrestrial Radio Access (E-UTRA), Medium Access Control (MAC), Protocol Specification (3GPP TS 36.321 version 10.7.0 Release 10)", Feb. 2013, 56 pages.
European Telecommunications Standards Institute (ETSI), TS 136 331 V10.4.0, "LTE, Evolved Universal Terrestrial Radio Access (E-UTRA), Radio Resource Control (RRC), Protocol Specification (3GPP TS 36.331 version 10.4.0 Release 10)", Jan. 2012, 300 pages.
European Telecommunications Standards Institute (ETSI), TS 136 331 V10.8.0, "L TE, Evolved Universal Terrestrial Radio Access (E-UTRA), Radio Resource Control (RRC), Protocol Specification (3GPP TS 36.331 version 10.8.0 Release 10)", Feb. 2013, 308 pages.
European Telecommunications Standards Institute (ETSI), TS 136 331 V11.2.0, "LTE, Evolved Universal Terrestrial Radio Access (E-UTRA); Radio Resource Control (RRC), Protocol Specification (3GPP TS 36.331 version 10.2.0 Release 10)", Feb. 2013, 345 pages.
Federal Communications Commission, "Second Memorandum Opinion and Order", FCC 10-174, Sep. 23, 2010, 101 pages.
Federal Communications Commission, "Small Entity Compliance Guide", FCC 08-260, ET Docket No. 04-186, Nov. 14, 2008, 7 pages.
3rd Generation Partnership Project (3GPP), R1-100828, "LS on Additional Carrier Types for LTE-A", 3GPP TSG-RAN WG1, Meeting #59bis, Valencia, Spain, Jan. 18-22, 2010, 2 pages.

\* cited by examiner

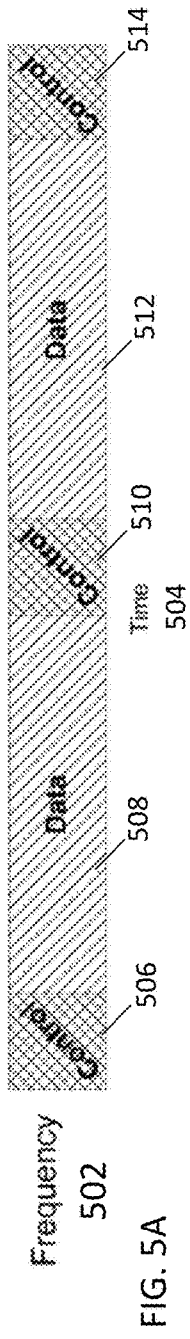

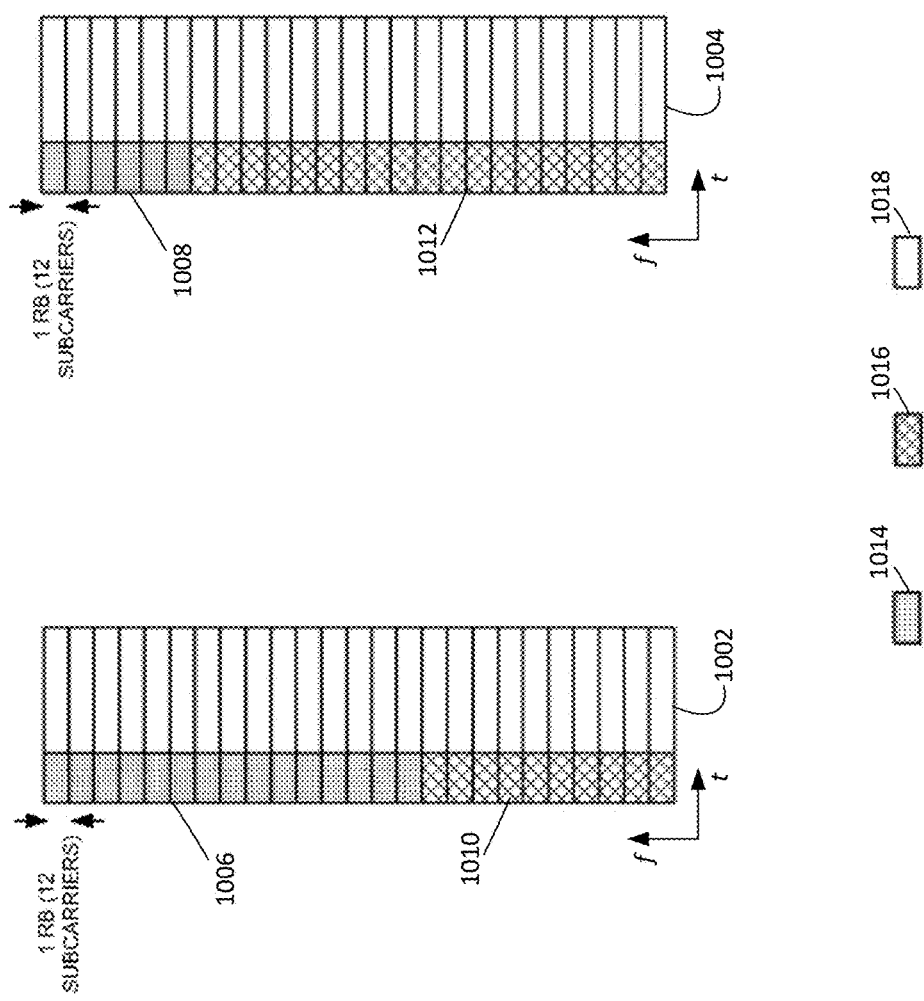

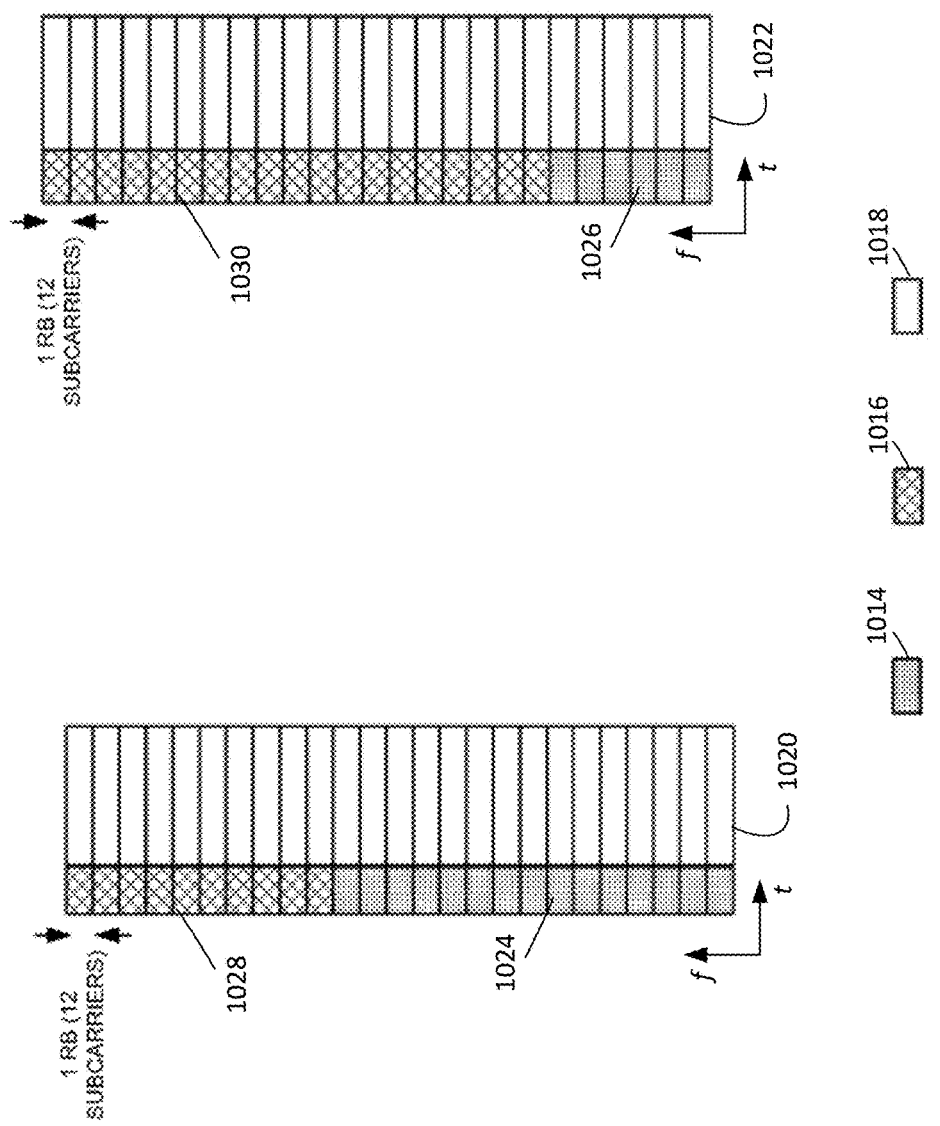

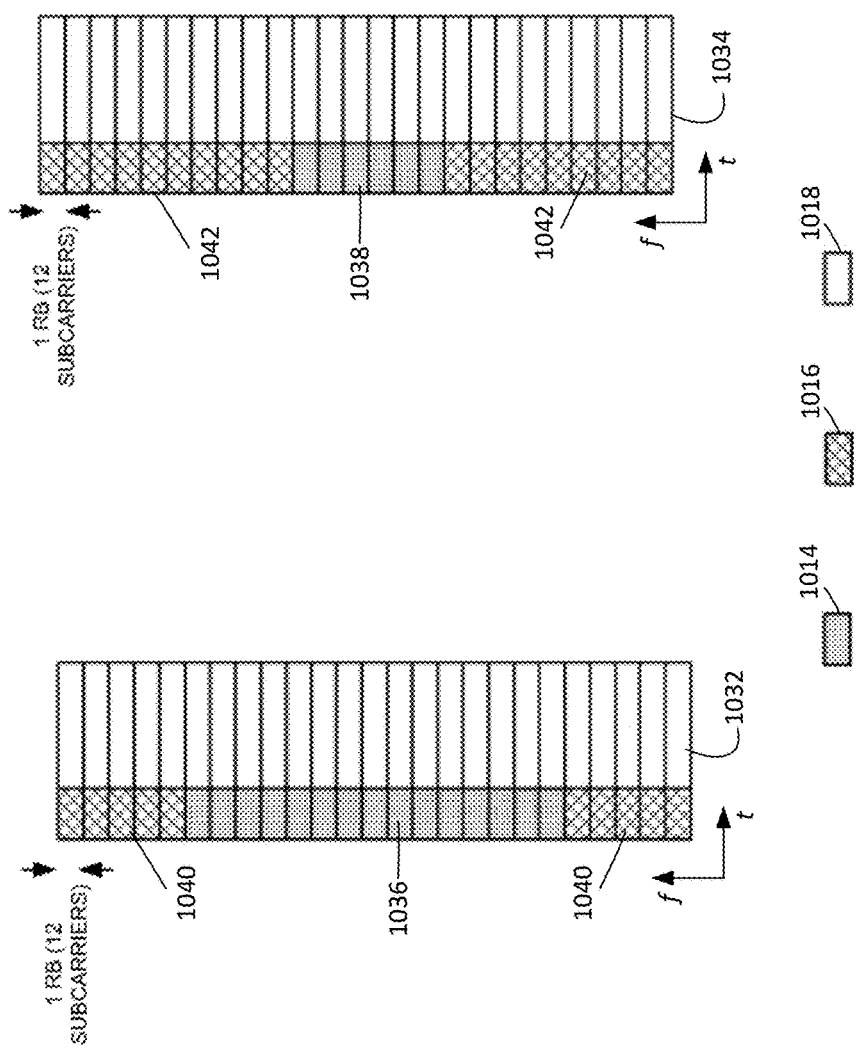

ADAPTIVE CONTROL CHANNEL

CROSS-REFERENCE TO RELATED APPLICATIONS

This application is a continuation of U.S. patent application Ser. No. 13/739,922, filed Jan. 11, 2013; which claims the benefit of U.S. Provisional Application No. 61/585,587 filed Jan. 11, 2012, which are incorporated by reference herein in their entireties.

BACKGROUND

In a wireless communications network, such as a cellular or Wi-Fi network for example, wireless communications may be transmitted via one or more channels. These channels may occupy a certain frequency band. The frequency band on which these wireless communications may be transmitted may be shared with, or adjacent to, other frequency bands on which wireless communications may be performed. As these other wireless communications may be transmitted on the same, or similar, band, they may cause interference.

In an example, such interference may be caused when a cellular or Wi-Fi network is operating on television whitespace (TVWS). As the cellular or Wi-Fi network may operate on a permitted band while other wireless communications may be performed on the same band, or a band in close proximity (e.g., an adjacent band), the cellular or Wi-Fi communications may be affected by interference from the other communications.

SUMMARY

Systems, methods, and apparatus are described herein for configuring a control channel in a wireless network. For example, a reduced bandwidth may be determined for receiving control information on a cellular channel adjacent to a non-cellular channel. The cellular channel and the non-cellular channel may occupy a same frequency band. The reduced bandwidth may be determined to avoid interference of the control information from the adjacent non-cellular channel. The control information may be located on the cellular channel based on the reduced bandwidth.

In an example, the control channel may be configured for Wi-Fi. For example, a reduced bandwidth may be determined for receiving control information on a Wi-Fi channel adjacent to a non-Wi-Fi channel. The Wi-Fi channel and the non-Wi-Fi channel may occupy a same frequency band. The reduced bandwidth may be determined to avoid interference of the control information from the adjacent non-Wi-Fi channel. The control information may be located on the cellular channel based on the reduced bandwidth.

The adjacent channel may include a digital television channel or a radar channel, for example.

The embodiments described in the Summary are provided as examples, and are in no way limiting on the scope of the embodiments described elsewhere herein.

BRIEF DESCRIPTION OF DRAWINGS

A more detailed understanding may be had from the Detailed Description below, given by way of example in conjunction with drawings appended hereto. The FIGS. and the detailed description provide examples and are not meant to be limiting.

FIG. 5A is a graph illustrating an example of a frequency band.

FIG. 5B is a graph illustrating another example of a frequency band.

FIG. 5C is a graph illustrating another example of a frequency band.

FIG. 10A shows an example for the placement and/or location of the control channel in a frequency band.

FIG. 10B shows another example for the placement and/or location of the control channel in a frequency band.

FIG. 10C shows another example for the placement and/or location of the control channel in a frequency band.

DETAILED DESCRIPTION

Figure 1A:
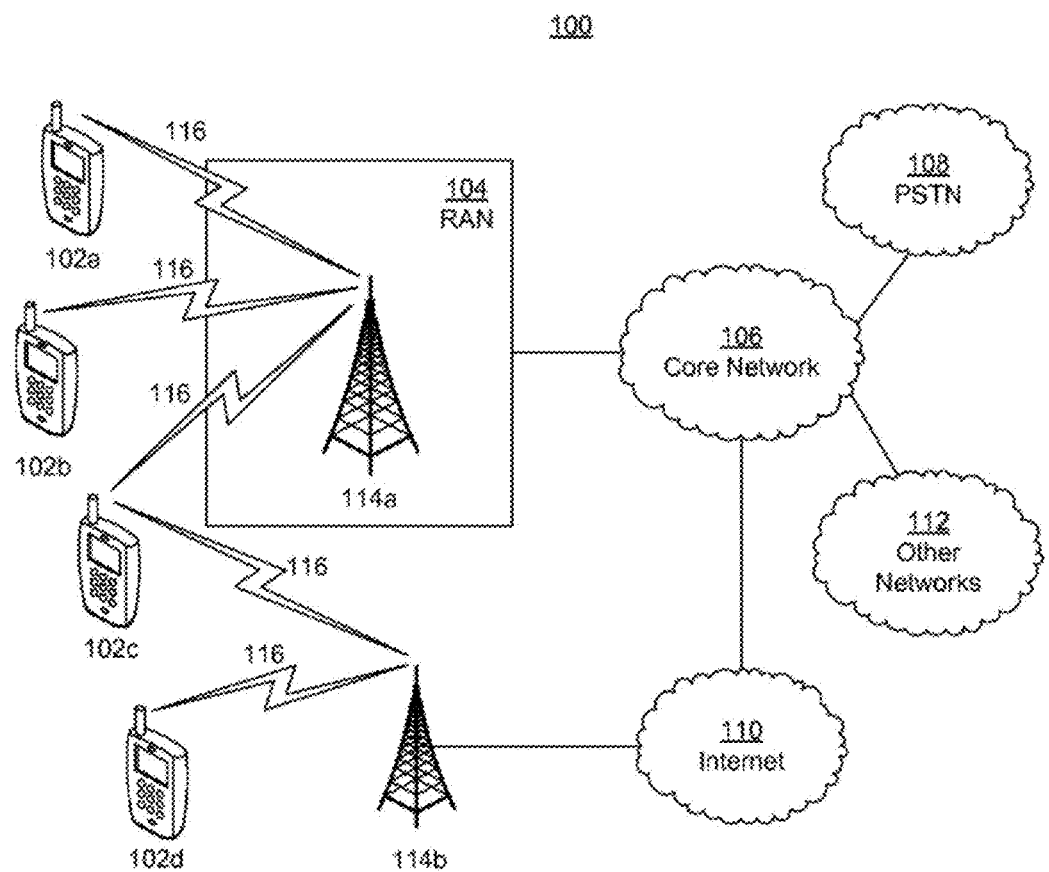
FIG. 1A is a block diagram illustrating an example of a communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
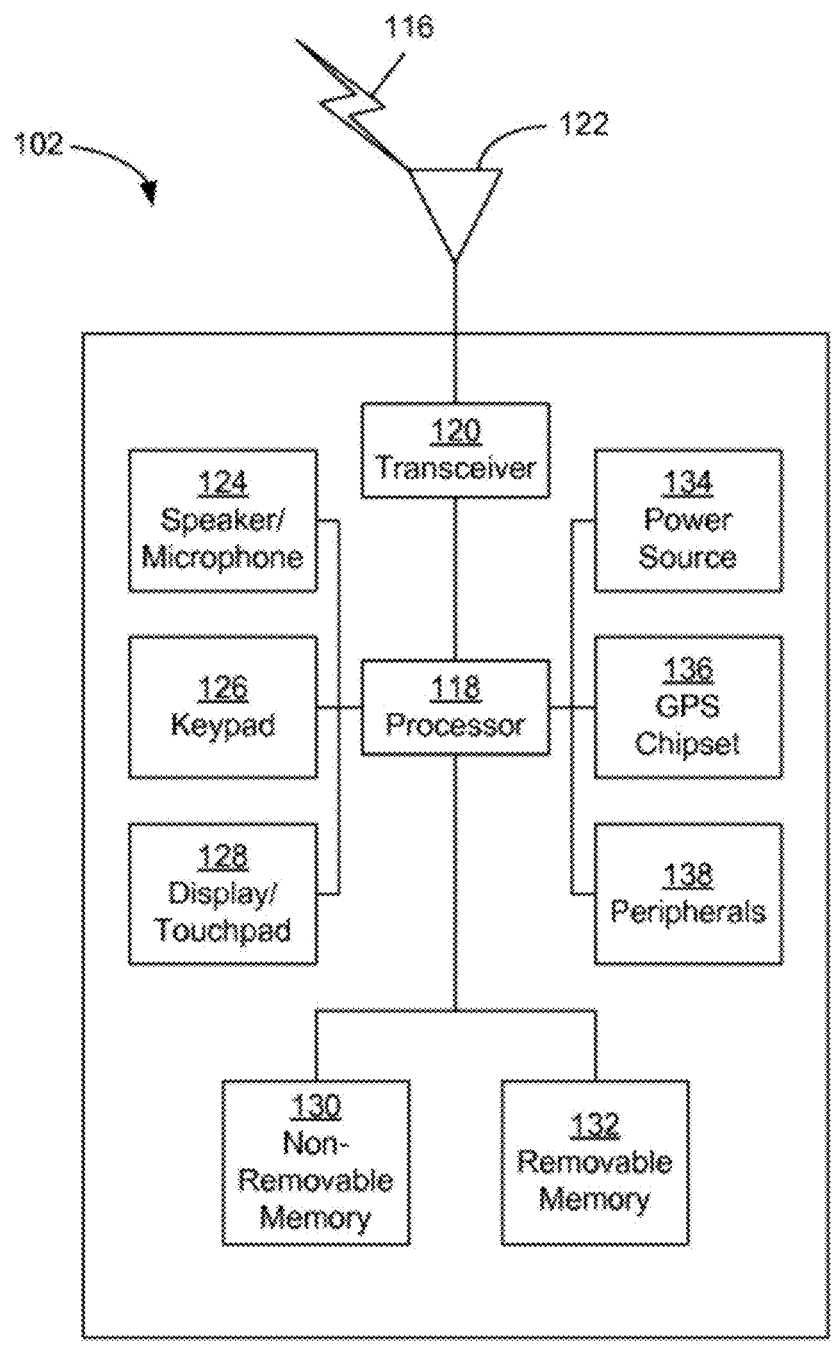
FIG. 1B is a block diagram illustrating example details of a wireless transmit/receive unit ("WTRU") of the communications system.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
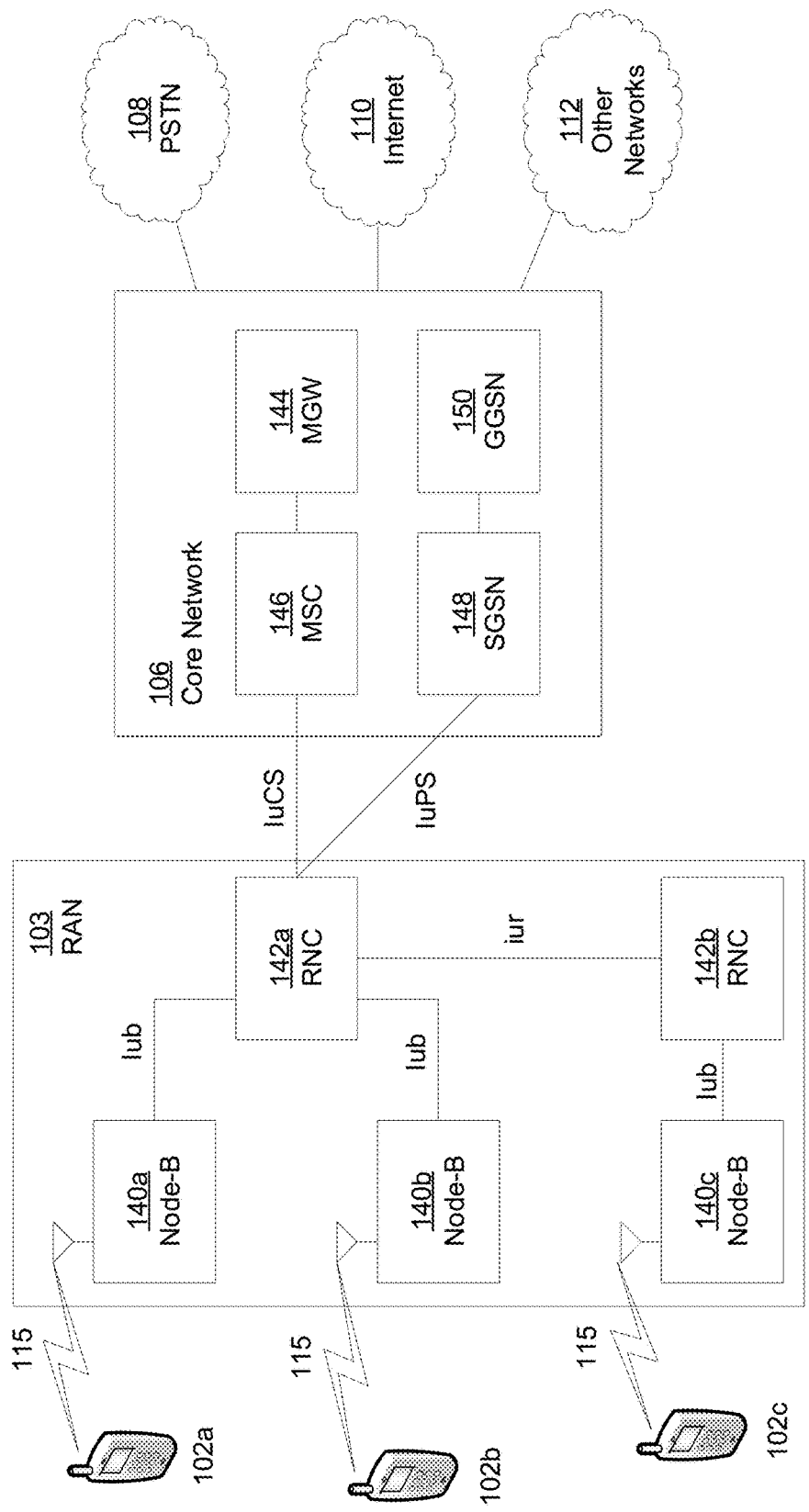
FIG. 1C is a block diagram illustrating example details of alternative radio-access and core networks of the communications system.
Figure 1D:
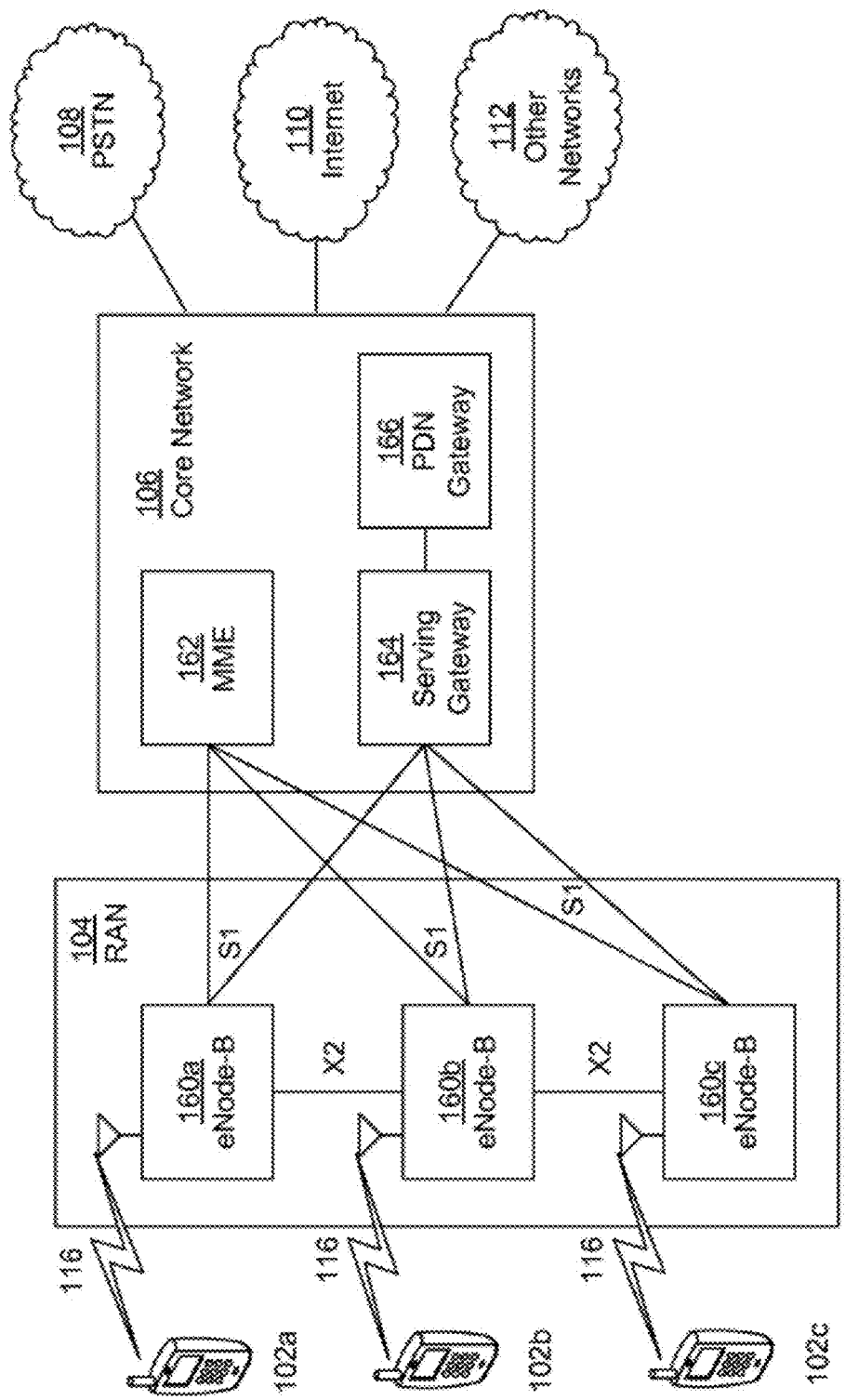

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1C, the eNode-Bs 160a, 160b, 160c may communicate with one another over an X2 interface.

The core network 106 shown in FIG. 1C may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

One or more of the communication network elements described herein may be used to avoid channel interference, such as adjacent channel and/or narrowband interference. For example, a cellular channel may be operating next to, or near, a non-cellular channel, which may cause interference with the information being transmitted on the cellular channel. The cellular channel and the non-cellular channel may be operating on the same frequency band, such as the TV band spectrum, for example. While a cellular channel and/or network may be described herein for implementing a reduced control channel to avoid channel interference, any other wireless network may similarly implement a reduced control channel.

Figure 2:
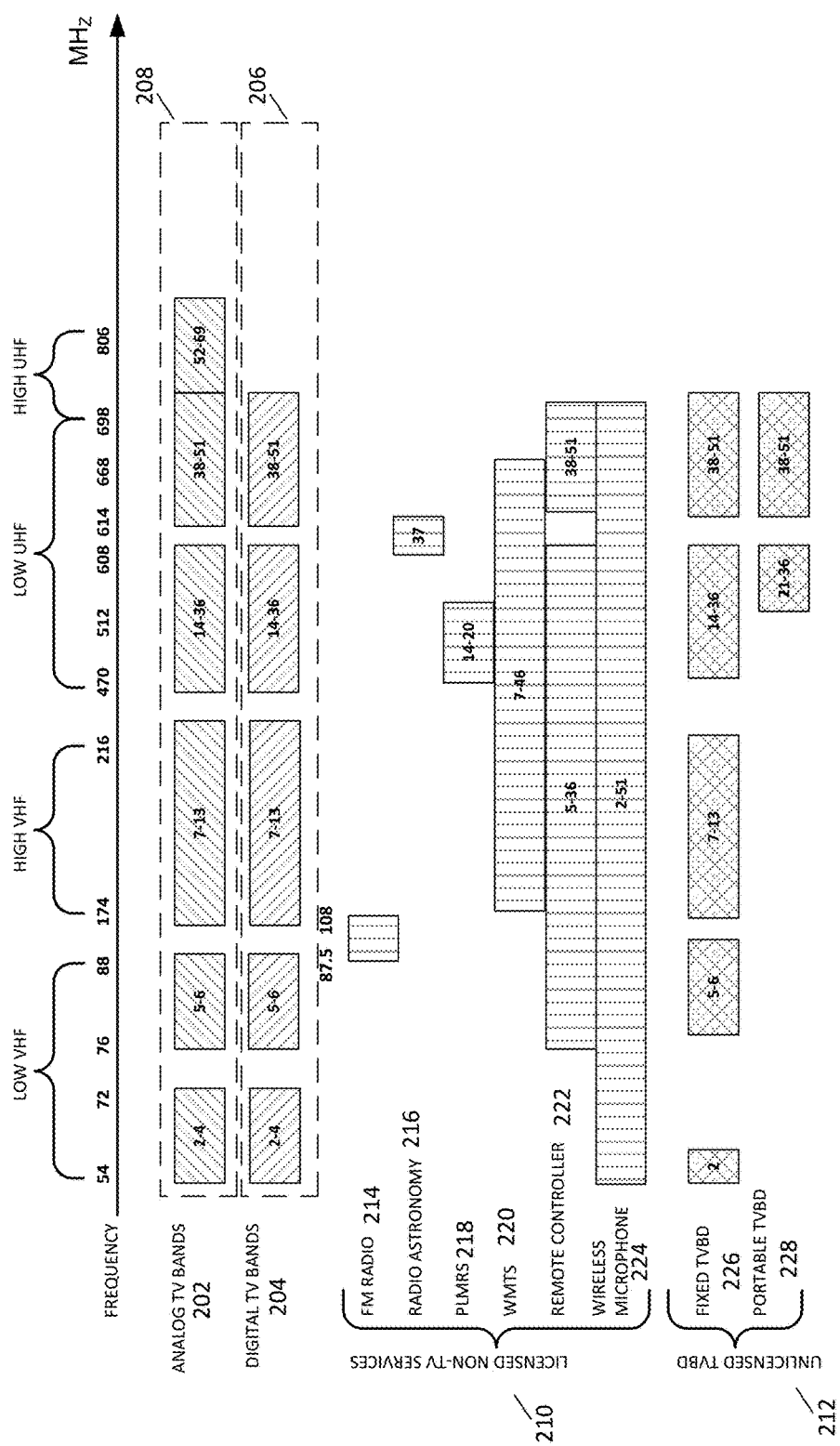
FIG. 2 is a diagram illustrating an example of TV band spectrum usage.

FIG. 2 shows an example of TV band spectrum usage. For example, FIG. 2 illustrates the channel frequency for the digital TV channels 206, the analog TV channels 208, the licensed non-TV services 210, and the unlicensed television band device (TVBD) 212. The licensed non-TV services 210 may include FM radio 214 (e.g., that may use frequencies 87.5 to 108), radio astronomy 216 (e.g., that may use channel 37), Private Land Mobile Radio Service (PLMRS) 218 (e.g., that may use channels 14 to 20), Wireless Medical Telemetry Service (WMTS) 220 (e.g., that may use channels 7 to 46), remote controller 222 (e.g., that may use channels 5 to 36 and/or channels 38 to 51), wireless microphone 224 (e.g., that may use channels 2-51), and/or any other licensed non-TV services. The unlicensed TVBD 212 may include fixed TVBD 226 (e.g., that may use channels 2, 5 to 6, 7 to 13, 14 to 36, and/or 38 to 51) and/or portable TVBD 228 (e.g., that may use channels 21 to 36 and/or 38 to 51).

As shown in FIG. 2, analog TV bands 202 may be used instead of, or in addition to, digital TV bands 204. The digital TV channel definitions 206 may be the same as, or similar to, the analog TV channel definitions 208. FIG. 2 illustrates the channel frequency for the digital TV channels 206 and the analog TV channels 208. The digital TV bands 204 may use a portion of the analog TV channels 208 (e.g., channels 2 to 51, but not including channel 37), while other analog TV channels 208 (e.g., channels 52 to 69) may be used for other non-broadcast users (e.g., GSM, CDMA, etc.). Frequencies may be allocated to a broadcasting service that may not be used locally, which may be referred to as White Space (WS). For example, the TVWS may refer to TV channels 2 to 51, but may not include channel 37.

Unlicensed (e.g., license-exempt, or LE) radio transmitters may operate on the TVWS. For example, LE radio transmitters may operate on TVWS channels (e.g., TV channels except channels 3, 4 and/or 37) while a minimum interference may be caused to the licensed radio transmissions and/or interference may be caused to the LE ratio transmission from the licensed radio transmissions. The operation of unlicensed radio transmitters may satisfy several restrictions. As described herein, there may be different types of unlicensed TVBDs 212. For example, unlicensed TVBDs 212 may include fixed TVBD 226, mode I portable or personal TVBD 228, and/or mode II portable or personal TVBD 228. Fixed TVBD 226 and/or mode II portable TVBD 228 may have geo-location/database access capability and/or be able to register to the TV band database. The access to the TV band database may be used to query the allowed TV channels (e.g., to avoid the interference with digital TV signals and/or licensed signals transmitted on the TV bands). Spectrum sensing may be another feature (e.g., an add-on feature) used for TVBDs to enable little interference to digital TV signals and/or licensed signals. The sensing TVBD may operate on TVWS, for example, if its access to TV band database may be limited.

A fixed TVBD 226 may operate on various channels (e.g., channels 2 to 51, except channels 3, 4, and/or 37), but a TVBD may not operate on the same channel or the first adjacent channel to a channel used by TV services. The maximum transmission power of fixed TVBD 226 may be 1 W (e.g., with an upper limit of 6 dBi antenna gain) for example. The maximum Effective Isotropic Radiated Power (EIRP) may be 4 W. A portable TVBD 228 may operate on various channels (e.g., channels 21 to 51, except channel 37). The portable TVBD 228 may not operate on the same channel used by TV services. The maximum transmission power of portable TVBD 228 may be 100 mW, or 40 mW if it is on the first adjacent channel to a channel used by TV services. Furthermore, if a TVBD is a sensing device, then its transmission power may not exceed 50 mW. The TVBDs may have strict out-of-band emissions. The antenna (e.g., outdoor) height of fixed TVBD 226 may be less than 30 meters, while there may not be a limitation on the antenna height for portable TVBD 228.

A communication network may be transmitting and/or receiving information on a carrier near (e.g., adjacent to) a TVBD. One feature of a communication network may be the support of carrier aggregation (CA). In CA, two or more component carriers (CCs) may be aggregated to support transmission bandwidths, such as transmission bandwidths up to 100 MHz for example. A CC may be referred to as a cell. A WTRU may receive and/or transmit one or multiple CCs. CA may be supported for contiguous and/or non-contiguous frequencies and/or each CC may be limited to a maximum (e.g., 20 MHz) in the frequency domain. The spacing between central frequencies of contiguously aggregated downlink CC may be a multiple of 300 KHz, for example. The number of CCs for uplinks may not exceed the number of CC for downlinks. Among the CCs, at least one CC may be defined as the primary cell and/or one or more other CCs may be defined as secondary cells. Each of the cells defined for CA may be associated with its own cell ID. When a WTRU (e.g., an LTE-A WTRU or other WTRU) establishes or re-establishes Radio Resource Control (RRC) connection, a serving cell may be configured, which may correspond to the primary serving cell (PCell). Depending on traffic load, quality of service (QoS), and/or other facts, the WTRU may be configured with one or more additional serving cells. The WTRU may be configured with the additional serving cells via RRC signaling from the eNB, for example. These additional serving cells may be referred to as secondary serving cells (SCells).

An extension carrier may include a carrier that may not be operated as a single carrier (e.g., a stand-alone carrier), but may be a part of a component carrier set. At least one of the carries in the carrier set may be a stand-alone-capable carrier. The extension carrier may be used in heterogeneous network (HetNet) environments. For example, in one example configuration, a macro cell may use channel f1 as primary serving cell and channel f2 as an extension carrier, while a pico cell within the coverage of the macro cell may use channel f2 as a primary serving cell and channel f1 as an extension carrier.

Using extension carriers, common channel overhead may be reduced and/or interference management may be performed for control channels. Resource-element (RE) groups may be used for defining the mapping of control channels to REs. An RE group may be represented by the index pair (k',l') where the RE with the lowest index k in the group with the REs in the group having the same value of l. The set of REs (k',l') in an RE group may depend on the number of cell-specific reference signals configured, as described below with $k_0=nPRB-N_{sc}^{RB}$, $0 \leq nPRB < N_{RB}^{DL}$, for example.

In the first OFDM symbol of the first slot in a subframe the two RE groups in physical resource block (PRB) nPRB may include REs (k,l=0) with $k=k_0+0, k_0+1, \ldots, k_0+5$ and $k=k_0+6, k_0+7, \ldots, k_0+11$, respectively.

In the second OFDM symbol of the first slot in a subframe in case of one or two cell-specific reference signals being configured, the three RE groups in PRB nPRB may include REs (k,l=1) with $k=k_0+0, k_0+1, \ldots, k_0+3, k=k_0+4, k_0+5, \ldots, k_0+7$ and $k=k_0+8, k_0+9, \ldots, k_0+11$, respectively.

In the second OFDM symbol of the first slot in a subframe in case of four cell-specific reference signals configured, the two RE groups in PRB nPRB may include REs (k,l=1) with $k=k_0+0, k_0+1, \ldots, k_0+5$ and $k=k_0+6, k_0+7, \ldots, k_0+11$, respectively.

In the third OFDM symbol of the first slot in a subframe, the three RE groups in PRB nPRB may include REs (k,l=2) with $k=k_0+0, k_0+1, \ldots, k_0+3, k=k_0+4, k_0+5, \ldots, k_0+7$ and $k=k_0+8, k_0+9, \ldots, k_0+11$, respectively.

In the fourth OFDM symbol of the first slot in a subframe in case of a cyclic prefix, the three RE groups in PRB nPRB may include REs (k,l=3) with $k=k_0+0, k_0+1, \ldots, k_0+3, k=k_0+4, k_0+5, \ldots, k_0+7$ and $k=k_0+8, k_0+9, \ldots, k_0+11$, respectively.

In the fourth OFDM symbol of the first slot in a subframe in case of extended cyclic prefix, the two RE groups in PRB nPRB may include REs (k,l=3) with $k=k_0+0, k_0+1, \ldots, k_0+5$ and $k=k_0+6, k_0+7, \ldots, k_0+11$, respectively.

Mapping of a symbol-quadruplet <z(i), z(i+1), z(i+2), z(i+3)> onto an RE group represented by RE (k',l') may be defined such that elements z(i) may be mapped to REs (k,l) of the RE group not used for cell-specific reference signals in increasing order of i and k. If a cell-specific reference signal is configured, cell-specific reference signals may be assumed to be present on antenna ports 0 and/or 1 for mapping a symbol-quadruplet to an RE group. Otherwise the number of cell-specific reference signals may be assumed equal to the actual number of antenna ports used for cell-specific reference signals. The WTRU may not make any assumptions about REs assumed to be reserved for reference signals, but that may not be used for transmission of a reference signal.

The mapping to REs for Physical Control Format Indicator Channel (PCFICH) may be defined in terms of quadruplets of complex-valued symbols. $z^{(p)}(i) = <y^{(p)}(4i), y^{(p)}(4i+1), y^{(p)}(4i+2), y^{(p)}(4i+3)>$ may denote symbol quadruplet i for antenna port p. For each of the antenna ports, symbol quadruplets may be mapped in increasing order of i to the four RE groups in the first OFDM symbol in a downlink subframe with the representative RE given by the following: $z^{(p)}(0)$ may be mapped to the RE group represented by $k=\bar{k}$; $z^{(p)}(1)$ may be mapped to the RE group represented by $$k = \bar{k} + \left\lfloor \frac{N_{RB}^{DL}}{2} \right\rfloor \cdot \frac{N_{sc}^{RB}}{2};$$

$z^{(p)}(2)$ may be mapped to the RE group represented by $$k = \bar{k} + \left\lfloor \frac{2N_{RB}^{DL}}{2} \right\rfloor \cdot \frac{N_{sc}^{RB}}{2},$$

and/or $z^{(p)}(3)$ may be mapped to the RE group represented by $$k = \bar{k} + \left\lfloor \frac{3N_{RB}^{DL}}{2} \right\rfloor \cdot \frac{N_{sc}^{RB}}{2};$$

where the additions may be modulo $$N_{RB}^{DL}N_{sc}^{RB}, \bar{k} = \left(\frac{N_{sc}^{RB}}{2}\right) \cdot (N_{ID}^{cell} \bmod 2N_{RB}^{DL}) \text{ and } N_{ID}^{cell}$$

may be the physical-layer cell identity. An example of the physical-layer cell identity may be shown in Section 6.7.4 of 3GPP TS 36.211.

The mapping to REs of Physical Downlink Control Channel (PDCCH) may be defined by operations on quadruplets of complex-valued symbols. $z^{(p)}(i)=\langle y^{(p)}(4i), y^{(p)}(4i+1), y^{(p)}(4i+2), y^{(p)}(4i+3)\rangle$ may denote symbol quadruplet i for antenna port p. The block of quadruplets $z^{(p)}(0), \ldots, z^{(p)}(M_{quad}-1)$, where $M_{quad}=M_{symb}/4$, may be permuted resulting in $w^{(p)}(0), \ldots, w^{(p)}(M_{quad}-1)$. The permutation may be according to the sub-block interleaver, as described herein. For example, the bits input to the block interleaver may be denoted by $d_0^{(i)}, d_1^{(i)}, d_2^{(i)}, \ldots, d_{D-1}^{(i)}$, where D is the number of bits. The output bit sequence from the block interleaver may be derived as described herein. For example, $C_{subblock}^{CC}32$ may be assigned to be the number of columns in the matrix. The columns of the matrix may be numbered $0, 1, 2, \ldots, C_{subblock}-1$, from left to right. The number of rows of the matrix $R_{subblock}^{CC}$ may be determined. For example the number of rows of the matrix $R_{subblock}^{CC}$ may be determined by finding minimum integer $R_{subblock}^{CC}$ such that $D \leq (R_{subblock}^{CC} \times C_{subblock}^{CC})$. The rows of the rectangular matrix may be numbered $0, 1, 2, \ldots, R_{subblock}^{CC}$ from top to bottom. If $(R_{subblock}^{CC} \times C_{subblock}^{CC}) > D$, then $N_D = (R_{subblock}^{CC} \times C_{subblock}^{CC} - D)$ dummy bits may be padded such that $y_k = \langle NULL \rangle$ for $k=0, 1, \ldots, N_D-1$. $y_{N_D+k}=d_k^{(i)}$, $k=0, 1, \ldots, D-1$, and/or the bit sequence $y_k$ may be written into the $(R_{subblock}^{CC} \times C_{subblock}^{CC})$ matrix row by row starting with bit $y_0$ in column 0 of row 0, such as:

$$\begin{bmatrix} y_0 & y_1 & y_2 & \cdots & y_{C_{subblock}^{CC}-1} \\ y_{C_{subblock}^{CC}} & y_{C_{subblock}^{CC}+1} & y_{C_{subblock}^{CC}+2} & \cdots & y_{2C_{subblock}^{CC}-1} \\ \vdots & \vdots & \vdots & \ddots & \vdots \\ y_{(R_{subblock}^{CC}-1) \times C_{subblock}^{CC}} & y_{(R_{subblock}^{CC}-1) \times C_{subblock}^{CC}+1} & y_{(R_{subblock}^{CC}-1) \times C_{subblock}^{CC}+2} & \cdots & y_{(R_{subblock}^{CC} \times C_{subblock}^{CC}-1)} \end{bmatrix}$$

The inter-column permutation may be performed for the matrix based on the pattern $\langle (j) \rangle_{j \in \{0, 1, \ldots, C_{subblock}^{CC}-1\}}$ that may be shown in Table 1 below, where $P_{(j)}$ may be the original column position of the j-th permuted column. After permutation of the columns, the inter-column permuted $(R_{subblock}^{CC} \times C_{subblock}^{CC})$ matrix may be equal to:

$$\begin{bmatrix} y_{P(0)} & y_{P(1)} & y_{P(2)} & \cdots & y_{P(C_{subblock}^{CC}-1)} \\ y_{P(0)+C_{subblock}^{CC}} & y_{P(1)+C_{subblock}^{CC}} & y_{P(2)+C_{subblock}^{CC}} & \cdots & y_{P(C_{subblock}^{CC}-1)+C_{subblock}^{CC}} \\ \vdots & \vdots & \vdots & \ddots & \vdots \\ y_{P(0)+(R_{subblock}^{CC}-1) \times C_{subblock}^{CC}} & y_{P(1)+(R_{subblock}^{CC}-1) \times C_{subblock}^{CC}} & y_{P(2)+(R_{subblock}^{CC}-1) \times C_{subblock}^{CC}} & \cdots & y_{P(C_{subblock}^{CC}-1)+(R_{subblock}^{CC}-1) \times C_{subblock}^{CC}} \end{bmatrix}$$

The output of the block interleaver may be the bit sequence read out column by column from the inter-column permuted $(R_{subblock}^{CC} \times C_{subblock}^{CC})$ matrix. The bits after sub-block interleaving may be denoted by $v_0^{(i)}, v_1^{(i)}, v_2^{(i)}, \ldots, v_{K_\Pi-1}^{(i)}$, where $v_0^{(i)}$ corresponds to $y_{P(0)}$, $v_1^{(i)}$ corresponds to $y_{P(0)+C_{subblock}^{cc}}, \ldots$, and $K_\Pi = (R_{subblock}^{CC} \times C_{subblock}^{CC})$.

TABLE 1

Inter-column permutation pattern for sub-block interleaver

| Number of columns $C_{subblock}^{CC}$ | Inter-column permutation pattern $\langle P(0), P(1), \ldots, P(C_{subblock}^{CC} - 1) \rangle$ |
|---|---|
| 32 | <1, 17, 9, 25, 5, 21, 13, 29, 3, 19, 11, 27, 7, 23, 15, 31, 0, 16, 8, 24, 4, 20, 12, 28, 2, 18, 10, 26, 6, 22, 14, 30> |

Block interleaving may also be used in interleaving PDCCH modulation symbols. If this block leaver is used in interleaving PDCCH modulation symbols, the input bit sequence may consist of PDCCH symbol quadruplets.

The permutation may operate as described herein with one or more of the following exceptions for example: the input and/or output to the interleaver may be defined by symbol quadruplets (e.g., instead of bits); interleaving may be performed on symbol quadruplets (e.g., instead of bits). <NULL> elements at the output of the interleaver may be removed when forming $w^{(p)}(0), \ldots, w^{(p)}(M_{quad}-1)$. The removal of <NULL> elements may not affect any <NIL> elements inserted. The block of quadruplets $w^{(p)}(0), \ldots, w^{(p)}(M_{quad}-1)$ may be cyclically shifted, which may result in $\bar{w}^{(p)}(0), \ldots, \bar{w}^{(p)}(M_{quad}-1)$, where $\bar{w}^{(p)}(i) = w^{(p)}((i+N_{ID}^{cell}) \bmod M_{quad})$.

Mapping of the block of quadruplets $\bar{w}^{(p)}(0), \ldots, \bar{w}^{(p)}(M_{quad}-1)$ may be defined in terms of RE groups according to one or more of the following in any combination and/or order: 1) initialize m'=0 (RE group number); 2) initialize k'=0; 3) initialize l'=0; 4) if the RE (k',l') represents an RE group and/or the RE group is not assigned to PCFICH or PHICH, perform steps 5 and 6 below, else go to step 7 below; 5) map symbol-quadruplet $\bar{w}^{(p)}(m')$ to the RE group represented by (k',l') for each antenna port p; 6) increase m' by 1; 7) increase l' by 1; 8) repeat from step 4 above if l'<L, where L may correspond to the number of OFDM symbols used for PDCCH transmission as may be indicated by the sequence transmitted on the PCFICH; 9) increase k' by 1; 10) repeat from step 3 if k'<$N_{RB}^{DL} \cdot N_{sc}^{RB}$.

Figure 3:
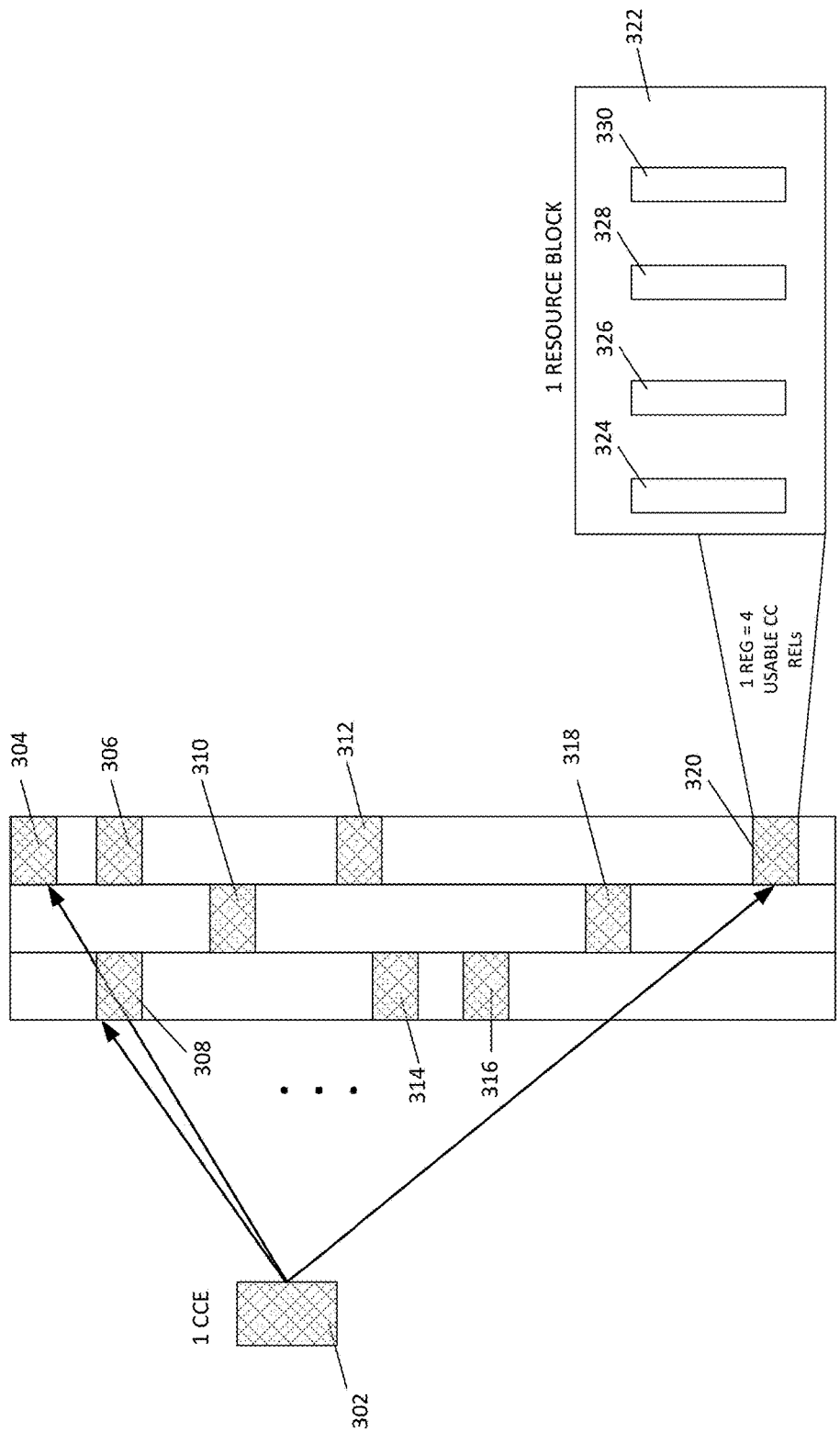
FIG. 3 is a diagram illustrating an example of an interleaving effect.

FIG. 3 illustrates an example of the effect of interleaving on the resulting location of the RE groups which may make up a control channel element (CCE) 302. A CCE 302 may include RE groups 304, 306, 308, 310, 312, 314, 316, 318, and/or 320, for example, on PDCCH. Each RE group 304, 306, 308, 310, 312, 314, 316, 318, 320 may include consecutive usable REs within the same symbol in the time domain (e.g., non-reference symbols) within a resource block, such as consecutive usable REs 324, 326, 328, and/or 330 of resource block 322 in RE group 320, for example. The nine RE groups 304, 306, 308, 310, 312, 314, 316, 318, 320 of the CCE 302 may be spread over the control channel bandwidth by the interleaver function. The function may depend on the subframe number and/or the WTRU ID.

In the case of initial attachment, after detection of synchronization signals for example, the WTRU may proceed to read the Physical Broadcast Channel (PBCH), from which system information may be obtained. For cell identification, the WTRU may not decode the PBCH, but it may make quality-level measurements based on the reference signals.

System information may be delivered by different mechanisms relying on different transport channels (e.g., two different mechanisms relying on two different transport channels). System information, corresponding to the Master Information Block (MIB), may be transmitted using the broadcast channel (BCH). Part of the system information (e.g., the part corresponding to different System Information Blocks (SIBs)), may be transmitted using the downlink shared channel (DL-SCH).

The MIB may include information about the downlink cell bandwidth (e.g., 4 bits), information about the PHICH configuration of the cell (e.g., 3 bits), and/or a system frame number (SFN) (e.g., 8 bits), which may include each bit except the two bits of the SFN. The BCH may be transmitted within the first 4 symbols of the second slot of sub-frame 1 and in the central 6 PRBs.

Various SIBs may be implemented as described herein. For example, one or more of the 13 different SIBs defined by 3GPP LTE may be implemented. An SIB (e.g., SIB1) may include information relevant when evaluating if a WTRU is allowed to access a cell and may define the scheduling of other SIBs. An SIB (e.g., SIB2) may include information about the uplink cell bandwidth, random access parameters, and/or parameters related to uplink power control. An SIB (e.g., SIB3) may include information related to cell-reselection. An SIB (e.g., SIB4 to SIB8) may include neighbor-cell-related information, which may include information related to neighbor cells on the same carrier, neighbor cells on different carriers, and/or neighbor non-cellular cells. For example, an SIB (e.g., SIB4) may have the intra-frequency neighboring cell information; an SIB (e.g., SIB5) may have the inter-frequency cell reselection information; an SIB (e.g., SIB6) may have the UTRA cell reselection information; and/or an SIB (e.g., SIB7) may have the GERAN cell reselection information. An SIB (e.g., SIB9) may include a home eNB name, which may be coded in UTF-8 with variable number of bytes per character, for example. An SIB (e.g., SIB10) may include an Earthquake and Tsunami Warning System (ETWS) primary notification. An SIB (e.g., SIB11) may include an ETWS secondary notification. An SIB (e.g., SIB12) may include a Commercial Mobile Alert Service (CMAS) warning notification. An SIB (e.g., SIB13) may include Multimedia Broadcast Multicast Service (MBMS)-related information.

The overhead of MIB may be calculated as described herein. For example, a channel with a bandwidth of 5 MHz (e.g., for TVWS channel) may include 25 PRBs. In the cyclic prefix case (e.g., 14 symbols per sub-frame), the number of symbols within 10 ms period may be equal to 42000 symbols/frame. The number of PBCH symbols within a 10 ms period may be equal to 6 PRBs*40 symbols/frame/PRB=240 symbols/frame. The overhead for MIB transmission may be equal to 240/42000=0.571%. Although the MIB may occupy the 8th to the 11th symbols of the first sub-frame, the reference signals of 8 symbols may be reduced from the overall 48 symbols. This may give the 40 symbols/PRB value calculated herein.

The calculation of the overhead for the SIBs may be more difficult to assess because the periods of SIB2 to SIB13 may not be fixed, but may be defined in another SIB, such as SIB1 for example. The SIB1 may be transmitted on the sixth sub-frame in a frame. The bandwidth over which SIB1 may be transmitted may vary and/or may be signaled on the associated PDCCH. The SIB1 may include additional information on RLC timer adaptation, as well as the scheduling of other SIBs. SIB2 may have the information on the periodicity of coexistence gap, as described herein.

In CA, primary cell and secondary cells may broadcast their system information. A WTRU may not acquire system information from the secondary cells directly. The eNB may provide the information for operation over the secondary cell through dedicated signaling. This may be performed through an RRC Connection Reconfiguration message, which may be transmitted each time another secondary cell is added to the WTRU. The secondary cell system information parameters, which may be received via dedicated signaling for example, may be different from the parameters broadcasted in the concerned secondary cell.

As described herein, carriers may operate in adjacent bands and/or may cause interference on adjacent bands. For example, a cellular channel (e.g., LTE channel or other 3GPP channel) may operate on a band adjacent to a non-cellular channel band (e.g., DTV channel, radar channel, or other non-cellular channel). The interference may be stronger as the adjacent band is approached in frequency. For example, a supplementary component carrier (SuppCC) may operate on LE bands (e.g., TVWS band) which may cause interference on adjacent bands, such as LE bands and/or bands in the licensed spectrum, and/or interference may be caused on the SuppCC. The operation of SuppCC in LE bands may be subject to stronger interference than in the licensed spectrum. An example may include a high powered broadcast Digital TV signal in an adjacent channel leaking into the operating channel.

Figure 4A:
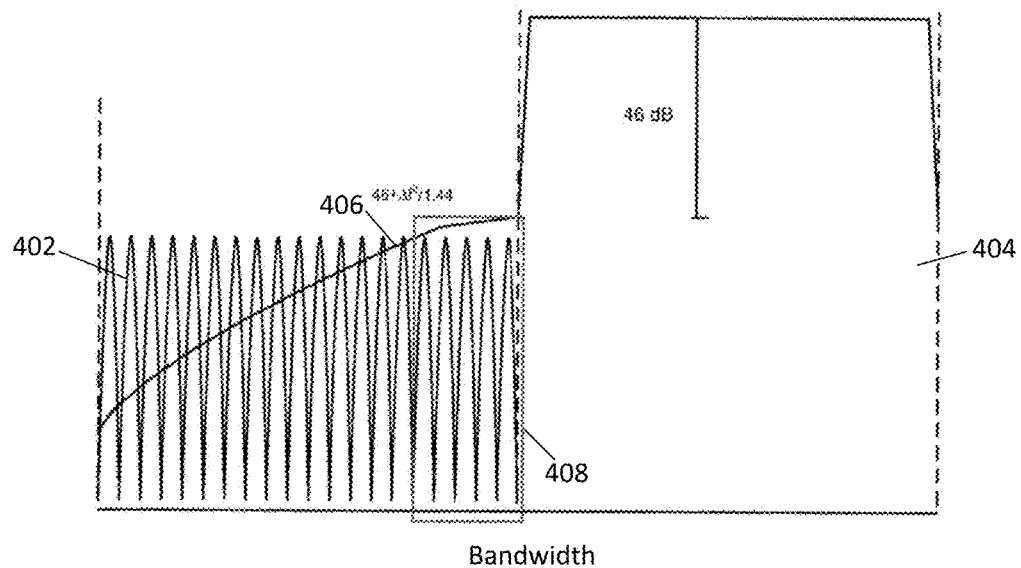
FIG. 4A illustrates an example of adjacent band interference in an information signal.

FIG. 4A illustrates an example of the received information signal 402 and the non-cellular interference signal 406 that may be caused by adjacent band 404 interference. The information signal 402 may include, but is not limited to, communications from an OFDM-based wireless network, such as a cellular network (e.g., a SuppCC that may have OFDMA subcarriers), a Wi-Fi network, and/or a Wi-Max network, for example. The adjacent channel 404 may include, but is not limited to, a non-cellular channel, such as a DTV channel, an uncoordinated narrowband man-made interferer (e.g., a wireless microphone that may operate on narrowband channel, e.g., 200 KHz, which may not occupy the entire channel), a RADAR signal, a fixed satellite system (FSS) transmission, and/or a non-coordinated non-synchronized cellular network transmission from another operator. In an example, the information signal 402 may be an LE band that may occupy TVWS (e.g., 6 MHz TVWS) and/or the adjacent channel 404 may be a licensed band that may occupy a DTV channel (e.g., 6 MHz DTV). As shown in FIG. 4A, the signal interference level 406 may be caused on the information signal 402 and may originate from the adjacent channel 404 that may be leaking into the wireless channel. The signal interference level 406 may be non-uniform across the information signal 402. For example, the signal interference level 406 may be stronger the closer a portion of the information signal 402 is to the adjacent channel 404. The information signal 402 may be the desired signal, such that the SIR may be the power related to information signal 402 divided by the power related to the signal interference level 406. There may be a minimum adjacent channel attenuation for the information signal 402. The minimum adjacent channel attenuation may be 46 dB+$\Delta f^2$/1.44, for example.

When the adjacent channel 404 is in a licensed band (e.g., a DTV channel), the user of the adjacent channel 404 may be a primary user and the user of the information signal 402 may be a secondary user. The information signal 402 may be less static than a primary/secondary cell, as primary users (e.g., users of adjacent channel 404) may have priority over the space (e.g., TVWS) that may be occupied by the information signal 402. The secondary user (e.g., users of information signal 402) may have to stop operation on a given channel due to the arrival of a primary user (e.g., users of adjacent channel 404). An information signal 402 may be subject to more interference due to the presence of other secondary users and/or man-made noise. The channel conditions may be more dynamic than licensed spectrum and/or out of control of the operator. The secondary user may have to stop operation on a channel due to high levels of interference, or to coexist with other secondary systems. In a hierarchical network or HetNets, macro cell power level may dominate the signal originating from the underlay low power cell, which may make it difficult for the WTRU to decode the control channel from the low power cell. The interference on one or more portions of the wireless channel 402 may exceed a signal interference threshold or strength. For example, as shown in FIG. 4A, the interference from adjacent channel 404 may exceed a predetermined threshold or strength for the portion of the information signal 402 band indicated by the rectangle 408.

Figure 4B:
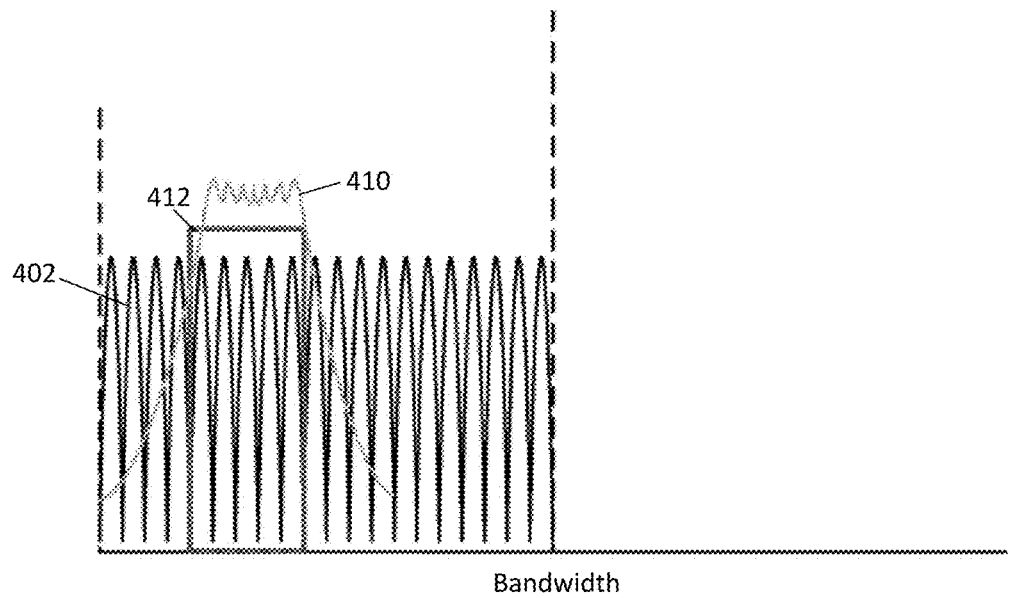
FIG. 4B illustrates an example of uncoordinated narrow-band interference in an information signal.

FIG. 4B shows the presence of an uncoordinated narrowband man-made interferer that causes interference 410 in the information signal 402. For example, the narrowband interferer may include a wireless microphone, which may not occupy the whole channel space (e.g., TVWS channel). Other man-made narrowband interferers may be present within the information signal 402. The interferer may affect a set of contiguous subcarriers indicated by the box at 412. A device may determine the strength of the interference 410 that may affect contiguous subcarriers indicated by the box at 412 exceeds a threshold or strength.

Various wireless technologies (e.g., cellular technologies) may not cope well with the conditions described herein. For example, the control information may not adapt to frequency-selective interference. The control space may include the Physical Control Format Indicator Channel (PCFICH), the Physical Hybrid-ARQ Indicator Channel (PHICH), the Physical Downlink Control Channel (PDCCH), and/or the Physical Broadcast Channel (PBCH). Control information may be spread over the frequency band through interleaving of RE groups over CCEs to achieve frequency diversity. Narrowband interference and/or adjacent channel interference may affect an RE group of a CCE. Changing channels in the unlicensed spectrum may result in excessive RRC signaling, as each WTRU may be individually notified of a channel change each time the channel may no longer be used (e.g., detection of a primary user or identification of a better channel).

To avoid interference on the control information, an adaptively changing control channel may be implemented. Resources for control information may not be allocated to subcarriers in a portion of the band used for information signal 402 band (e.g., the portion of the information signal 402 in which the interference is determined to exceed a predetermined threshold). The adaptively changing control channel may be of an OFDM-based wireless network (e.g., LTE, Wi-Fi, etc.). This adaptively changing control channel may be used to mitigate the impact of non-uniform interference originating from an adjacent interferer, such as a narrowband interferer or interference from macro cell in a HetNet deployment, for example. Also described herein are various types of information that may be carried over the SuppCC to support supplementary cell operation, which may include a cell frequency change indicator, RLC timer reordering information, a grace period indicator, and/or coexistence gaps.

To avoid interference on the control information when using a supplementary cell, radio blocks (RBs) may be dynamically discarded from a control space of a supplementary cell. For example, a set of q consecutive RBs may be discarded from the control space of a supplementary cell. The RE mapping used for the control channels may be altered. The control channel bandwidth of an OFDM-based wireless network operating in a channel may be dynamically changed/reduced, while keeping the data channel bandwidth unchanged. In various embodiments, the OFDM-based wireless network may include one or more of: a SuppCC, where the reduced control channel bandwidth may correspond to a full or reduced bandwidth, such as an LTE or other 3GPP bandwidth (e.g., 1.4 MHz, 3 MHz, 5 MHz, etc), for example; a Wi-Fi network, where the control channel may include the beacon and/or any management frames transmitted by the AP; a HetNet, where the macro cell and/or the underlay power cell may be allocated non-overlapping bandwidth for the control channel; and/or a network in which the reduced bandwidth allocation used by the control information may be shifted in frequency to another location, such as elsewhere within the channel for example.

A geo-location database may be provided for use in TVWS that may be used to communicate information about a primary user and/or an incumbent on a channel adjacent to the available channel. The geo-location database may store the geo-location of WTRUs, the eNB, and/or the primary user (e.g., broadcasting entity of the DTV signal). The geo-location database may be stored at a geo-location device, such as a server or other device at the network associated with the network of the adjacent channel (e.g., the non-cellular network), for example.

The MIB/SIB of a supplementary cell may be used to broadcast control information over the supplementary cell related to channel usage on the LE bands. This system information may include cell frequency change information. The system may be highly frequency agile in order to respond to interference from other secondary users. Such cell frequency change information may be broadcasted to each WTRU on the supplementary cell. The system information may also, or alternatively, include RLC timer reordering information. Due to the different channel conditions on the primary cell and supplementary cells, the RLC timer of the supplementary cell may differ from that of the primary cell. The RLC timer of the supplementary cell may be broadcasted on this cell. The system information may also, or alternatively, include grace period information. A grace period may be provided to complete the Hybrid Automatic Repeat Request (HARQ) processes during the mode transition (e.g., DL to UL, or UL to DL) on the supplementary cell. The duration of the grace period may depend on the real-time transition situations, and/or it may be sent to each WTRU. The system information may also, or alternatively, include coexistence gap information. A coexistence gap may be used for the spectrum sensing purpose and/or for providing opportunities for other secondary networks to access the license-exempt channels. The duration of the coexistence gap may be broadcasted to each WTRU.

As described herein, the adaptable control space may be applied to a network, such as a generic OFDM network, or example. In many wireless communication networks (e.g., LTE, WiFi, etc.) there may be a distinct separation in time between control information sent by a central network entity (e.g., an eNB or WiFi Access Point) and data transmitted by the central network entity and/or the devices. In some networks, the control information may be more critical than the data. For example, in a telecommunications network control information (e.g., in PDCCH) may have a better block error rate (BLER) than data, because the correct operation of the network may depend on the assumption that a WTRU may receive allocations from an eNB properly. Data transmissions may rely on mechanisms such as HARQ to decrease the effective error rate without a low BLER. Wi-Fi networks may perform in a similar manner, in which the control information (e.g., in the form of a beacon) may be transmitted without relying on an acknowledgement, while the data may use an ARQ scheme to ensure lower error rates.

To increase the reliability of control information in the presence of narrowband and/or adjacent channel interference, the control information may be transmitted over a reduced bandwidth, while still transmitting the data over the full bandwidth, for example. Such an approach may be applied to any OFDM network, for example, in which control and data may be transmitted separately in time, as illustrated in FIGS. 5A-5C for example. FIG. 5A is illustrated in the time domain, while FIGS. 5B and 5C are illustrated in the frequency domain.

FIG. 5A is a diagram showing the frequency 502 over time 504 for transmission of control information 506, 510, 514 and data 508, 512 in a wireless network, such as an OFDM network, for example. As shown in FIG. 5A, control information 506, 510, 514 may be allocated portions of time 504 for transmission on frequency 502, while data 508, 512 may be allocated different portions of time 504 for transmission on frequency 502. The control information 506, 510, 514 may use a reduced bandwidth for transmissions.

As shown in FIGS. 5B and 5C, the usable bandwidth 518 for a data symbol 516 may be greater than the usable bandwidth 522 for a control symbol 520. The OFDM symbols associated with the control information or message may have a subset of consecutive control subcarriers 526 used to transmit actual control information, while the remaining control subcarriers 526 may be empty and/or transmitted with zero power (or dummy data). The OFDM symbols associated with the data subcarriers 524 may continue to use the entire signal bandwidth, and therefore, each of the subcarriers 524 in the OFDM symbols may be used. The DC subcarriers 528, 532 may be the center subcarrier of the OFDM network (e.g., that may correspond to the DC in the baseband) and/or may not be transmitted in the downlink. Guard symbols 530, 534 may be part of the gap between the channel bandwidth and the transmission bandwidth to minimize the generation of out-of-band and/or adjacent channel interference.

The use of zero or dummy subcarriers in a portion of control subcarriers 526 may allow the transmitter to use the same, or similar, transmit hardware (HW) (e.g., IFFT engine and/or front end) to transmit the control information. At the receiver, the receiver HW may perform the same, or similar, demodulation of the control information as in the case of the data, except that the receiver baseband processing may be aware of the subcarriers which are carrying control information. The control subcarriers 526 that are determined to be empty or include dummy data may be discarded by the receiver (e.g., as they may be corrupt from interference) and/or full demodulation may be performed on the subcarriers 526 corresponding to the control information.

The number of control channel samples and/or the location of these samples within the bandwidth used by the OFDM symbol may vary depending on the interference. The receiver may be notified of this information (e.g., the location of the usable control channel within the bandwidth and/or the actual control channel bandwidth) in order for it to correctly receive and/or demodulate the control channel bandwidth. Control information may be transmitted from one or more communicating devices to another (e.g., in the DL from a first device to a second device and/or in the UL from the second device to the first device). The signaling of the control channel bandwidth and/or location may be performed by the device transmitting the control information. In the case where control information is transmitted in both directions (e.g., UL and DL), both or either device may signal the control bandwidth and/or location to be used by itself and/or by the other device. For example, a single device may signal the control channel bandwidth and/or location for the control information that it transmits and/or receives using the same indication message.

Figure 6:
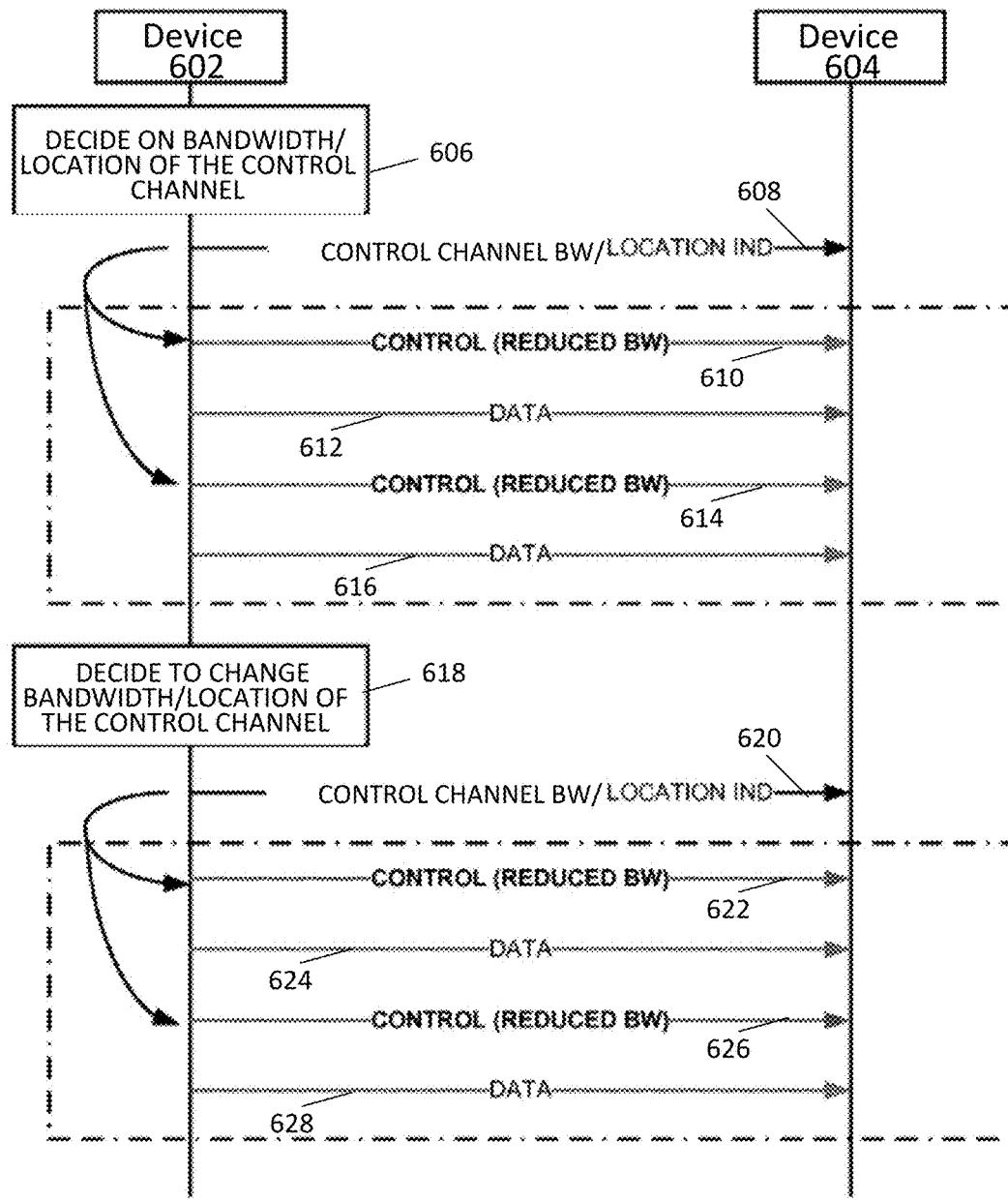
FIG. 6 is a flow diagram illustrating an example for transmitting and receiving control channel indications.
Figure 7:
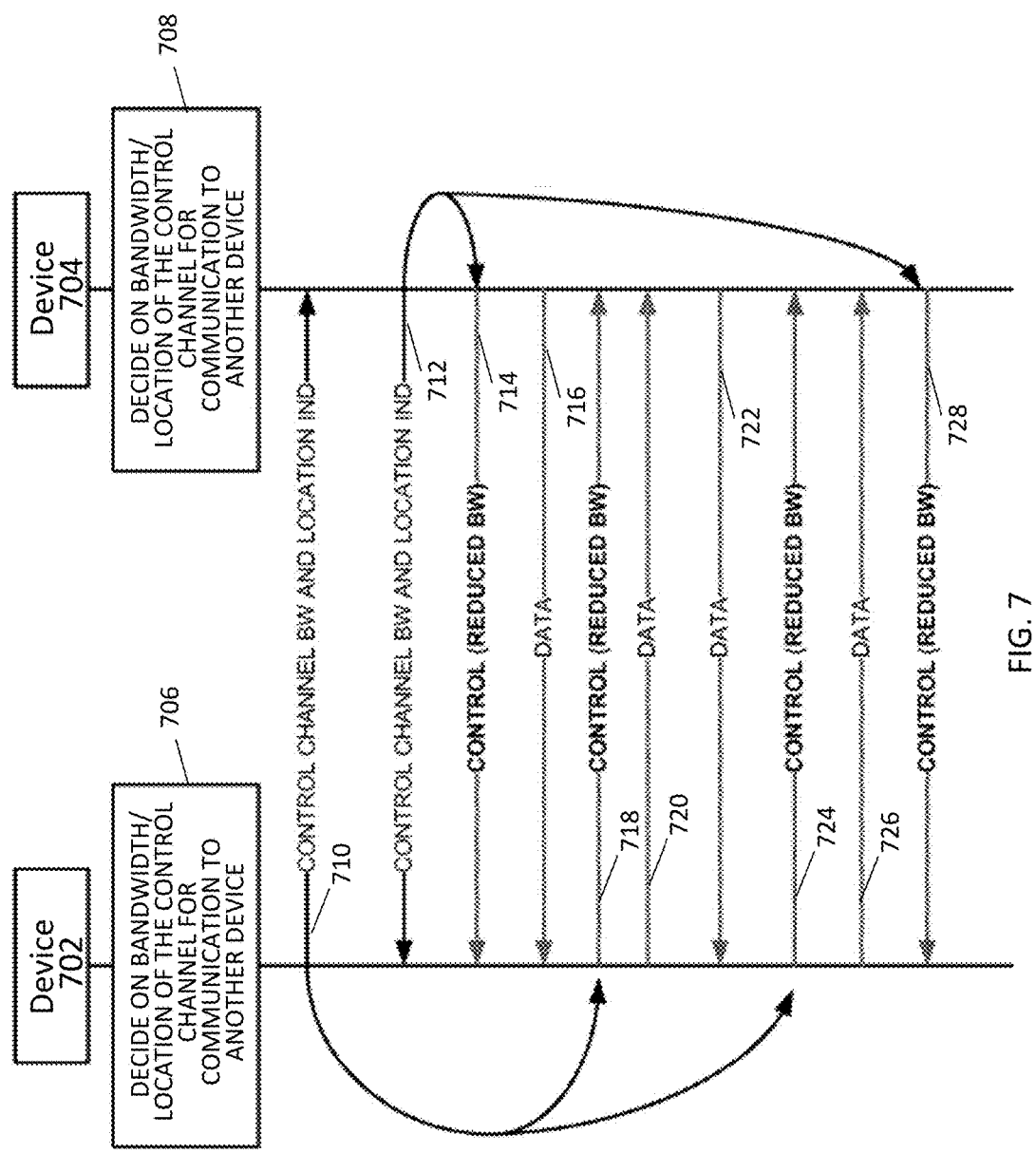
FIG. 7 is a flow diagram illustrating another example for transmitting and receiving control channel indications.

The information flows of FIGS. 6 and 7 show examples for transmitting and receiving control channel indications. As shown in FIG. 6, device 602 and device 604 may transmit and/or receive information via a wireless network. In an example, device 602 may include an eNB, an AP, and/or any other device capable of transmitting control information, while the device 604 may include a WTU and/or any other device capable of receiving control information. In another example, device 602 may include a WTRU and/or any other device capable of transmitting control information, while the device 604 may include an eNB, an AP, and/or any other device capable of receiving control information. Device 602 may determine a bandwidth and/or a location of the control channel at 606. For example, device 602 may decide on using a reduced bandwidth for control channel information based on a determined signal interference. The bandwidth may be reduced below a certain portion of the total bandwidth if the device 602 determines that the portion of the bandwidth has a signal interference level above a predetermined threshold. At 608, a control channel bandwidth and/or location indicator may be sent from device 602 to device 604. The control channel bandwidth and/or the location may be determined by the indicator at device 604. The device 602 may send the control information to device 604 at 610 and/or 614. The control information at 610 and/or 614 may be sent at the reduced bandwidth and/or location, for example. The device 602 may send data at 612 and/or 616. The data may be sent at a greater bandwidth than the control information (e.g., the total available bandwidth).

The device 602 may decide to change the bandwidth and/or location of the control channel at 618. If the device 602 decides to change the bandwidth and/or location of the control channel, the device 602 may send a control channel bandwidth and/or location indicator at 620. The changed bandwidth may be increased or decreased based on the determined signal interference. For example, if the signal interference is determined at 618 to be stronger than determined at 606, the device 602 may decide to decrease the control channel bandwidth again. If the signal interference is determined to be less than at 606, or not to exceed a predetermined threshold, the control channel bandwidth may be increased. The device 604 may use the indicator at 620 to determine the changed control channel bandwidth and/or location. The device 602 may send the control information at 622 and/or 626 to device 604 using the changed bandwidth and/or location. The device 602 may send the data to device 604 at 624 and/or 628 (e.g., using the total bandwidth for the data).

As shown in FIG. 7, each device 702, 704 may decide on the bandwidth and/or location of the control channel for communications sent to another device. In FIG. 7, communications are sent to and from device 702 and device 704 via a wireless network. In an example, devices 702 and 704 may include an eNB, an AP, a WTRU, and/or any other device capable of transmitting and/or receiving control information. At 706, device 702 may decide on a bandwidth and/or location of the control channel for communication to another device, such as device 704 for example. Device 702 may send a control channel bandwidth and/or location indicator at 710 that may indicate the bandwidth and/or location of the control channel decided at 706. The device 704 may determine the bandwidth and/or location of the control channel for communications 718 and/or 724 from device 702 based on the indicator received at 710. The bandwidth of the control channel on which the control information is sent from device 702 at 718, 724 may be a reduced bandwidth (e.g., compared to the band on which the data is transmitted at 720, 726). The device 702 may send data to device 704 at 720 and/or 726. The bandwidth occupied by the transmission of data at 720, 726 may be greater (e.g., the total bandwidth allotted for data) than the reduced bandwidth determined for the control channel at 706.

At 708, device 704 may decide on a bandwidth and/or location of the control channel for communication to another device, such as device 702 for example. Device 704 may send a control channel bandwidth and/or location indicator at 712 that may indicate the bandwidth and/or location of the control channel decided at 708. The device 702 may determine the bandwidth and/or location of the control channel for communications 714 and/or 728 received from device 704 based on the indicator received at 712. The bandwidth of the control channel on which the control information is sent from device 704 at 714, 728 may be a reduced bandwidth (e.g., compared to the channel on which the data is transmitted at 716 and/or 722). The device 704 may send data to device 702 at 716 and/or 722. The bandwidth occupied by the transmission of data at 716, 722 may be greater than the reduced bandwidth determined for the control channel at 708.

The indicator 710, 712, or other signaling of the control bandwidth and/or location, may be transmitted through a separate message using the same channel that is used to transmit the reduced control information, or a different channel. This indicator 710, 712, or other signaling, may be sent with the control information itself, which may enable the elimination of the transmission of a separate message to indicate the bandwidth and/or control information.

The adaptable control space may be used in a supplementary cell. The CA may be used to extend network services (e.g., cellular services) to the LE bands (e.g., TV band or TVWS). Described herein are embodiments that may provide for the use of LE channels, while providing coexistence with other secondary users of the LE bands. The embodiments described herein may adhere to the regulatory rules imposed for operation on TVWS bands, such as where primary users may have priority access for example. A supplementary cell may include a cell that may support operation in the LE spectrum. The supplementary cell may be used for aggregation with a primary cell. A supplementary cell may include downlink resources and/or uplink resources. A supplementary component carrier (SuppCC) may include a carrier in the unlicensed bands that may operate in a supplementary cell. A SuppCC may have limited functionalities compared to a primary or secondary component carrier. For example, a SuppCC may refer to a carrier that may operate in a more harsh spectrum subject to interference from non-coordinated interference, which may create service and/or performance limitations. A supplementary cell operating in LE bands may operate as TDD and/or dynamic FDD. While examples described herein may refer to a SuppCC, the examples may be implemented using other carrier types.

The control space of the supplementary cell may be dynamically redefined. This may mitigate the impact of narrowband interference on performance. The operation of a supplementary cell in a LE band may be subject to stronger interference than in the licensed spectrum. The narrowband interference and/or adjacent channel interference by the control channel of a SuppCC may be avoided by control channel redefinition, in which resource blocks may be selectively used for the control channel and/or re-defining the control channel using those resource blocks. The narrowband interference and/or adjacent channel interference may also, or alternatively, be avoided by using a reduced bandwidth control channel, in which the control channel of a smaller bandwidth may be used and the control channel information may be placed within the available bandwidth to avoid the interference.

For control channel redefinition, the control channel may be redefined to operate over a subset of the resource blocks available. This may include redefining the RE group mapping, and/or the mapping of PCFICH, PHICH, and/or PDCCH. RE groups may be used for defining the mapping of control channels to REs. A RE group may be represented by the index pair (k',l') of the RE with the lowest index k in the group with each RE in the group having the same value of l. In one embodiment, a set of q consecutive RBs may be discarded by the eNB for the control channels, where the set may range from $n*_{PRB}=m_p$ to $n*_{PRB}=m_{p+q-1}$. The set of REs (k,l) in an RE group may depend on the number of cell-specific reference signals that may be configured, for example, as may be described: $k_0=n*_{PRB} \cdot N_{sc}^{RB}$, where $n*_{PRB}$ may be in accordance with the following conditions: $0 \leq n*_{PRB} < m_p$ and $m_{p+q} \leq n*_{PRB} < N_{RB}^{DL}$.

For the adaptive PCFICH, the PCFICH may be coded into a 32-bit codeword, which may be scrambled with a cell and/or subframe specific scrambling code and may be mapped to 16 REs. The mapping of the PCFICH may be on the first symbol of a subframe. The mapping may be in groups of 4 REs that may be well separated in frequency. The location of the 4 groups may depend on the physical-layer cell identity as described herein. This embodiment may use an RE mapping in terms of quadruplets of complex-valued symbols.

According to an example, let $z^{(p)}(i) = <y^{(p)}(4i), y^{(p)}(4i+1), y^{(p)}(4i+2), y^{(p)}(4i+3)>$ may denote the symbol quadruple i for antenna port p. The mapping for the following quadruplets may be changed so that $z^{(p)}(0)$ may be mapped to the RE group represented by $k=\bar{k}$; $z^{(p)}(1)$ may be mapped to the RE group represented by $k=\bar{k}+\lfloor N_{RB}^{DL}-q/2 \rfloor \cdot N_{sc}^{RB}/2$; $z^{(p)}(2)$ may be mapped to the RE group represented by $k=\bar{k}+\lfloor 2(N_{RB}^{DL}-q)/2 \rfloor \cdot N_{sc}^{RB}/2$; and/or $z^{(p)}(3)$ may be mapped to the RE group represented by $k=\bar{k}+\lfloor 3(N_{RB}^{DL}-q)/2 \rfloor \cdot N_{sc}^{RB}/2$, where q may represent the set of q consecutive RBs that may be discarded by the eNB for the control channels, $\bar{K}=(N_{sc}^{RB}/2)\cdot(N_{ID}^{cell} \mod 2(N_{RB}^{DL}-q))$, and where $N_{ID}^{cell}$ may be the physical-layer cell identity.

Alternatively, or additionally, the quadruplet which may be allocated within the discarded set of q consecutive RBs may be shifted by q RBs. For example, in a 5 MHz carrier, there may be 25 RBs, for CELL-ID 0. To spread the 4 groups equally, the first group may be allocated in a lower part of the RB0, the second group may be allocated in the lower part of RB6, the third group may be allocated in the lower part of RB12, and/or the fourth group may be allocated in the lower part of RB18. If RB12 and RB13 are discarded due to narrowband interference, the PCFICH may be spread over the remaining 23 RBs. The impacted RBs may be skipped over and/or the assignment may be shifted by the number of impacted RBs. In this case, for CELL-ID 0, the first group may remain in the lower part of RB0 and the second group may remain in the lower part of RB6, but the third group may be shifted by the two RBs and may be allocated to RB14 and the fourth group may stay in RB18.

Embodiments are described herein for setting up the adaptive PCFICH. For example, the eNB may decide to skip a set of RBs from the resources to be used for the control information based on measurements performed in the eNB and/or measurements reported by the WTRUs for a supplementary cell in the downlink. The eNB may inform WTRUs that a set of RBs are skipped from the control space. For example, the eNB may inform the WTRUs in a connected mode configured to operate over the supplementary cell and/or through RRC dedicated signaling (e.g., multicast or unicast). A WTRU joining a supplementary cell that was already operating using a reduced set of RBs for control space may be informed during the RRC reconfiguration procedure. The PCFICH may be sent over the reduced set of RBs, which may exclude the skipped RBs. An activation time reference may be used, where the WTRUs are informed of the skipped RBs as well as when the next PCFICH resource mapping will begin to be transmitted. During a transition period, PCFICH may be sent over the skipped RBs.

For the adaptive PHICH, PHICH information (e.g., ack/nack uplink feedback) may be sent over one or more PHICH groups. A PHICH group may be sent over scrambled channels and/or mapped over RE groups. For example, a PHICH group may be sent over twelve scrambled symbols and/or mapped over three RE groups. Each PHICH group may be mapped to one or more RE groups (e.g., three RE groups). The RE groups which comprise a PHICH group may be equally separated across the downlink cell bandwidth. For example, if a PHICH group is mapped to three RE groups, each group may be separated by approximately one-third of the downlink cell bandwidth. In the presence of a narrowband interferer, the system may be configured to skip a set of RBs and/or remap the resource allocated to a PHICH group such that a good frequency separation may be maintained while avoiding the RBs in presence of an interferer or exceeding a predetermined threshold of interference.

The value $n_{l'_i}$ may be the number of RE groups not assigned to PCFICH in an OFDM symbol which may not be a part of the discarded RBs. The value $n_{l'_i}$ may be used in the following equation, which may set the frequency-domain of the RE groups. Symbol-quadruplet $z^{(p)}(i)$ from PHICH mapping unit m' may be mapped to the RE group represented by $(k',l')_i$, as defined in the 3GPP specification for example, where the time-domain index $l'_i$ may be given by:

$$l'_i = \begin{cases} 0 & \text{normal } PHICH \text{ duration, each subframe} \\ \left(\left\lfloor\frac{m'}{2}\right\rfloor + i + 1\right)\mod 2 & \text{extended } PHICH \text{ duration, } MBSFN \text{ subframes} \\ \left(\left\lfloor\frac{m'}{2}\right\rfloor + i + 1\right)\mod 2 & \text{extended } PHICH \text{ duration, subframe 1 and 6 in frame structure type 2} \\ i & \text{otherwise} \end{cases};$$

and/or the frequency-domain index $k'_i$ may be set to the RE group assigned the number $\bar{n}_i$ as described herein, where $\bar{n}_i$ may be given by:

$$\bar{n}_i = \begin{cases} \left(\left\lfloor N_{ID}^{cell} \cdot \frac{n_{l'_i}}{n_1}\right\rfloor + m'\right)\mod n_{l'_i} & i=0 \\ \left(\left\lfloor N_{ID}^{cell} \cdot \frac{n_{l'_i}}{n_1}\right\rfloor + m' + \lfloor n_{l'_i}/3 \rfloor\right)\mod n_{l'_i} & i=1 \\ \left(\left\lfloor N_{ID}^{cell} \cdot \frac{n_{l'_i}}{n_1}\right\rfloor + m' + \lfloor 2n_{l'_i}/3 \rfloor\right)\mod n_{l'_i} & i=2 \end{cases}$$

As described herein, the impacted RBs may be skipped and/or the assignment of an impacted RB may be shifted by the number of impacted RBs. For example, if a given PHICH group is assigned to RB3, RB11, and RB19, and a network device (e.g., eNB) has decided to avoid RB11 and RB12 due to interference, the resource allocation may be changed to RB3, RB13 (e.g. original allocation+number of impacted RBs), and RB19. The WTRU may be informed of the PHICH mapping and/or may be configured according to the PHICH mapping in the same, or similar, way as described herein for the PCFICH.

For the mapping of the adaptive PDCCH, if the RE (k',l') represents an RE group and the RE group is not assigned to PCFICH or PHICH and not part of the discarded RBs, the symbol-quadruplet $\bar{w}^{(p)}(m')$ may be mapped to the resource-element group represented by (k',l') for each antenna port and/or m' may be increased by 1, otherwise l' may be increased by 1. The informing and/or configuring the WTRU of the PDCCH mapping may be performed in the same, or similar, manner as for PCFICH as described herein.

A reduced bandwidth control space may be used for a control space (e.g., 1.4 MHz, 3 Mhz, 5 MHz, etc.) that may be smaller than or equal to the bandwidth used for the supplementary cell. The reduced bandwidth allocation used by the control information may be shifted in frequency anywhere in the channel. The processing for the control channel in a reduced bandwidth allocation may be similar, or identical, to the control channel processing defined for the full bandwidth. A WTRU may be capable of decoding a control channel based on one or more bandwidths, and/or may operate on a supplementary cell as described herein.

Figure 8:
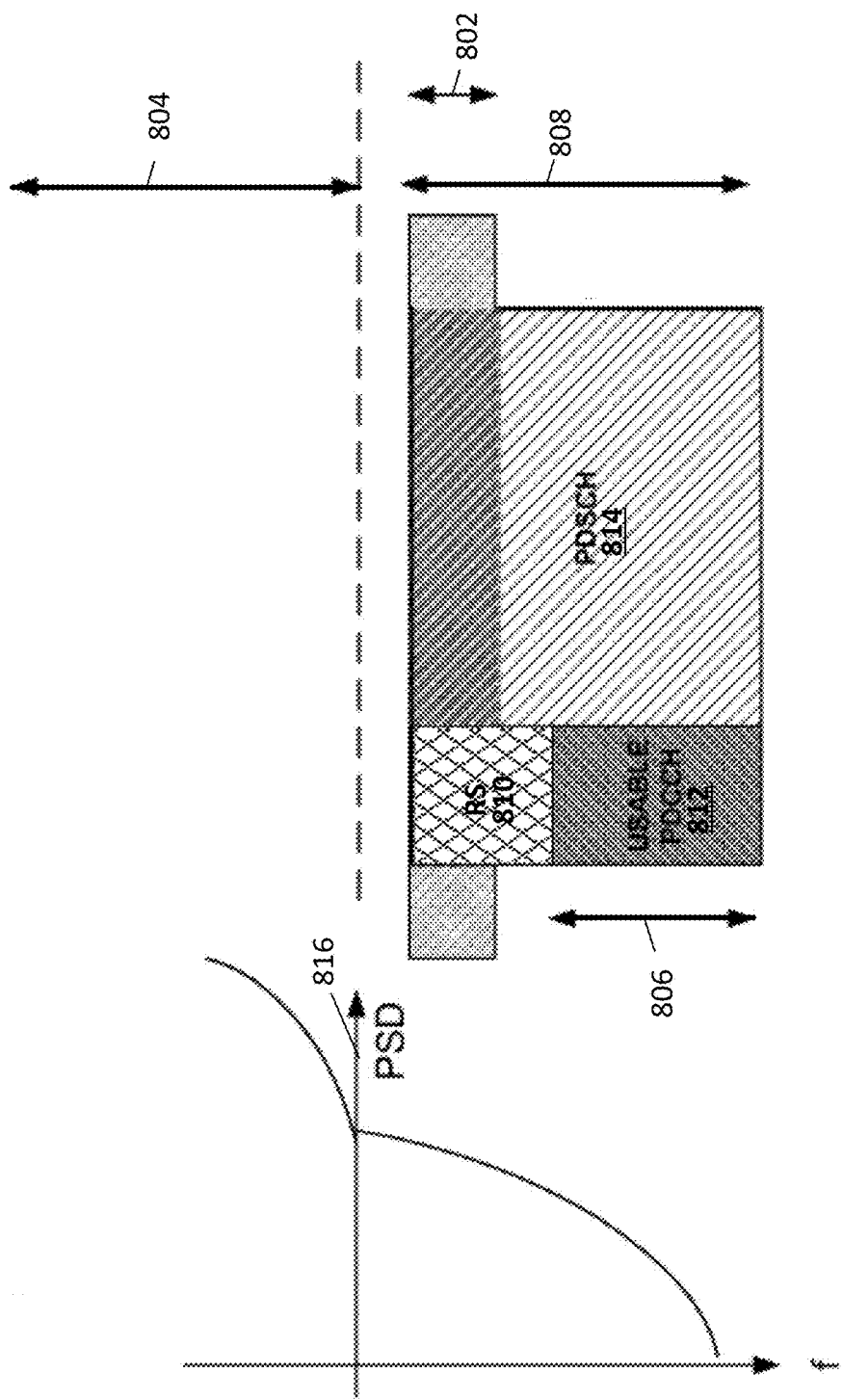
FIG. 8 is a diagram illustrating an example of a reduced bandwidth control space.

FIG. 8 illustrates an example of a reduced bandwidth control space (e.g., an LTE bandwidth control space). As shown in FIG. 8, wireless communications may be performed using a carrier frequency 808 (e.g., 5 MHz carrier frequency). For example, the carrier frequency 808 may be used by a supplementary cell of an eNB to transmit data to a WTRU. The carrier 808 may include a reference symbol (RS) information portion 810, usable PDCCH information portion 812, and/or PDSCH information portion 814. Adjacent channel interference 802 may be received from a nearby channel 804 (e.g., on the other side of the power spectral density (PSD) 816), which may be a TV broadcast for example, and may interfere with the information transmitted on the carrier 808. The interference 802 may make a certain range of frequencies closest to this adjacent channel 804 unusable by the supplementary cell's control channel 806 (e.g., 3 MHz control channel). The eNB may be made aware of the presence of interference 802 from the adjacent channel 804 (e.g., through sensing performed by the eNB or WTRUs in the network, through information provided to the eNB from a geo-location database that is aware of the location and/or power of the TV broadcast relative to the eNB, etc.). Measurements made by the eNB may be used to determine the presence of interference 802 in a particular portion of the bandwidth. The detected interference 802 may be the interference determined to be above a predetermined threshold or strength and/or may cause a portion of the bandwidth to be unusable. Based on the interference information received by the eNB (e.g., from the sensing, measurements, or the geo-location database), a bandwidth and/or location may be selected for the control channel that may avoid the detected interference 802. The bandwidth may be selected from a set of allowed bandwidths (e.g., LTE or other wireless communications bandwidths, which may include 1.4 MHz, 3 MHz, 5 MHz, 10 MHz, 15 MHz, or 20 MHz bandwidths) so that it may effectively avoid the interference 802. For example, the supplementary cell may utilize a 5 MHz carrier 808 and the reduced control space for the control channel 806 may use 3 MHz to avoid the interference 802. If the interference 802 is determined to be greater, the control channel 806 may use a 1.4 MHz control channel, for example. The reduced control channel 806 may be placed anywhere within the frequency 808, which may allow the avoidance narrowband interference and/or adjacent interference that may be present at any location within the channel.

The full bandwidth for frequency 808 may be used to transmit PDSCH information 814 or other data channel information. For example, for the 5 MHz carrier 808 with a 3 MHz control channel 806, the eNB may continue to use the 5 MHz to transmit PDSCH to the WTRUs it is serving. The PDSCH may use adaptive MCS, HARQ retransmissions, and/or selection of resource blocks by the eNB to ensure that the strong adjacent interference may not affect the data area. Depending on the location of the WTRU to which the eNB may communicate relative to the adjacent channel 804, some resource blocks within the PDSCH 814 that may be affected by the interferer may be more suitable for use by one WTRU compared to another WTRU. For these reasons, the PDSCH area may use the full bandwidth for carrier 808.

As described herein, the control channel 806 bandwidth may occupy a portion (e.g., 3 MHz) of the full frequency 808 bandwidth (e.g., 5 MHz). Symbols that are unoccupied by the control channel 806 (e.g., within the first 3 OFDM symbols for a 3-symbol control channel configuration) may be transmitted by the eNB with zero power. The eNB may continue to transmit RSs 810 in the unoccupied bandwidth, as shown in FIG. 8 (e.g., the area marked as RS 810 represents the unoccupied bandwidth where RSs may be transmitted by the eNB). These RSs 810 may be used to allow the WTRU to continue to perform measurements in the band affected by the interferer to determine whether the interference 802 condition changes. Under a change of the interference 802 (e.g., a TV broadcast in the adjacent channel 804 stops transmission, or a narrowband wireless microphone in the channel used by the supplementary cell no longer exists), the eNB may adaptively change the control channel 806 bandwidth to adjust to this change in the interference 802.

Figure 9:
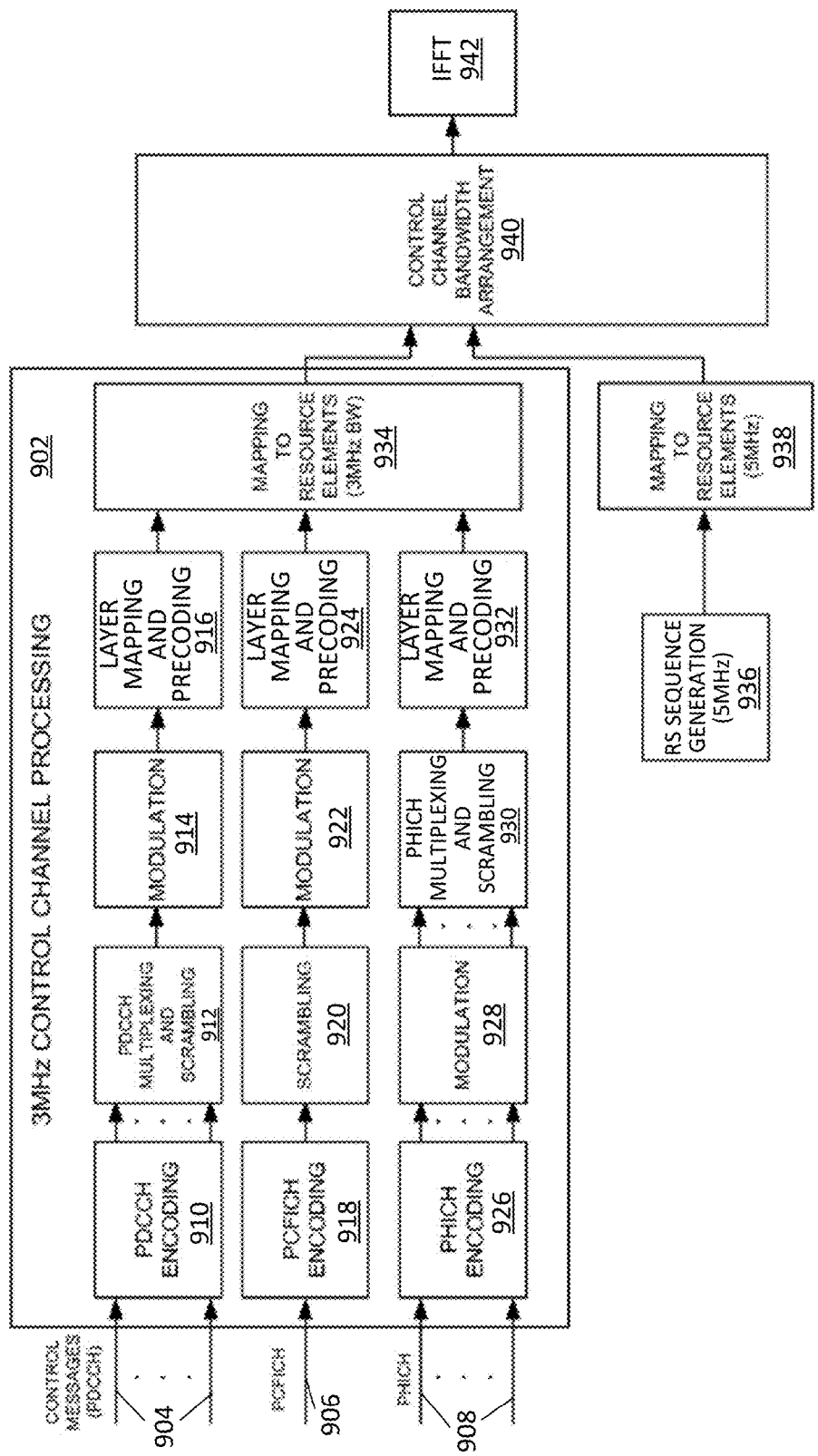
FIG. 9 shows an example of processing control information at an entity capable of processing control information under a reduced bandwidth control channel.

FIG. 9 shows an example of processing control information at an eNB or other entity capable of processing control information under the reduced bandwidth control channel. While the example illustrated in FIG. 9 shows a reduced bandwidth control channel of 3 MHz and/or a full bandwidth of 5 MHz, similar processing may be performed for other reduced bandwidth control channels and/or bandwidths. Additionally, while the example illustrated in FIG. 9 may include a number of modules for processing control information, the processing may be performed using any number of modules and the functionality of the modules may be performed in any order.

As shown in FIG. 9, the control channel processing entity 902 may include one or more processors capable of performing the control channel processing described herein. The control channel processing entity 902 may implement the functionality of one or more of the modules described herein. For example, the control channel processing entity 902 may use a PDCCH encoding module 910 to receive and encode PDCCH control messages 904. After encoding the PDCCH control messages 904, the PDCCH encoding module 910 may send the encoded messages to the PDCCH multiplexing and scrambling module 912, which may multiplex and/or scramble the received information and send the output to the PDCCH modulation module 914. The modulated PDCCH information may be sent to the PDCCH layer mapping and pre-coding module 916 for mapping and pre-coding. The PDCCH information may be mapped to the REs at the reduced bandwidth (e.g., 3 MHz) by the RE control information mapping module 934.

The PCFICH control messages 906 may be received by PCFICH encoding module 918. After encoding the PCFICH control messages 906, the PCFICH encoding module 918 may send the encoded messages to the PCFICH scrambling module 920, which may scramble the received information and send the output to the PCFICH modulation module 922. The modulated PCFICH information may be sent to the PCFICH layer mapping and pre-coding module 924 for mapping and pre-coding. The PCFICH information may be mapped to the REs at the reduced bandwidth (e.g., 3 MHz) by the RE control information mapping module 934.

The PHICH control messages 908 may be received by PHICH encoding module 926. After encoding the PHICH control messages 908, the PHICH encoding module 926 may send the encoded messages to the PHICH modulation module 928 for modulation. The modulated PHICH information may be sent to the PHICH multiplexing and scrambling module 930, which may multiplex and/or scramble the received information and send the PHICH information to the PHICH layer mapping and pre-coding module 932 for mapping and/or pre-coding. The PHICH control information may be mapped to the REs at the reduced bandwidth (e.g., 3 MHz) by the RE control information mapping module 934.

As shown in FIG. 9, the control channel (e.g., PDCCH, PHICH, and PCFICH) processing, which may include the mapping to REs, may be performed based on a 3 MHz bandwidth. The RS sequence generation (e.g., for the control channel and/or the PDSCH space) and mapping may be performed based on the full bandwidth (e.g., a 5 MHz band). For example, the RS sequence generation module 936 and/or the RS RE mapping module 938 may be implemented for generating and/or mapping the RS information at the larger bandwidth (e.g., 5 MHz). This may be because the RS sequence generation 936 may be applied on the RB, rather than just the control channel. As described herein, the RS sequence generation and/or RS RE mapping may allow for a WTRU to measure the RS signal power within the unused control channel bandwidth. The control channel bandwidth arrangement module 940 may place the REs of the control channel (e.g., 3 MHz control channel) within the effective OFDM symbols (e.g., 5 MHz OFDM) available for transmission by the eNB for each control channel symbol. The control channel bandwidth arrangement module 940 may incorporate the RSs in the control channel and/or zero out the unused REs prior to the Inverse Fast Fourier Transform (IFFT) module 942 (e.g., 512 point IFFT) that may be applied to the OFDM symbols.

FIGS. 10A-10C illustrate example embodiments for the placement and/or location of a reduced control channel for a supplementary cell. FIGS. 10A-10C show carriers 1002, 1004, 1020, 1022, 1032, and 1034, which each include 25 RBs. The RBs for each of carriers 1002, 1004, 1020, 1022, 1032, and 1034 are organized according to time on the x-axis and frequency on the y-axis. A portion of each RB for carriers 1002, 1004, 1020, 1022, 1032, and 1034 may include the control channel 1014 (e.g., PDCCH, PHICH, and/or PCFICH) and/or reference symbols 1016, while the rest of the RB may include the downlink (e.g., PDSCH) information 1018. The embodiments shown in FIG. 10, although not exhaustively covering all potential locations for the control channel, may include examples for dealing with channel interference, such as interference from an adjacent channel interferer and/or in-channel narrowband interference, for example.

FIG. 10A illustrates an example for the placement and/or location of the control channel 1014 using RBs 1006 and 1008 of supplementary cell carriers 1002 and 1004, respectively. The supplementary cell carriers 1002 and 1004 may include the control channel 1014 at higher frequencies to avoid interference, or stronger interference, at lower frequencies. For example, the eNB may determine that the interference, or a stronger interference, may occur at lower frequencies and/or may transmit the control channel 1014 via the RBs 1006 and/or 1008 at the higher frequencies. The control channel 1014 in carriers 1002 and 1004 may begin at the RB having the highest frequency to occupy the upper-most portion of the carriers 1002 and 1004. The RBs 1010 and 1012 for carriers 1002 and 1004, respectively, may not include the control channel 1014, but may include the reference symbols 1016. Each of the RBs for carriers 1002 and 1004 may include the downlink (e.g., PDSCH) information 1018.

The control channel 1014 for supplementary cell carrier 1004 may be smaller (e.g., occupy less RBs and/or bandwidth) than the control channel 1014 for the supplementary cell carrier 1002, for example, to avoid a larger amount, or different location, of interference. For example, the RBs 1006 may correspond to a 3 MHz control channel 1014 and RBs 1008 may correspond to a 1.4 MHz control channel 1014 for 5 MHz supplementary cell carriers 1002 and 1004, respectively. While the RBs 1008 may include a reduced bandwidth for the control channel 1014 than RBs 1006, the RBs 1008 may include the same amount of control information as the RBs 1006. Similarly, while the RBs 1006 and 1008 may include a reduced bandwidth for the control channel 1014, the RBs 1006 and 1008 may each include the same amount of control information as if the control channel 1014 occupied the full bandwidth for carriers 1002 and 1004, respectively.

FIG. 10B illustrates an example for the placement and/or location of the control channel 1014 using RBs 1024 and 1026 of supplementary cell carriers 1020 and 1022, respectively. The supplementary cell carriers 1020 and 1022 may include the control channel 1014 at lower frequencies to avoid interference, or stronger interference, at higher frequencies. For example, the eNB may determine that the interference, or a stronger interference, may occur at higher frequencies and/or may transmit the control channel 1014 via the RBs 1024 and/or 1026 at the lower frequencies. The control channel 1014 in carriers 1020 and 1022 may begin at the RB having the lowest frequency to occupy the lower-most portion of the carriers 1020 and 1022. The RBs 1028 and 1030 for carriers 1020 and 1022, respectively, may not include the control channel 1014, but may include the reference symbols 1016. Each of the RBs for carriers 1020 and 1022 may include the downlink (e.g., PDSCH) information 1018.

The control channel 1014 for supplementary cell carrier 1022 may be smaller (e.g., occupy less RBs and/or bandwidth) than the control channel 1014 for the supplementary cell carrier 1020, for example, to avoid a larger amount, or different location, of interference. For example, the RBs 1024 may correspond to a 3 MHz control channel 1014 and RBs 1026 may correspond to a 1.4 MHz control channel 1014 for 5 MHz supplementary cell carriers 1020 and 1022, respectively. While the RBs 1026 may include a reduced bandwidth for the control channel 1014 than RBs 1024, the RBs 1026 may include the same amount of control information as the RBs 1024. Similarly, while the RBs 1024 and 1026 may include a reduced bandwidth for the control channel 1014, the RBs 1024 and 1026 may each include the same amount of control information as if the control channel 1014 occupied the full bandwidth for carriers 1020 and 1022, respectively.

FIG. 10C illustrates an example for the placement and/or location of the control channel 1014 using RBs 1036 and 1038 of supplementary cell carriers 1032 and 1034, respectively. The supplementary cell carriers 1032 and 1034 may include the control channel 1014 at middle range frequencies to avoid interference, or stronger interference, at higher and/or lower frequencies. For example, the eNB may determine that the interference, or a stronger interference, may occur at higher and/or lower frequencies. The eNB may transmit the control channel 1014 via the RBs 1036 and/or 1038 at the middle range frequencies. The control channel 1014 in carriers 1032 and 1034 may begin at the RB having a center frequency, such as the center-most frequency for example, to occupy a center portion of the carriers 1032 and 1034, respectively. The RBs 1040 and 1042 for carriers 1032 and 1034, respectively, may not include the control channel 1014, but may include the reference symbols 1016. Each of the RBs for carriers 1032 and 1034 may include the downlink (e.g., PDSCH) information 1018.

The control channel 1014 for supplementary cell carrier 1034 may be smaller (e.g., occupy less RBs and/or bandwidth) than the control channel 1014 for the supplementary cell carrier 1032, for example, to avoid a larger amount, or different location, of interference. For example, the RBs 1036 may correspond to a 3 MHz control channel 1014 and RBs 1038 may correspond to a 1.4 MHz control channel 1014 for 5 MHz supplementary cell carriers 1032 and 1034, respectively. While the RBs 1038 may include a reduced bandwidth for the control channel 1014 than RBs 1036, the RBs 1038 may include the same amount of control information as the for the control channel 1014, the RBs 1036 and 1038 may each include the same amount of control information as if the control channel 1014 occupied the full bandwidth for carriers 1032 and 1034, respectively.

The processing of each of the channels in the control space (e.g., PDCCH, PCFICH, PHICH, and RS) may be performed as shown in FIG. 9. For example, PDCCH, PCFICH, and/or PHICH may be processed by the eNB as though the bandwidth for the carrier is actually the reduced control channel bandwidth (e.g., 1.4 MHz or 3 MHz for a 5 MHz carrier frequency). For the RE mapping, the eNB may map the control channel (e.g., PCFICH, PDCCH and/or PHICH) as described herein.

For PCFICH, $N_{RB}^{CC}$ may be used, as described herein. For example, $N_{RB}^{DL}$ (e.g., the number of resource blocks for the downlink) may be replaced by $N_{RB}^{CC}$ (e.g., the number of resource blocks for the effective control channel). By replacing the number of resource blocks for the downlink channel (e.g., $N_{RB}^{CC}$) with the number of resource blocks of the effective control channel (e.g., $N_{RB}^{CC}$), the number of available resource blocks for control data may be reduced. In an example in which the reduced control channel may be 3 MHz for a 5 MHz carrier frequency, $N_{RB}^{CC}=15$ (e.g., as illustrated by RBs 1006, 1024, and 1036 in FIGS. 10A-10C). In an example in which the reduced control channel may be 1.4 MHz for a 5 MHz carrier frequency, $N_{RB}^{CC}=6$ (e.g., as illustrated by RBs 1008, 1026, and 1038 in FIGS. 10A-10C). When operating with a 5 MHz control channel with no reduced control channel bandwidth, $N_{RB}^{CC}=25$.

For PHICH, $n_l'$ may represent the number of RE groups that may not be assigned to PCFICH and/or that may belong to the reduced control channel bandwidth. RE groups may be numbered from the RE group with the lowest frequency domain index which falls within the reduced bandwidth of the control channel.

For PDCCH, the REs may be mapped by performing one or more of the following steps in any combination and/or order: 1) initialize m'=0 (RE group number); 2) initializing k'=$k_s$, where k' is in unit of subcarriers and $k_s$ is the number of removed subcarriers in the lower portion of the channel; 3) initialize l'=0; 4) if the RE (k',l') represents an RE group and/or the RE group is not assigned to PCFICH or PHICH, perform steps 5 and 6 below, else go to step 7 below; 5) map symbol-quadruplet $\overline{w}^{(p)}(m')$ to the RE group represented by (k',l') for each antenna port p; 6) increase m' by 1; 7) increase l' by 1; 8) repeat from step 4 above if l'<L, where L may correspond to the number of OFDM symbols used for PDCCH transmission as may be indicated by the sequence transmitted on the PCFICH; 9) If l'≥L, increase k' by 1; 10) repeat from step 3 if k'<$N_{RB}^{CC\_max} \cdot N_{sc}^{RB}$, where the number of removed subcarriers in the upper portion of the channel may correspond to $N_{RB}^{CL} \cdot N_{sc}^{RB} - N_{RB}^{CC\_max} \cdot N_{sc}^{RB}$.

Table 2 below specifies the values of the parameters based on embodiments described herein.

TABLE 2

Parameters for PDCCH Mapping in Reduced Control Channel

| Control Channel | $k_s$ | $N_{RB}^{CC\_max}$ |
|---|---|---|
| 3 MHz Control Channel (Upper Portion of BW) | 12 * 10 = 120 | $N_{RB}^{DL}$ |
| 3 MHz Control Channel (Lower Portion of BW) | 0 | 15 |
| 3 MHz Control Channel (Center Portion of BW) | 12 * 5 = 60 | 20 |
| 1.4 MHz Control Channel (Upper Portion of BW) | 12 * 19 = 228 | $N_{RB}^{DL}$ |
| 1.4 MHz Control Channel (Lower Portion of BW) | 0 | 6 |
| 1.4 MHz Control Channel (Center Portion of BW) | 12 * 9 = 108 | 15 |
| No reduced control channel bandwidth | 0 | $N_{RB}^{DL}$ |

Table 2 shows examples of the $k_s$ and $N_{RB}^{CC\_max}$ when the upper, lower, and middle portion of a bandwidth (e.g., 3 MHz and 1.4 MHz) may be used for the control information. For example, for the upper portion of the bandwidth, the value $k_s$ may be equal to the number of removed subcarriers in the lower part of the bandwidth. Table 2 also shows an example of $k_s$ and $N_{RB}^{CC\_max}$ when the lower portion of a bandwidth (e.g., 3 MHz and 1.4 MHz) may be used for the control information. For example, the value $k_s$ may be equal to zero where $N_{RB}^{CC\_max}$ is lower than $N_{RB}^{DL}$. This may be because some subcarriers may be unusable in the upper portion of the bandwidth. Table 2 further shows examples of the $k_s$ and $N_{RB}^{CC\_max}$ when subcarriers may be removed for control information for the lower portion and the upper portion of the bandwidth (e.g., 3 MHz and 1.4 MHz) used for the data information. When no reduction in the control channel bandwidth is enabled, the full bandwidth (e.g., 5 MHz bandwidth) may be employed for PDCCH and/or the mapping may not change.

Resource elements in the unused area of the PDCCH space (e.g., 5 MHz PDCCH space), except for reference symbols for example, may be transmitted with zero power. As the reduced control space may not impact the reference symbols, the WTRU may continue to decode reference symbols over the full 5 MHz bandwidth. Reference symbol transmission at the eNB and/or decoding at the WTRU may be performed independent of the control channel bandwidth.

The control channel bandwidth and/or placement may be communicated by the eNB to the WTRUs for the WTRUs to be aware of how the procedures described herein may be carried out to properly decode the control channel. The signaling of the control channel bandwidth and/or location may be performed via RRC signaling to each WTRU. The RRC signaling may be sent on the licensed band, such as on a primary or secondary carrier that may be a part of the cells aggregated at a specific WTRU for example. Alternatively, or additionally, this signaling may be performed through system information that may be broadcast to each WTRU on the primary cell. An SIB may be created or used to transmit the control channel location and/or bandwidth information to each WTRU that may use a supplementary cell on which a control channel may reside. Another way to perform the signaling may include transmission of a MAC channel element (CE) to each of the WTRUs with the location and/or bandwidth information. For example, a MAC CE may be defined according to the MAC CE structure described in 3GPP TS 36.321.

In a hierarchical network or HetNets, macro cell power level may dominate the signal originating from an underlay low power cell (e.g., Home Node B), which may make it difficult for the WTRU to decode the control channel from the low power cell. Non-overlapping bandwidth for the control channel may be allocated to the macro cell and/or the underlay power cell using similar embodiments as described herein.

Figure 11:
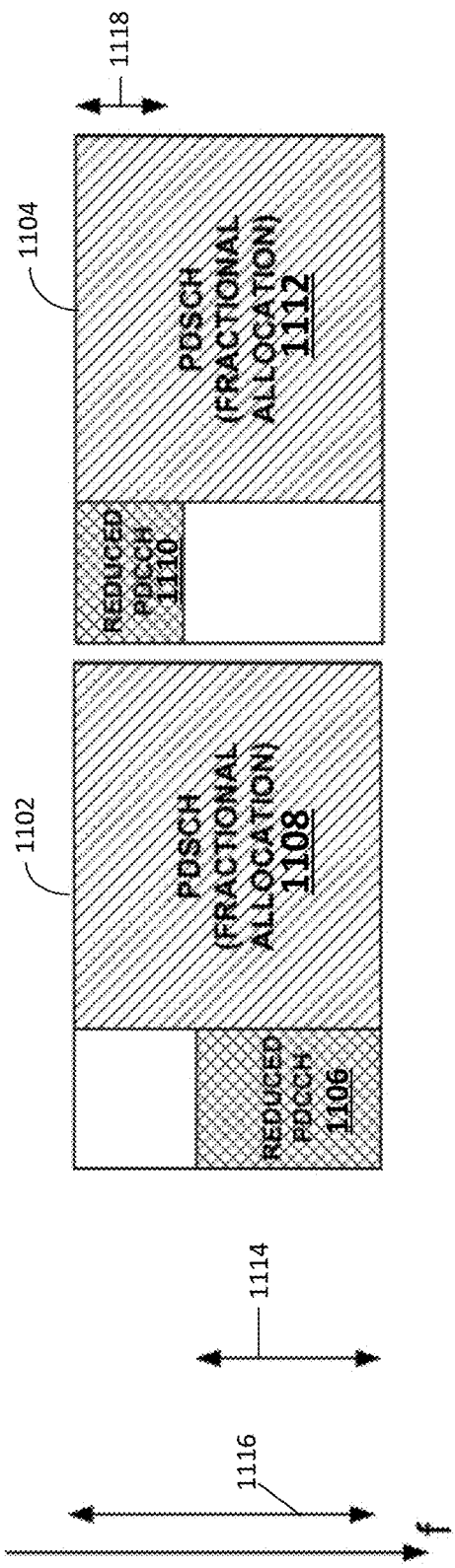
FIG. 11 is a diagram illustrating an example of frequency band usage.

FIG. 11 illustrates an example of a macro cell information 1102 being allocated a reduced bandwidth for the control space that may not overlap with the bandwidth for the control channel of the underlay cell information 1104. As shown in FIG. 11, macro cell information 1102 and/or underlay cell information 1104 may be transmitted on the same frequency carrier 1116. The macro cell information 1102 may be allocated a reduced bandwidth 1114 for the control channel 1106 (e.g., PDCCH) in a different portion of the carrier 1116 as the reduced bandwidth 1118 for the control channel 1110 (e.g., PDCCH) of the underlay low power cell 1110. For example, the reduced bandwidth 1114 may be allocated in the upper portion of the carrier 1116 and the reduced bandwidth 1118 may be allocated in the lower part of the carrier 1116. The reduced bandwidth 1114 for the control channel information 1106 may be the same size or power or different size or power as the reduced bandwidth 1118 for the control channel 1110. For example, where the carrier 1116 is a 5 MHz carrier, the reduced bandwidth 1114 may be 3 MHz and/or the reduced bandwidth 1118 may be 1.4 MHz. The macro cell information 1102 and the underlay cell information 1104 may include downlink information 1108 and 1112 (e.g., PDSCH information), respectively, using the full carrier 1116 (e.g., the full 5 MHz carrier).

Adaptable control bandwidth may be used in a Wi-Fi network, such as a Wi-Fi network operating in a TVWS for example. In a Wi-Fi network, an access point (AP) may transmit a beacon message over a reduced bandwidth when operating in TVWS. The AP and/or stations (STAs) may transmit data packets over the full carrier bandwidth, but the beacon message may be transmitted by the AP using a reduced number of OFDM subcarriers. For example, if the Wi-Fi network operates over a 5 MHz carrier when operating in TVWS, the AP and/or STAs may transmit data packets over the full 5 MHz bandwidth, whereas the beacon message may use a reduced number of OFDM subcarriers to be transmitted by the AP.

The STA, when searching for the beacon, may perform this search over one or several possible bandwidths and/or locations within the full carrier bandwidth (e.g., 5 MHz bandwidth) to search for the beacon on a TVWS channel. For example, the Wi-Fi network may operate using one of a set of predefined modes. Each mode may correspond to a bandwidth and/or location for the subcarriers used to transmit the beacon. During an association procedure, a Wi-Fi STA may scan for the beacon by testing each of the predefined bandwidths and/or locations for the beacon frame. If a CRC check matches on any of the predefined bandwidths, the STA may determine that it has located the beacon and/or may continue to decode the beacon on the located bandwidth and/or location. The AP may signal to associated STAs when a change in the beacon bandwidth and/or location occurs. This signal may be transmitted by using a field in the beacon itself to indicate the bandwidth and/or location information. The AP may signal the time at which the AP will begin to transmit the beacon with the bandwidth and/or location. The reduced bandwidth may be signaled over control information originating from another frequency band (e.g., a beacon that may originate in the ISM band indicating the channel and/or the reduced bandwidth to be used in the TVWS band).

Adjacent channel information from a geo-location database may be used. The use of the adjacent channel information from a geo-location database may be described herein in the context of cellular network (e.g., LTE networks or other 3GPP networks) that may operate in LE bands (e.g., such as a supplementary cell operating in TVWS), but the embodiment described herein may apply to any wireless network (e.g., 3GPP, LTE, Wi-Fi, etc.).

To select the bandwidth and/or location of the control channel for avoidance of interference when operating in the LE bands, one or more entities in a cellular network (e.g., an LTE network) may use knowledge of the presence of the interferer and/or whether the interferer may affect the reliability of transmitting the control channel (e.g., the PDCCH). This information may be determined and/or communicated from the geo-location database that may be responsible for storing the allowable channels that may be used. As described herein, the database may be used to communicate the allowable channels and/or maximum power on which the cellular network may operate. For example, the database may be used to communicate the allowable channels and/or maximum power on which the cellular network may operate in the LE bands and/or the adjacent channel information. Adjacent channel information obtained from the geo-location database may refer to information about the primary user on the channel adjacent to the channel that may be utilized by the cellular network (e.g., LTE network), or adjacent to a channel that the geo-location database has determined to be allowable for transmission by the cellular network (e.g., LTE network). The adjacent channel may be the one whose frequency is immediately adjacent to the currently used channel or currently available channel (e.g., the channel higher in frequency or the channel lower in frequency). The adjacent channel may also, or alternatively, refer to the channel which is near the used or available channel (e.g., two channels above or two channels below the used or available channel). For each available channel, the geo-location database may provide information characterizing the adjacent channel including one or more of the following information fields: an indication of the presence of a primary user on the adjacent channel, the type of primary user (e.g., DTV broadcast, wireless microphone, etc.), and/or the bandwidth it uses; the transmit power of the primary user; the distance of the primary user's transmitter from the cellular network that may use the available channel (e.g., for a cellular network, such as an LTE network for example, that may be allowed to use channel x while a non-cellular channel, such as a DTV broadcast for example, uses channel x+1 or x−1, the adjacent channel information may include the distance between the DTV transmit tower and the eNB); the height of the transmit tower; information about the time in which the adjacent primary user may be active on the adjacent channel; information on the nature of the primary user signal that may be used by the cellular network to avoid and/or cancel interference from the primary user, and/or may be used by the cellular network encoding/modulation/transmission to reduce the effect of interference by the cellular network on the primary user.

The adjacent channel information may be communicated to the cellular network using the geo-location database as described herein. For example, when the geo-location database is used to send the list of available channels to the cellular network, the adjacent channel information may be sent for each of the channels in the list. After the geo-location database is used to send the list of available channels to a cellular network device, the cellular network device may confirm the channel that may be used and/or the adjacent channel information for that channel. The geo-location database may be used to send the channel availability and/or the information about the primary user for each channel in the LE bands or a subset of channels in the LE bands. The cellular network may use that information to extract the adjacent channel information for the channel it may choose to use.

Figure 12:
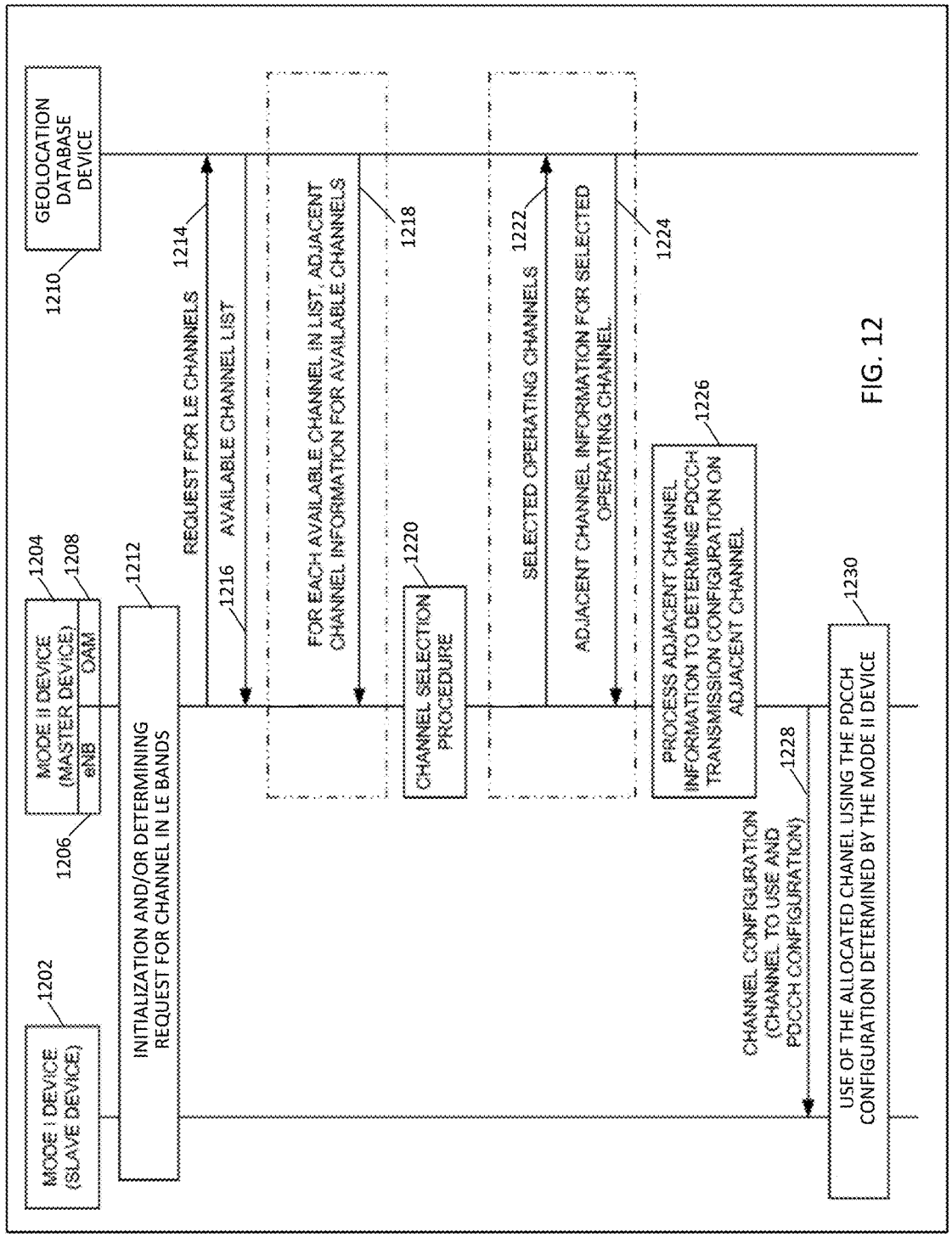
FIG. 12 is a flow diagram illustrating an example for configuring channel information.

FIG. 12 is an information flow illustrating one or more embodiments for implementing a geo-location database. For example, the information flow of FIG. 12 shows an example for sending adjacent channel information and using the geo-location database to send the list of available channels to the cellular network using a geo-location database device 1210. For example, the geo-location database device 1210 may be a server or other device on the non-cellular network. Compared to using the geo-location database to send the channel availability and/or the information about the primary user for each channel in the LE bands, or a subset thereof, the information flow illustrated in FIG. 12 may result in the geo-location database being used to send less overall information to the cellular network (e.g., mode II device 1204).

As shown in FIG. 12, a mode I device 1202 and/or a mode II device 1204 may perform initialization and/or determine a request for a channel in LE bands at 1212. The mode II device 1204 may be a master device and/or the mode I device 1202 may be a slave device that receives channel configuration information from the mode II device 1204. For example, the mode II device 1204 may include an eNB or an AP and/or the mode I device 1202 may include a WTRU. The mode II device 1204 may make a request for allowable channels (e.g., LE channels) and/or adjacent channel information from a geo-location database device 1210 at 1214. At 1216, the geo-location database device 1210 may provide the available channel list to the mode II device 1204. Adjacent channel information may be provided by the geo-location database device 1210 at 1218 for each available channel in the channel list. The mode II device 1204 may perform a channel selection procedure at 1220. At 1222, the mode II device 1204 may send an indication of the selected operating channels to the geo-location database device 1210. The geo-location database device 1210 may send the adjacent channel information for the selected operating channels at 1224. In an example embodiment, the communication at 1218 may be performed in alternative to the communications at 1222 and 1224. The mode II device 1204 may process the adjacent channel information (e.g., the adjacent channel information received at 1218 and/or the adjacent channel information received at 1224) at 1226 to determine the control channel (e.g., PDCCH) transmission configuration on the adjacent channel. The mode II device 1204 may send the channel configuration to the mode I device 1202 at 1228. For example, the channel configuration may include the channel to use and/or the control channel (e.g., PDCCH) configuration. At 1230, the mode I device 1202 and/or the mode II device 1204 may use the allocated channel using the control channel (e.g., PDCCH) configuration determined by the mode II device 1204.

The mode II device 1204 in the information flow of FIG. 12 may be split into an eNB 1206 and a coexistence manager or OAM entity 1208 that may be responsible for assigning channels to the eNB 1206 to ensure protection of the primary user and/or coexistence with other systems. When the mode II device 1204 is split into the eNB 1206 and the coexistence manager or OAM entity 1208, the channel selection procedure at 1220 and/or the processing of adjacent channel information to determine the PDCCH configuration at 1226 may be performed at the eNB 1206, while the OAM/ coexistence manager 1208 may be responsible for further refining the list of available channels from the geo-location database device 1210 to take into account coexistence with other systems and/or networks. The OAM/coexistence manager 1208 may rank the list of channels for the channel selection procedure at 1220 to use some coexistence information to make its decision.

The mode II device 1204 may process the adjacent channel information at 1226 by taking into account the power and/or antenna height of the primary user and/or its distance from the mode II device 1204. The processing at 1226 may be based on the adjacent channel information of the primary user and/or the spectrum mask of the primary user (e.g., which may be known by the primary user type information). The processing at 1226 may include the calculation of the average interference power expected at specific points within the bandwidth where the wireless network (e.g., cellular or non-cellular network) may operate. The processing at 1226 may include comparing the average interference power to a threshold for proper control channel operation. The processing at 1226 may include selecting a control channel bandwidth and/or location so that at least a majority of the control channel may operate in the bandwidth where the interference power may be below a threshold. For example, if the interference power is below the threshold on the full bandwidth of the wireless network (e.g., cellular or non-cellular network), the control channel may not be modified and/or may operate over the same bandwidth as the data channel.

Adjacent channel information may be obtained from sensing. The geo-location database device 1210 may not be equipped to provide adjacent channel information. In this case, the mode II device 1204 may obtain the adjacent channel information on its own to configure a control channel that may avoid primary user interference from an adjacent channel. The mode II device 1204 may use sensing to determine the presence of adjacent channel interference. For example, the mode II device 1204, and/or an entity responsible for sensing that may be co-located with the mode II device 1204, may perform a sensing operation in the adjacent channels to determine the presence of a primary user in these channels. If the adjacent channel indicates the presence of a primary user, the mode II device 1204 may estimate the effect on the currently assigned or usable channel using the spectral mask of the primary user detected (e.g., which may be known by the mode II device 1204). The mode II device 1204, and/or other entity responsible for sensing that may be co-located with the mode II device 1204, may perform a sensing operation at different frequencies on the currently assigned or usable channel itself and/or may determine whether the interference may be stronger at one end of the channel. Based on the interference profile on the channel itself, the mode II device 1204 may make a decision about whether a reduced bandwidth control channel may be used for a control channel (e.g., PDCCH) and/or the resulting bandwidth and/or location of that control channel.

Figure 13:
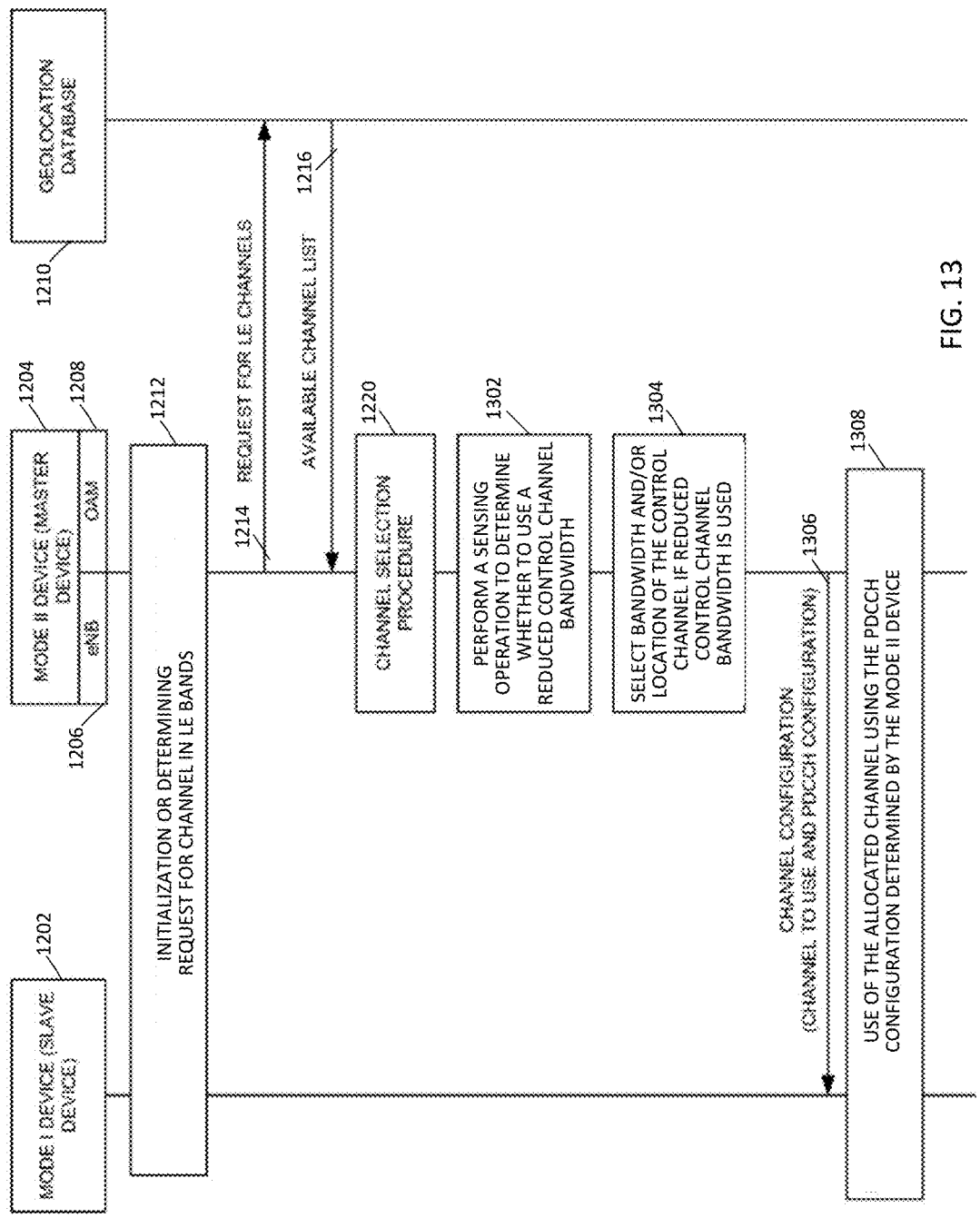
FIG. 13 is a flow diagram illustrating another example for configuring channel information.

The information flow of FIG. 13 shows a channel configuration when adjacent channel information may not be available and/or the mode II device 1204 may rely on sensing to determine the control channel configuration. As shown in FIG. 13, the steps 1212, 1214, and/or 1216 may be performed, as illustrated in FIG. 12 and described herein for example. At 1302, the mode II device 1204 may perform a channel selection procedure based on the available channel list received at 1216. At 1304, the mode II device 1204 may perform a sensing operation to determine whether to use a reduced control channel bandwidth. The mode II device 1204 may select the bandwidth and/or location of the control channel at 1306 if it determines to use a reduced control channel bandwidth. The mode II device 1204 may send the channel configuration to the mode I device 1202 at 1308. For example, the channel configuration may include the channel to use and/or the PDCCH configuration based on the information sensed at 1304. At 1310, the mode I device 1202 and/or the mode II device 1204 may use the allocated channel using the downlink (e.g., PDCCH) configuration determined by the mode II device 1204 based on the sensed information.

When a supplementary cell is used, as described herein for example, the MIB and/or SIB for the supplementary cell may be provided by enhancing the way MIB and/or SIB may be transmitted in a SuppCC so that the control information may be received in the presence of one or more wireless interferers (e.g., narrowband interferers). For example, in a primary cell, the PBCH with MIB information may be located at the central RBs (e.g., central 6 RBs) of a channel. If the MIB uses the same fixed resources for a SuppCC, the presence of narrowband interferer on these sub-carriers may block the transmissions of MIB information.

Figure 21:
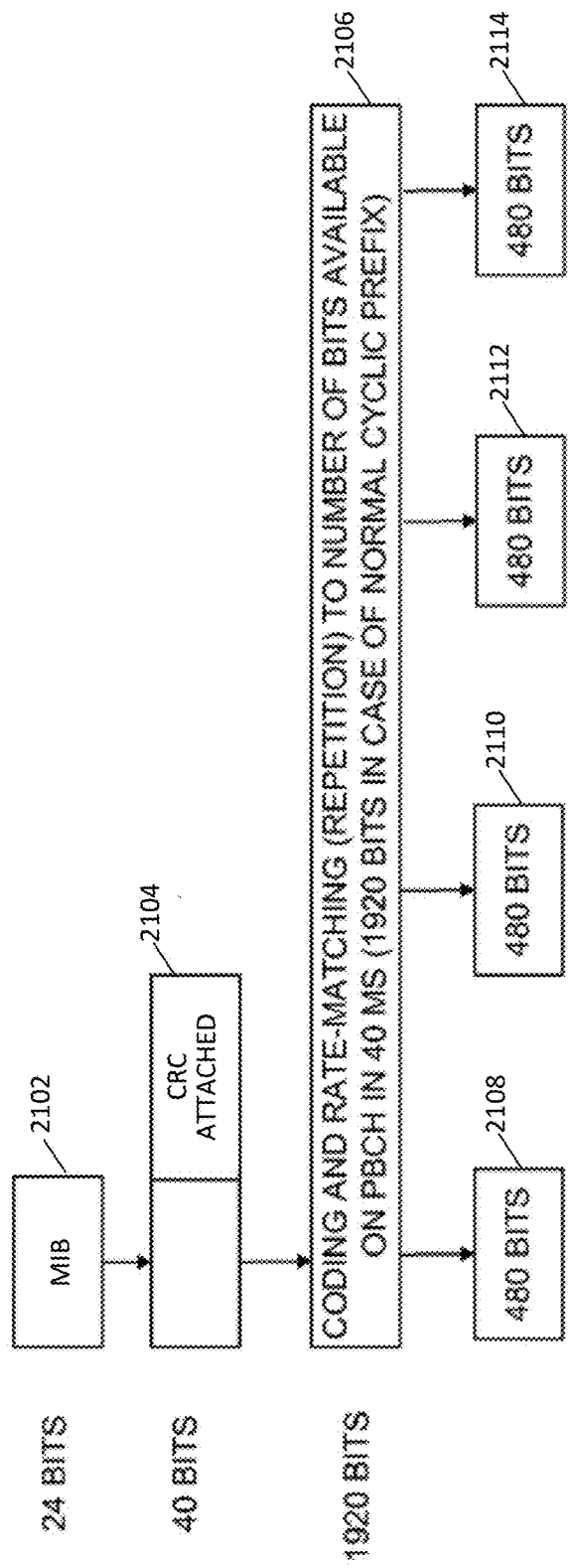
FIG. 21 shows an example procedure for PBCH.

For MIB transmissions over a SuppCC, the MIB signals may be spread over the channel (e.g., a full TVWS channel). The MIB information in a primary cell may be sent over in the first sub-frame of each frame. The MIB information may be updated (e.g., every 40 ms). Consecutive frames may include the same MIB information. Because there may be redundancy or repetition in the MIB encoding process (e.g., as shown in FIG. 21), a WTRU may obtain the MIB information by decoding the PBCH field in each frame. Unlike the primary cell in which the PBCH may be fixed at the central RBs (e.g., central 6 RBs), a SuppCC may have PBCH spread over the band (e.g., the whole band). For example, a TVWS may have 6 MHz bandwidth, and/or a SuppCC may operate over 5 MHz and/or 25 RBs. In the first frame, the PBCH may be located in the first set of 6 RBs. In the second frame, the PBCH may be located in the second set of 6 RBs. In the third frame, the PBCH may be located in the third set of 6 RBs. In the fourth frame, the PBCH may be located in the fourth set of 6 RBs. As described, the PBCH may be spread over the bandwidth. In case a wireless microphone or other narrowband interferer may use certain sub-channels, and/or the surrounding RBs may be blocked, a supplementary cell user may still get the MIB information via other sub-channels.

Spreading, as used in PBCH, may be applied to PCFICH. For supplementary cells, the frequency domain diversity used for the PCFICH may be enhanced. In an example embodiment, the RE groups may be duplicated so that their distribution may be denser over the frequency domain. In an example embodiment, RE groups may be dismissed and/or their component REs separated with certain frequency spacing. These embodiments may be applied to PHICH or PDCCH.

For PCFICH/PDCCH/PHICH, the frequency spacing of the duplicated RE groups (REGs) or the different components of a single REG may be pre-determined or configured dynamically. If the frequency spacing is configured dynamically, the configuration information may be broadcasted over MIBs and/or SIBs.

The embodiments described herein provide robust control channels no matter where the unavailable sub-channels are located. The SuppCC may dynamically set the shift-frequency value with the knowledge of which sub-channels are unavailable. For example, if a sub-channel carrying PCFICH/PDCCH/PHICH may be occupied, such as by a wireless narrowband interferer for example, the SuppCC may set a sub-channel shift value (e.g., shift 6 RBs up or down), and/or broadcast this shift value over MIBs and/or SIBs. A WTRU may decode MIB information at any of the available sub-channels. After decoding the MIB information, the WTRU may know where to retrieve the PCFICH/PDCCH/PHICH if its original location is occupied by the interferer (e.g., wireless microphone).

The MIB fields of a primary cell may include different types of information, such as a downlink cell bandwidth, a PHICH configuration, and/or a system frame number. The channel bandwidth information of the supplementary cell may not be broadcast, as this bandwidth may be fixed and/or may be signaled over the Pcell over the RRC signaling. For example, in the case of a TVWS channel, this bandwidth may be 5 MHz and/or 8 MHz. The SFN information may not be broadcasted on supplementary cell, as the same SFN may be used on the primary cell. As for the PHICH configuration, if it is determined that the supplementary cell may carry the downlink ACK/NACK feedback channel, its configuration information may be carried through dedicated RRC signaling over the primary cell.

Because the contents of SIBs may be signaled over dedicated RRC signaling to connected WTRUs, the supplementary cell may omit the transmissions of SIBs defined for the primary cell. A supplementary cell may have several types of information that may be broadcasted. In an embodiment, information may be broadcast over the supplementary cell that may be used for the operation in LE bands. Resources originally allocated to the MIB and/or the SIBs may be reused.

For the PHICH configuration, as described herein for example, depending on the cell design, the PHICH may be used at the supplementary cell. The PHICH configuration information may be broadcasted over the supplementary cell.

For the cell frequency change information, as the supplementary cell may use the LE band, the supplementary cell may not operate over a fixed frequency allocation. The wireless network (e.g., cellular network) may evacuate an LE channel with the presence of a primary user, and/or the wireless network (e.g., cellular network) may evacuate an LE when the interference level on the channel may be high or above a threshold. To maintain a consistent QoS and/or cell throughput/delay, the wireless network (e.g., cellular network) operating on the LE band may use a back-up channel in advance. If the current wireless channel (e.g., cellular channel) is no longer available or operational, it may switch to the back-up channel. Such channel switch may occur frequently, such as in a number of seconds, for example. To maintain service continuity, a channel switch notice may be broadcast beforehand. Such notice may be broadcast over the supplementary cell. The changed channel frequency and/or other information may be broadcast as well.

As the MIB may not be used on the SuppCC, the control space may be used to broadcast channel change information. Alternatively, or additionally, this information may be broadcast on the primary cell. The broadcast may be performed in several ways. For example, the channel number that the network may switch to may be broadcast. In an example, if there are 30 LE channels, at least 5 bits (e.g., 32 combinations) may be used to encode the channel number. Detecting a broadcast of 00001 may mean that the channel is switching to channel 1. A broadcast of 00010 may indicate channel 2. The broadcasts may continue using similar indications to indicate the channel to which the network may be switched. The combinations that may not be used for the channel number may be used to signal if a channel change may be announced in the next broadcast. For example, 11111 may signal a channel change and/or 00000 may signal no change. Alternatively, or additionally, one or more indicator bits may be used to signify that a channel change may be about to occur. This one or more indicator bits may be added to the indicator bits for indicating the channel to which the switch is being indicated. For example, where the indicator used to signify the change may occur is a single bit, it may be added to the five indicator bits that may be used to indicate the channel to which the change is being performed, for a total of 6 bits.

A bitmap including one bit per channel may encode each of the LE resources. For example, if there are 30 channels, 30 bits may encode the channel information. This may allow more than one channel change to be announced in the same broadcast. For example if the broadcast message is 000000000000000000000000010101, this may mean that the system is using LE channels 1, 3 and 5. If the following broadcast message is 100000000000000000000000000011, this may signal that the system is about to start using channels 1, 2, and 30.

An offset index may be used to signal how many channels over the signal the network may move. For example, if there are 30 LE channels and the network uses channel 15 and wants to move or may be moving to channel 17, it may broadcast 00010 to indicate that it is moving 2 channels over. The pattern may be cyclic (e.g., if the system is using channel 30 it may broadcast 00010 to signal that it is using channel 2). As described above, one or more indicator bits may signify that a channel change may be about to occur.

As poor channel conditions may cause the network to switch channels, redundancy and/or CRC bits may be added to the broadcast to lower the error rate and/or detect errors. This may help to avoid scenarios where a WTRU may switch to an incorrect channel and/or may not know to switch channels. A spreading code may be used to increase the channel diversity and/or increase the probability of successful transmission.

Figure 14:
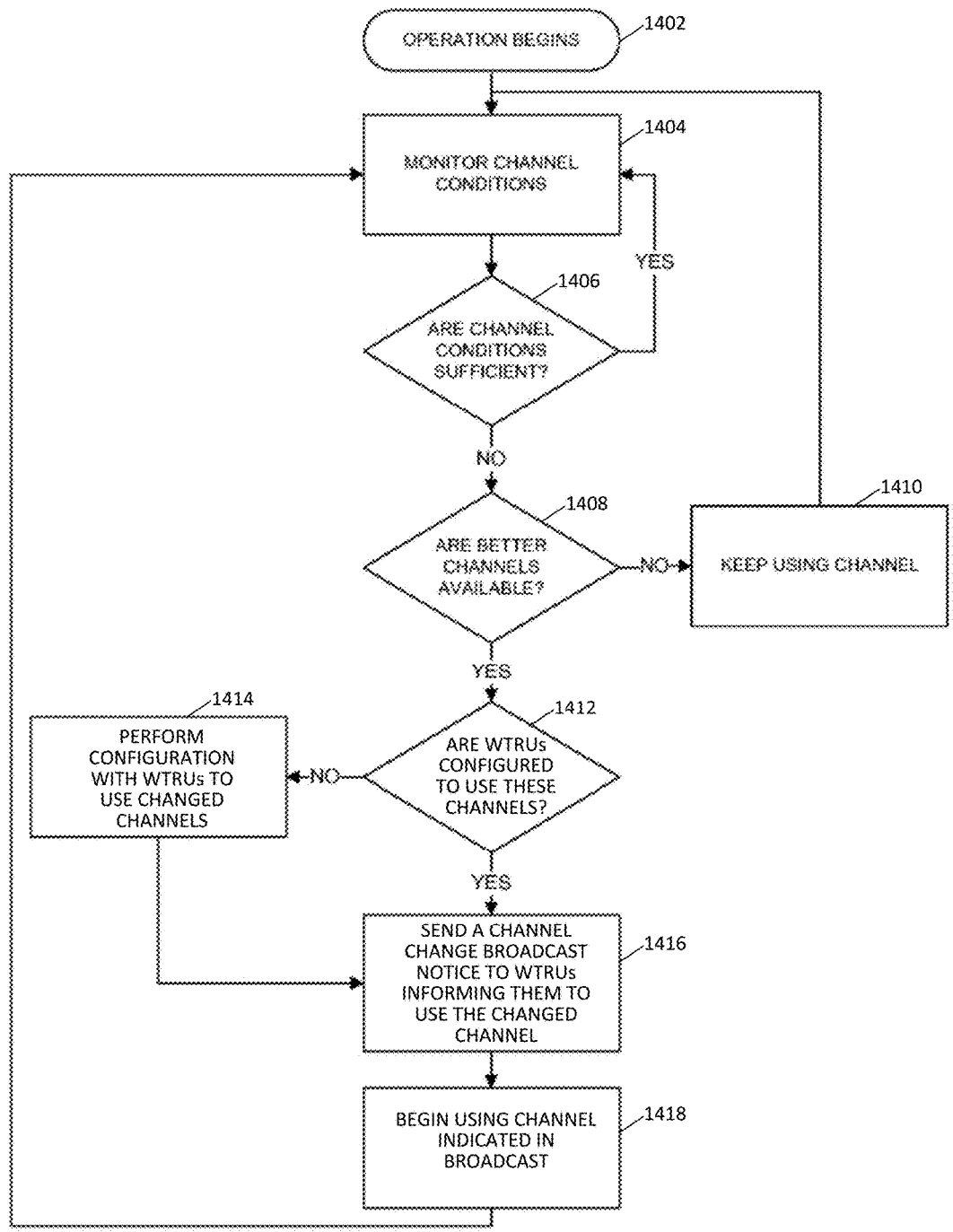
FIG. 14 is a flow diagram illustrating an example for performing a channel change.

Based on a channel change broadcast notice as described herein, a base station (e.g., eNB, HeNB, picoNode, etc.) or AP may use the procedure illustrated in the flow diagram of FIG. 14 when switching channels. The operation illustrated in FIG. 14 begins at 1402. At 1404, the base station or AP may monitor the channel conditions. At 1406, the base station may determine if the channel conditions being used are sufficient. If the channel conditions being used are sufficient, then the base station may continue to monitor the channel conditions at 1404 and/or determine whether the channel conditions are sufficient at 1406. If the channel conditions are determined not to be sufficient at 1406 (e.g., interference is determined above a threshold), the base station may determine if there are better channels available at 1408. If the base station determines at 1408 that there are no better channels available, then the base station may continue using the current channel at 1410 and/or may return to the beginning of the flow illustrated in FIG. 14. If the base station determines at 1408 that there are better channels available, the base station may determine at 1412 whether there are WTRUs configured to use these channels. If the base station determines that WTRUs are not configured to use these channels, the base station may perform configuration with WTRUs at 1414 to use the changed channels and/or send a channel change broadcast notice to WTRUs informing them to use the changed channel at 1416. If the base station determines at 1412 that WTRUs are already configured to use the channels to which it wants to change communications, the base station may send a channel change broadcast notice to the WTRUs informing them to use the changed channel at 1416. The base station may begin using the channel indicated in the broadcast at 1418. The base station may begin monitoring channel conditions for the changed channel at 1404 and/or repeat the operation flow of FIG. 14.

Figure 15:
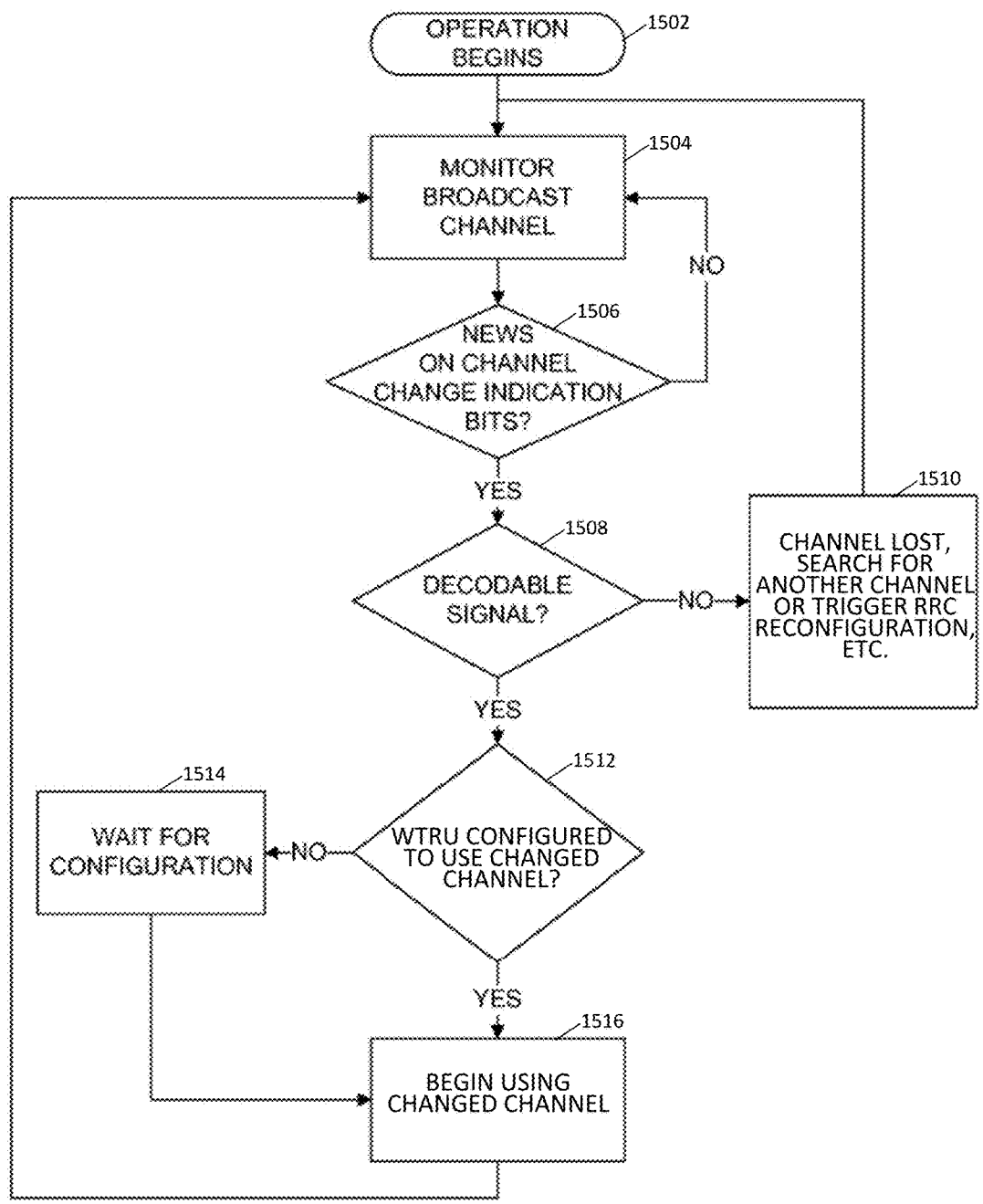
FIG. 15 is a flow diagram illustrating another example for performing a channel change.

Based on a channel change broadcast notice, like the one described herein, a WTRU may use the procedure illustrated in the flow diagram of FIG. 15 for detecting and responding to a channel change. As shown in FIG. 15, the operation may begin at 1502. At 1504, the WTRU may monitor the broadcast channel. The WTRU may determine if there is information on the channel change indication bits at 1506. If not, the WTRU may continue to monitor the broadcast channel at 1504. If there the WTRU does determine that there is information on the channel change indication bits at 1506, the WTRU may determine whether the information on the changed channel signal is decodable at 1508. If the signal is not decodable, the channel may be lost and the WTRU may search for another channel, trigger RRC configuration, and/or the like at 1510. When the channel is lost, the WTRU may begin performing the operation of FIG. 15 at 1504. If the WTRU determines, at 1508, that the signal is decodable, the WTRU determines whether the WTRU is configured to use the changed channel at 1512. When the WTRU is not configured to use the changed channel, it may wait for configuration at 1514 (e.g., configuration with the eNB). When the WTRU is configured to use the changed channel, it may begin using the changed channel at 1516.

Figure 16:
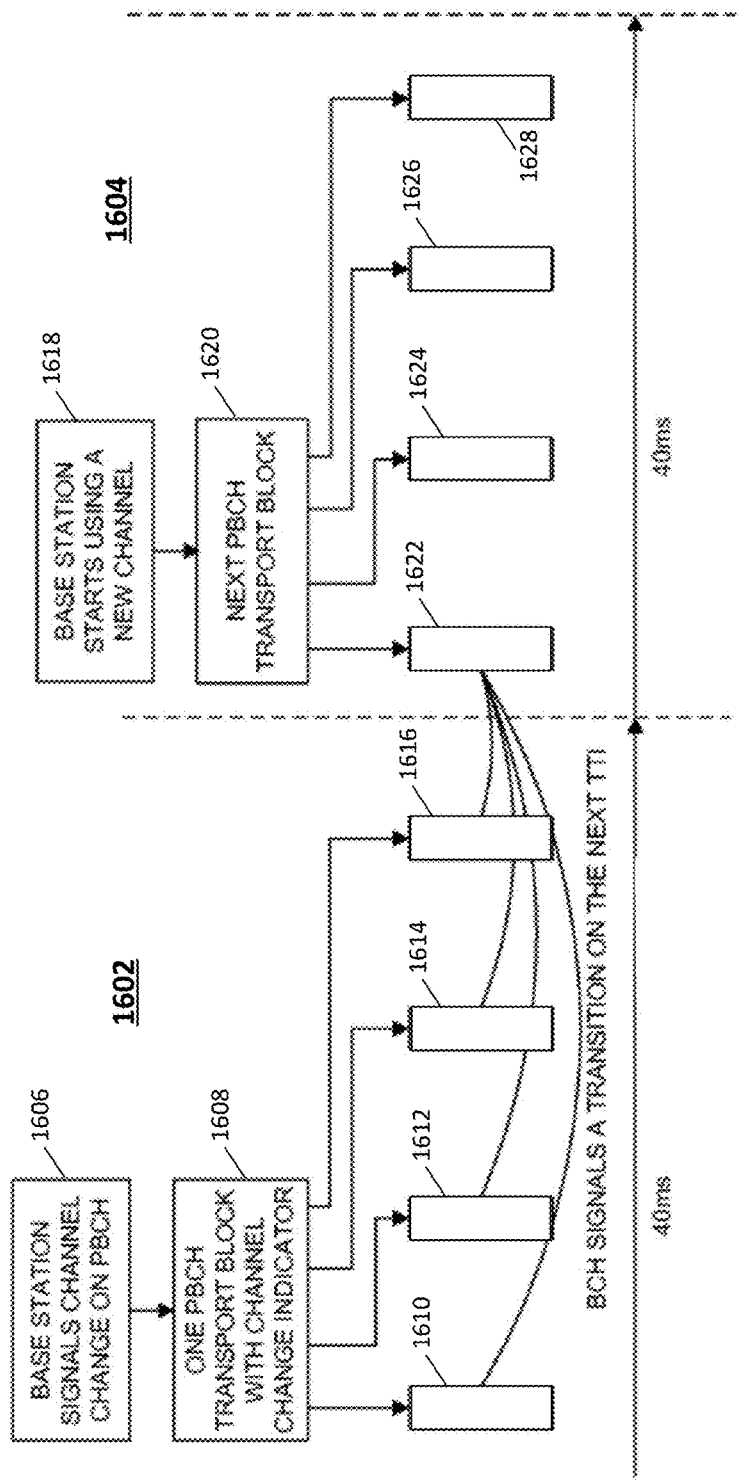
FIG. 16 is a diagram illustrating an example of control channel transition signaling.

In an example embodiment, the base station may wait up to the end of the Transmission Time Interval (TTI) after deciding to switch channels before it may transmit the channel change indication. For example, if the PBCH TTI is 40 ms, the base station may wait up to 40 ms after deciding to switch channels before it may transmit the channel change indication on the PBCH. An example of this transition is shown in the diagram illustrated in FIG. 16. As shown in FIG. 16, an eNB and/or WTRU may be using a SuppCC 1602. At 1606, the base station may signal a channel change on PBCH. The base station may include a channel change indicator in a PBCH at 1608. As illustrated in FIG. 16, each of the MIBs 1610, 1612, 1614, and/or 1616 may include a channel change indicator. The channel change indicator may indicate that the base station may begin using another SuppCC at the end of the 40 ms TTI for the SuppCC on which the base station is currently transmitting. Because each of the MIBs 1610, 1612, 1614, and/or 1616 may include a channel change indicator, when a WTRU decodes any of the MIBs 1610, 1612, 1614, and/or 1616 it may know that the channel may be switched on the next PBCH transport block 1622, which may be the first transport block on the changed SuppCC 1604 for example. The redundancy in including the channel change indicator in multiple MIBs may increase the chances of a WTRU being aware of the channel change to SuppCC 1604. At 1618, the base station may begin using another channel, such as SuppCC 1604 for example. The next PBCH transport block may be determined at 1620 and/or the base station may transmit the MIBs 1622, 1624, 1626, and/or 1628 using the SuppCC 1604.

Figure 17:
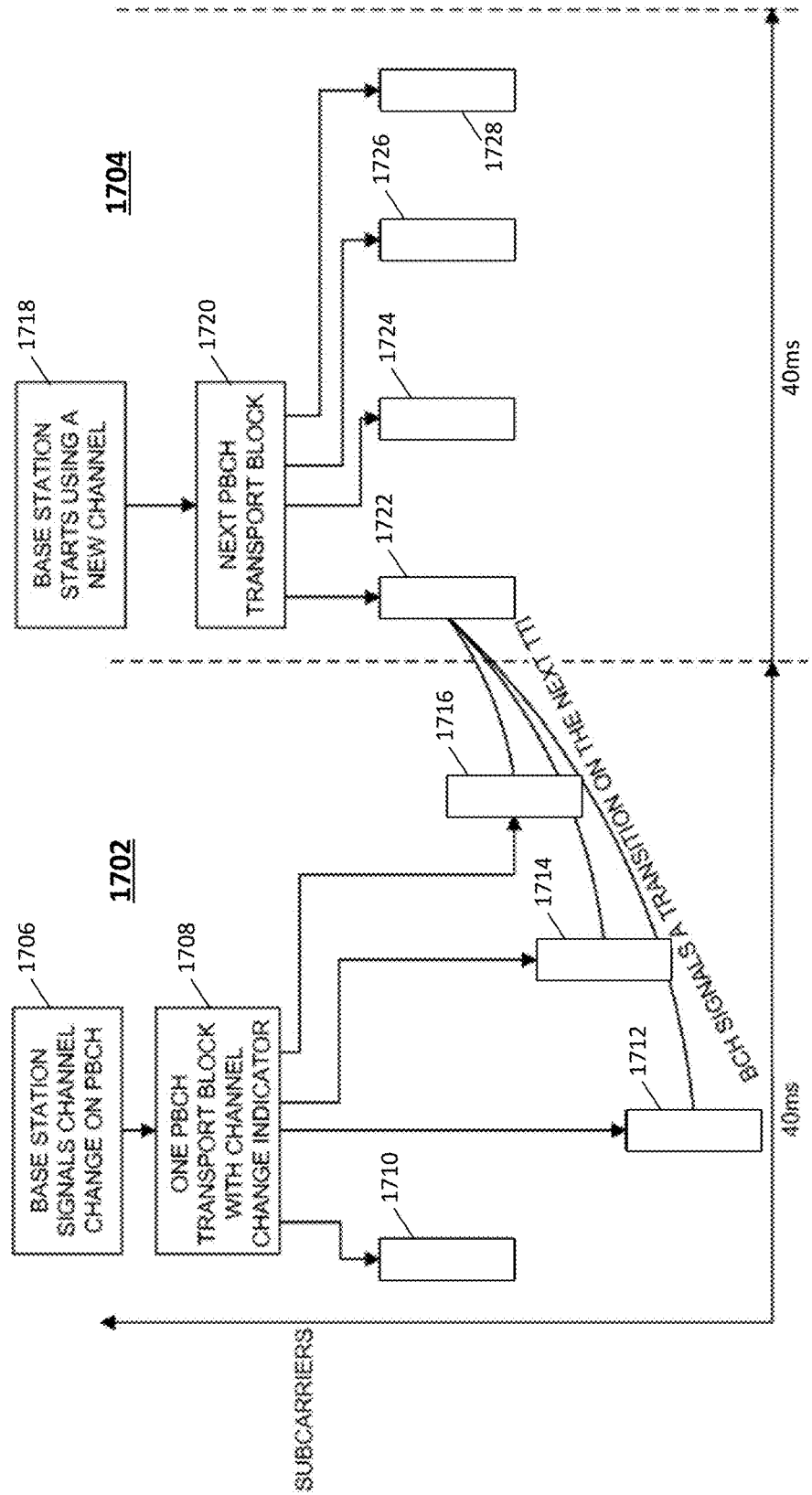
FIG. 17 is a diagram illustrating another example of control channel transition signaling.

Because the bandwidth of the SuppCC may be known to a WTRU through configuration, the PBCH may not stay in the central RBs (e.g., central 6 RBs). To optimize the transition time described above, the example embodiment shown in the diagram illustrated in FIG. 17 may be implemented. The example in FIG. 17 may use an offset to signal when the next channel switch may occur. As shown in FIG. 17, an eNB and/or WTRU may be using a SuppCC 1702. At 1706, the base station may signal a channel change on PBCH. The base station may include a channel change indicator in a PBCH at 1708. The base station may decide to switch channels after the MIB block 1710 has been sent out. As illustrated in FIG. 17, each of the MIBs 1712, 1714, and/or 1716 may include a channel change indicator. The channel change indicator may indicate that the base station may begin using another SuppCC at the end of the TTI for the SuppCC 1702 on which the base station is currently transmitting. The MIBs 1712, 1714, and/or 1716 may indicate the timing of a channel change. For example, the MIBs 1712, 1714, and/or 1716 may be offset by a number of subcarriers to indicate the time until the channel change. For example, using an offset of 18 RBs from the center at MIB 1712 may indicate 30 ms until the channel changes; using an offset of 12 RBs from the center at MIB 1714 may indicate 20 ms until the channel changes; using an offset of 6 RBs from the center at MIB 1716 may indicate 10 ms until the channel changes; and/or the like. In this way the latency of the channel change may be reduced to less than 20 ms, for example. At 1718, the base station may begin using another channel, such as SuppCC 1704 for example. The next PBCH transport block may be determined at 1720 and/or the base station may transmit the MIBs 1722, 1724, 1726, and/or 1728 using the SuppCC 1704.

RLC timer reordering may be implemented, such as in one or more embodiments described herein, for example. In sequence RLC PDUs, or segments of the same RLC SDU, may be scheduled over different component carriers. RLC may not have knowledge of MAC scheduling over different component carriers. The HARQ retransmission time on the primary cell may not be the same as that for the supplementary cell. This HARQ imbalance may be a manifestation of different channel frame structures (e.g., full duplex or dynamic FDD, different TDD configurations) and/or the presence of non-uniform coexistence/measurement gaps. HARQ retransmission delay greater than the allowed reordering timer may affect the RLC receiver entity, depending on the RLC mode. Hence, a t-reordering timer for a Data Radio Bearer (DRB) agnostic to the different CCs on which the DRB may be scheduled may not be an ideal fit.

A different RLC reordering timer may be used for a supplementary cell, and/or an adaptive RLC reordering timer may be set. The adaptive RLC reordering timer may be broadcasted over the supplementary cells. This timer value may be broadcasted to multiple WTRUs simultaneously. Thus, the supplementary cell may force each WTRU aggregating this supplementary cell to use the broadcast absolute value for this CC and/or the supplementary cell may allow WTRUs to use this value as a scaling factor/differential value to be applied to the individual base values configured by the eNB for each WTRU per RB.

The supplementary cell may broadcast absolute adaptive values that may force each WTRU to adopt it for scheduling on this CC. T-reordering may have the following value range: T-reordering::=ENUMERATED {ms0, ms5, ms10, ms15, ms20, ms25, ms30, ms35, ms40, ms45, ms50, ms55, ms60, ms65, ms70, ms75, ms80, ms85, ms90, ms95, ms100, ms110, ms120, ms130, ms140, ms150, ms160, ms170, ms180, ms190, ms200, spare1}. With a total of 31 distinct values, a 5-bit string may be enough for representing t-reordering via index coding. Another implementation may include applying an 8-bit string to represent each of the integer values between 0 and 200. This 8-bit representation may provide an increased resolution (e.g., unit of 1 ms) in the value ranges between 0 and 200 ms, while still retaining 56 additional spare values for future use. Since the receiver RLC may exhibit different behavior depending on the RLC mode (e.g., UM & AM), a value may be specified for UM and/or a value may be specified for AM. Two distinct bit strings may be used to represent the absolute adaptive values for AM and UM. This may double the 5-bit or 8-bit representation to a 10-bit or 16-bit representation, respectively. A value offset may be used for AM from a value specified for UM and/or vice-versa. An indicator bit may be used to specify if the AM value=UM value+/offset/and/or the UM value=AM value+/offset/.

A scaling factor or differential value may be specified to be applied to the base value assigned to the DRB (e.g., via DRB-toAddModList in RRCConnectionReconfiguration). The supplementary cell may have different adaptive values for each of the WTRUs and/or may have different adaptations per DRBs scheduled on the CC. The following equations highlight aspects of this embodiment.

$$\neq \begin{cases} T - \text{reordering value}_{DRB\ 1\ on\ SupplCelly} = [\text{Base Value for } DRB\ 1] + \\ T - \text{adaptation}_{SupplCelly} \\ T - \text{reordering value}_{DRB\ 2\ on\ SupplCelly} = [\text{Base Value for } DRB\ 2] + \\ T - \text{adaptation}_{SupplCelly} \end{cases}$$

Here, the T-adaptation$_{SupplCelly}$ may be broadcast on the supplementary cell. Different differential values/scalar factors may be specified. A differential value/scalar factor may pertain to UM DRBs and/or another differential value/scalar factor may pertain to AM DRBs. As described herein, the value set for t-reordering may be discrete. The offset that may be applied to the base-value may produce a value that may not be in the data set. For this purpose, either value may be provided or the computed value may be tapered to the closest value in the existing range. For example, a computed value of 34 ms may be converted to 35 ms, while a value of 32 ms may be used as 30 ms.

The broadcast may exert greater control by dictating which DRBs may adapt to the broadcast value (e.g., as absolute-option 1 or as differential-option 2). For example, where a maximum of 10 DRBs may be defined at RLC, a 10-bit bitmap may be used for toggling adaptation/DRB, as shown in Table 2.

TABLE 3

| DRB 10 | DRB 9 | DRB 8 | DRB 7 | DRB 6 | DRB 5 | DRB 4 | DRB 3 | DRB 2 | DRB 1 |
| --- | --- | --- | --- | --- | --- | --- | --- | --- | --- |

Using the 10-bit bitmap of table 2, 1001000101 may indicate that the broadcast value applies to DRBs 1, 3, 7 and 10 for a WTRU. Because this additional 10-bit bitmap may not fit in the MIB reuse space, the supplementary cell may broadcast the bitmap as an SIB. To broadcast the bitmap as an SIB, the supplementary cell may include a 1 bit extension field in the MIB to signal its future transmission via SIB. This extension may be used each time some broadcast information may spill over into the SIB due to space constraints.

A supplementary cell may be capable of specifying the adaptation as an absolute value at one instance and/or as a differential at another instance. A 1 bit selector may be used to specify if the value is to be treated as absolute or differential.

The available MIB re-use space may be used to broadcast information other than t-reordering adaption and/or the MIB may allocate a limited space to t-reordering adaptation, which may not be sufficient to carry the adaptation implementations described herein. The MIB may carry an indicator bit signaling a t-reordering change as proceeding in a future SIB transmission. An indicator value of 1 may indicate to wait for the adaptation in the SIBs and/or a value of 0 may mean that no adaptation may be implemented. Since there may be multiple SIBs available for re-use, space may not be as big a constraint on the SIB. The SIB periodicity may be varied based on adaptation timing.

A grace period indicator may be implemented as described herein. The supplementary cell may be used as DL (e.g., DL-only), UL (e.g., UL-only), and/or shared mode in dynamic FDD. The mode switch (e.g., from the DL-only mode to the UL-only mode or from the UL-only mode to the DL-only mode) may be used to accommodate the HARQ processes. For example, the supplementary cell may want to ensure the HARQ buffers are released before performing the switch from the DL mode (e.g., DL-only mode) to the UL mode (e.g., UL-only mode). This may use additional transmissions of the NACK-ed packets. The grace period may be defined for the completeness of HARQ processes.

The enabling and/or disabling of the grace period, and/or the length of the grace period, may be broadcasted over the supplementary cell. The indicator for the grace period may be 1 bit. If the grace period is applied, the length of the grace period may be specified. The grace period may be in the unit of a TTI. The minimum length of the grace period may be 8 ms or 8 TTI, which may follow the HARQ procedure. The maximum length of the grace period may be determined by the number of packets remaining in the HARQ buffer, and/or the maximum number of retransmissions that may be allowed. The maximum length of the grace period may be computed as the multiplication of the HARQ buffer size, the maximum number of allowed retransmissions, and/or the duration of each retransmission. In an example, 7 bits may be used to represent the grace period, which may specify the grace period as large as 128+8=136 ms. A total of an 8-bit grace period specification may be broadcast.

Figure 18:
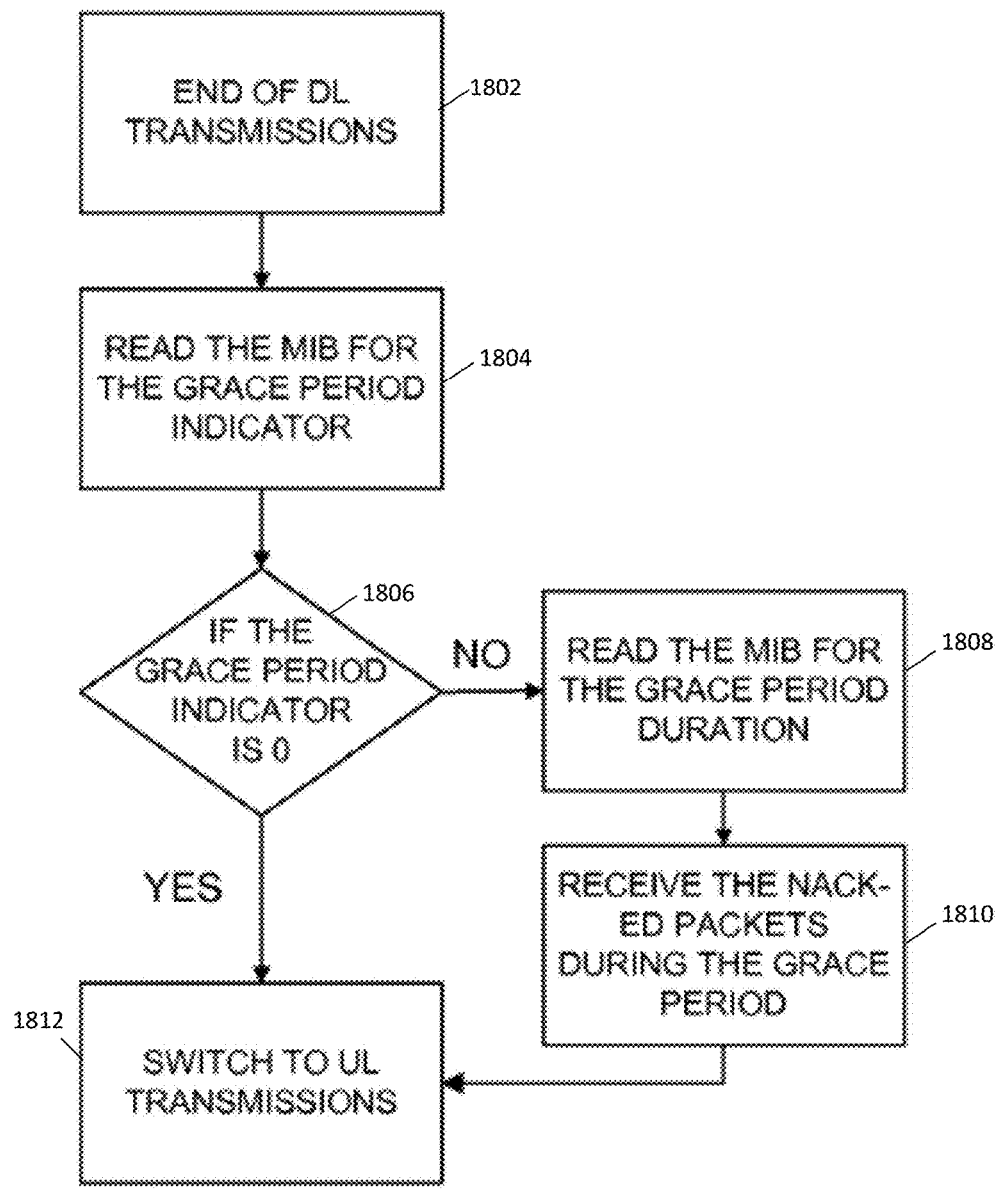
FIG. 18 is a flow diagram illustrating an example for using a grace period for downlink (DL) to uplink (UL) shifts.

FIG. 18 shows an example flow diagram that may be performed by a WTRU during a switch from DL to UL. As shown at 1802, the WTRU may end DL transmissions. At the end of DL transmissions, the WTRU may read the broadcast MIB information for the grace period indicator at 1804. If the WTRU determines the existence of a grace period (e.g., the grace period indicator is not equal to 0) from the indicator at 1806, the WTRU may read the MIB for the grace period duration at 1808. In the grace period duration, the WTRU may get its NACK-ed packets, if any, at 1810. At the end of the grace period (e.g., at the end of the grace period at 1810 or if the grace period indicator is determined to be 0 at 1806), the WTRU may switch to the UL mode at 1812.

To fairly coexist with other wireless networks operating over the LE-band, a wireless network may adapt some lower-level coexistence mechanism. For example, a wireless network may apply a CSMA/CA on the supplementary cell to allow the possible occupation of the LE channel by other wireless networks. The wireless network may not transmit over the supplementary cell for a certain period. Such a silent period may be referred to herein as a coexistence gap. Still, the wireless network may inform its serving WTRUs about the coexistence gap (e.g., the duration of the coexistence gap, the starting time of the coexistence gap, etc.).

The coexistence gap may be broadcast to each WTRU over the supplementary cell. The coexistence gap may be in units of TTI times (e.g., 1 ms). The coexistence gap used for another network to access an LE channel may configured to be long enough. For example, the coexistence gap may be longer than the maximum amount of time a Wi-Fi may use to access the channel. The duration of such coexistence gap may be pre-determined and/or determined dynamically.

Figure 19:
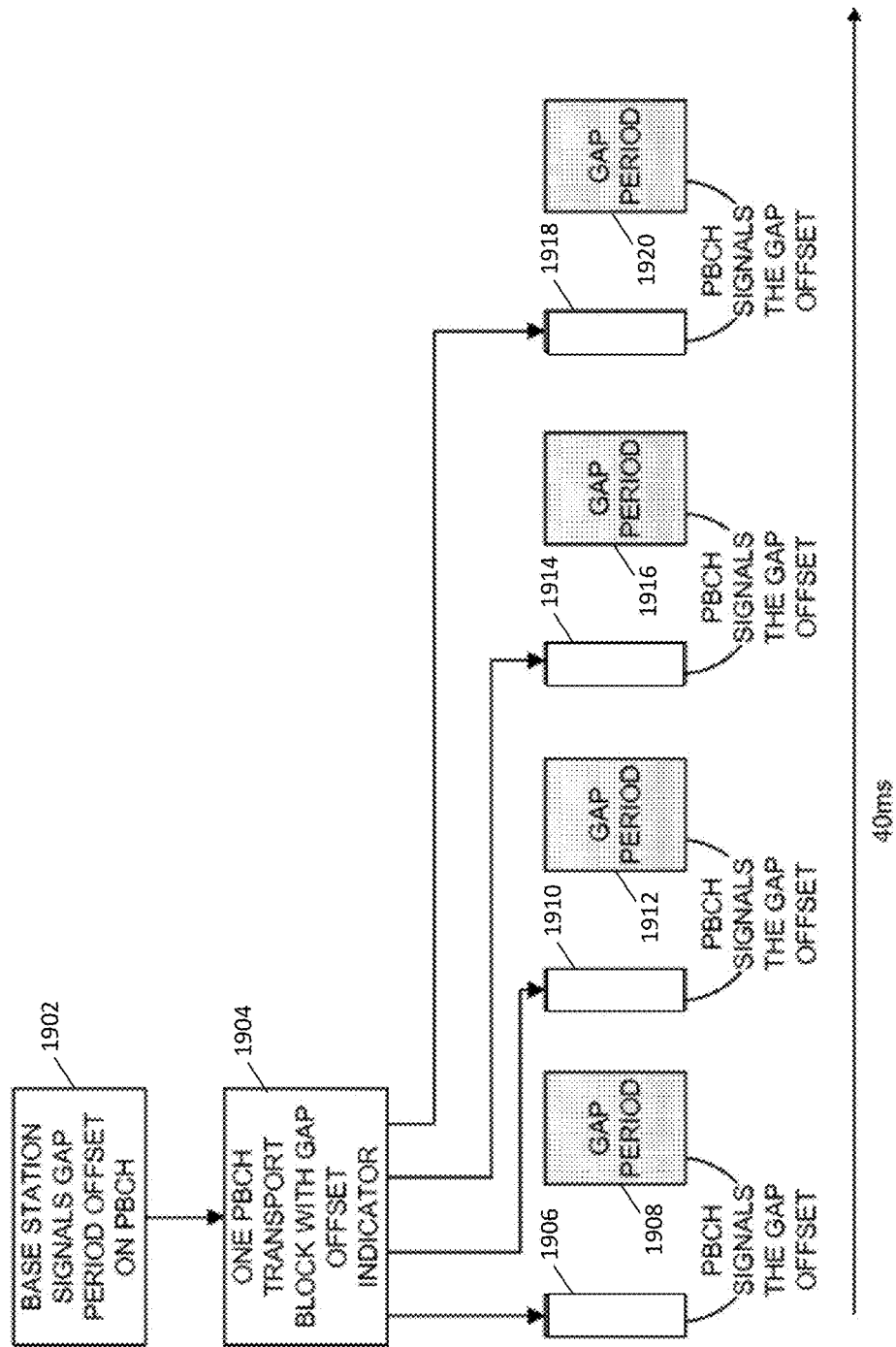
FIG. 19 is a diagram illustrating an example offset indication using the PBCH.

The starting time of the coexistence gap may be at certain locations of a frame. For example, the starting time may be a number of milliseconds after a broadcast channel (e.g., PBCH). The PBCH may include the offset of starting time of the coexistence gap. FIG. 19 is a diagram showing an example offset indication using the PBCH. As shown in FIG. 19, a base station may signal a gap period offset on PBC at 1902. At 1904, each PBCH transport block may be sent with a gap offset indicator. For example, MIBs 1906, 1910, 1914, and/or 1918 may be sent with gap period offset indicators that indicate the coexistence gap periods 1908, 1912, 1916, and/or 1920, respectively. The coexistence gaps 1908, 1912, 1916, and/or 1920 may be periodic. The broadcast channel (e.g., PBCH) may include the periodicity and/or the starting time of the next coexistence gap. For example, the MIBs 1906, 1910, 1914, and 1918 may indicate the periodicity and/or the starting time of the gap periods 1908, 1912, 1916, and 1920, respectively. As shown in FIG. 19, the TTI for the PBCH may include a predetermined time period (e.g., 40 ms), which may include predetermined PBCH blocks or MIBs 1906, 1910, 1914, and 1918. Each offset may be relative to a predetermined PBCH block or MIB in the periodic case. For example, the offset for the gap period 1908 may be relative to the PBCH or MIB 1906. If the coexistence gap is periodic, the periodic delay may include the period between each gap.

Figure 20:
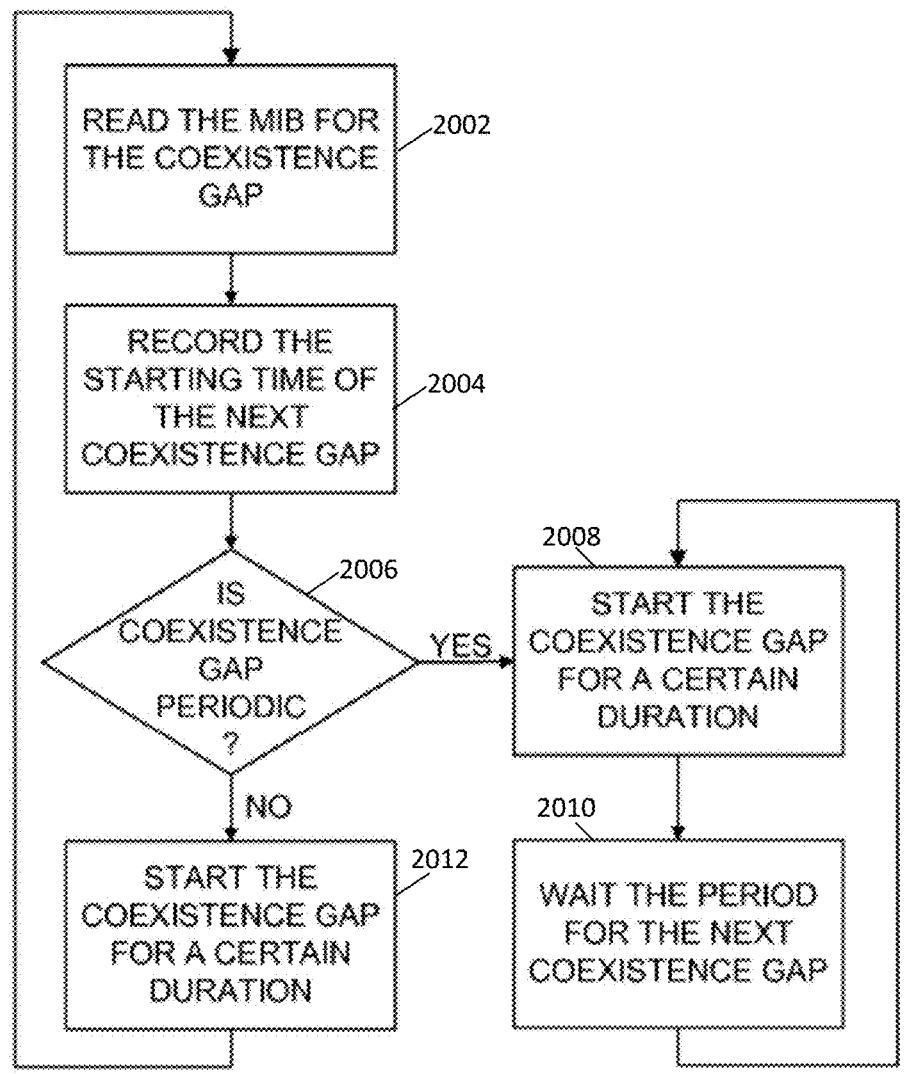
FIG. 20 is a flow diagram illustrating an exemplary procedure that may be implemented for using a coexistence gap grace period.

The one or more bit periodicity indicator, one or more bits of the starting time of the next coexistence gap (e.g., in units of TTI times), and/or one or more bits of the periodicity of the coexistence gaps may be included in the broadcast channel. FIG. 20 shows an exemplary procedure that may be implemented by a WTRU for using the coexistence gap grace period. As shown in FIG. 20, at 2002 a WTRU may read the PBCH block or MIB for the coexistence gap. The PBCH block or MIB may indicate the periodicity, the starting time of the next coexistence gap, and/or the period of the coexistence gap. The WTRU may record the starting time of the next coexistence gap at 2004. At 2006, the WTRU may determine from the periodicity indicator whether the coexistence gap is periodic. If the coexistence gap is not determined to be periodic, the WTRU may begin the coexistence gap for a certain duration (e.g., the duration indicated by the PBCH block or MIB) at 2012 and/or return to 2002 to read the PBCH block or MIB for another coexistence gap. If it is determined at 2006 that the coexistence gap is periodic, the WTRU may begin the coexistence gap for a certain duration (e.g., the duration indicated by the PBCH block or MIB) at 2008 and/or wait the period for the next coexistence gap (e.g., the period indicated by the PBCH block or MIB) at 2010. After the end of the wait period, the WTRU may return to 2008 to begin the coexistence gap for the determined duration.

The coexistence gap may be used for spectrum sensing. This type of coexistence gap may also be called a measure gap. When operating on an LE band, a wireless network may perform the spectrum sensing operations to detect the presence of primary users or other secondary users. The detection may be performed through spectrum sensing at the HeNB or WTRU. Each device within the wireless network may keep silent during the spectrum sensing period to achieve the accurate sensing results. The wireless network may inform its serving WTRUs about the measurement gap (e.g., the duration of the measurement gap, the starting time of the measurement gap, and/or if the measurement gap is periodic or aperiodic).

The MIB fields and/or the SIB fields may be applied to broadcast information over the supplementary cell. Some information (e.g., PHICH configuration information and/or other information) may be put in an MIB. If information may be broadcast periodically, it may be put in SIBs. The scheduling of the SIBs may be part of the MIB field. A type of SIB may be provided for each kind of information described herein.

An example MIB design may include a one or more bit PHICH configuration, a one or more bit backup channel index, a one or more bit RLC timer adaptation indicator, a one or more bit grace period indicator, a one or more bit grace period duration, a one or more bit periodic coexistence gap indicator, and/or a one or more bit coexistence gap starting time. For example, the MIB design may include a 3-bit PHICH configuration, a 5-bit backup channel index, a 1-bit RLC timer adaptation indicator, a 1-bit grace period indicator, a 7-bit grace period duration, a 1-bit periodic coexistence gap indicator, and/or a 6-bit coexistence gap starting time.

FIG. 21 shows an example procedure for PBCH (e.g., in 40 ms). As shown in FIG. 21, the MIB 2102 may be implemented. The MIB 2102 may include 24 information bits, for example. A CRC 2104 may be attached to the MIB 2102. The CRC may include 16 bits, for example, which when appended to the 24 bit MIB 2102 may total 40 bits. At 2106, a coding and/or rate-matching may be performed with repetition to the number of bits available on PBCH in the 40 ms duration. By appending the 16-bit CRC 2104 followed by a rate 1/3 convolutional coder, the number of coded bits may be 120. The coded bits may have repetition, such as 16 times repetition for example, which may result in 1920 bits for the PBCH transmissions for the 40 ms duration. The 1920 bits may be segmented into equal-sized individually self-decodable units, such as the four 480 bit units 2108, 2110, 2112, and 2114 for example. Each of the 480 bit units 2108, 2110, 2112, and 2114 may be transmitted in each 10 ms, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

We claim:

1. A method for processing control information in a wireless network, the method comprising:
    determining a first channel adjacent to a second channel that occupies a same frequency band;
    reducing a bandwidth for control channel information on the first channel to avoid interference from the adjacent second channel, wherein the bandwidth for the control channel information on the first channel is less than a bandwidth for other information transmitted on the first channel;
    determining a location of the reduced bandwidth for the control information on the first channel; and
    transmitting the control information on the first channel using the reduced bandwidth at the determined location.

2. The method of claim 1, wherein the reduced bandwidth is determined based on an indication received from an eNB.

3. The method of claim 1, wherein the adjacent second channel comprises a digital television channel or a radar channel.

4. The method of claim 1, wherein the first channel comprises at least one of a Physical Control Format Indicator Channel (PCFICH), a Physical Hybrid-ARQ Indicator Channel (PHICH), a Physical Downlink Control Channel (PDCCH), or a Physical Broadcast Channel (PBCH).

5. The method of claim 1, further comprising:
    taking measurements to identify the interference from the adjacent second channel; and
    sending the measurements to an eNB.

6. The method of claim 1, wherein determining the reduced bandwidth for receiving the control information on the first channel comprises determining a power and the location for the reduced bandwidth to avoid the interference from the adjacent second channel.

7. The method of claim 6, further comprising shifting the reduced bandwidth for the control information to another location on the first channel to avoid additional interference.

8. The method of claim 1, wherein locating the control information further comprises discarding information associated with a set of consecutive resource blocks closest to the adjacent second channel.

9. The method of claim 1, wherein determining the reduced bandwidth comprises altering a mapping associated with resource elements used for the control information.

10. The method of claim 1, further comprising receiving data on the first channel using a full bandwidth associated with the first channel.

11. The method of claim 1, wherein the first channel comprises a cellular channel, and the second channel comprises a non-cellular channel.

12. A Node B for processing control information in a wireless network, the Node B comprising:
    a transceiver;
    a processor configured to:
        determine a first channel adjacent to a second channel that occupies a same frequency band;
        reduce a bandwidth for control channel information on the first channel to avoid interference from the adjacent second channel, wherein the bandwidth for the control channel information on the first channel is less than a bandwidth for other information transmitted on the first channel;
        determine a location of the reduced bandwidth for the control information on the first channel; and
        transmit the control information on the first channel using the reduced bandwidth at the determined location.

13. The Node B of claim 12, wherein the processor is configured to determine the reduced bandwidth based on an indication received from an eNB.

14. The Node B of claim 12, wherein the adjacent second channel comprises a digital television channel or a radar channel.

15. The Node B of claim 12, wherein the first channel comprises at least one of a Physical Control Format Indicator Channel (PCFICH), a Physical Hybrid-ARQ Indicator Channel (PHICH), a Physical Downlink Control Channel (PDCCH), or a Physical Broadcast Channel (PBCH).

16. The Node B of claim 12, wherein the processor is further configured to:
take measurements to identify the interference from the adjacent second channel; and
send the measurements to an eNB.

17. The Node B of claim 12, wherein the processor being configured to determine the reduced bandwidth comprises the processor being configured to determine a power and the location for the reduced bandwidth to avoid the interference from the adjacent second channel.

18. The Node B of claim 17, wherein the processor is further configured to shift the reduced bandwidth for the control information to another location on the first channel to avoid additional interference.

19. The Node B of claim 12, wherein the processor being configured to locate the control information using the reduced bandwidth comprises the processor being configured to discard information associated with a set of consecutive resource blocks closest to the adjacent second channel.

20. The Node B of claim 12, wherein the processor being configured to determine the reduced bandwidth comprises the processor being configured to alter a mapping associated with resource elements used for the control information.

21. The Node B of claim 12, wherein the processor is configured to receive data on the first channel using a full bandwidth associated with the first channel.

22. The Node B of claim 12, wherein the first channel comprises a cellular channel, and the second channel comprises a non-cellular channel.

23. A wireless transmit/receive unit (WTRU) for processing control information in a wireless network, the WTRU comprising:
a transceiver;
a processor configured to:
receive control channel information via the transceiver on a first channel, the first channel being adjacent to a second channel that occupies a same frequency band, wherein the control channel information is located on the first channel in a location to avoid interference from the adjacent second channel, and a bandwidth of the control channel information is reduced and is less than a bandwidth for other information transmitted on the first channel; and
process the received control channel information.

24. The WTRU of claim 23, wherein the processor being configured to process the received control channel information further comprises the processor being configured to discard information associated with a portion of the bandwidth of the control channel information to avoid the interference of from the second channel.

25. The WTRU of claim 24, wherein the portion of the bandwidth is adjacent to the second channel.

26. The WTRU of claim 23, wherein the processor being configured to process the received control channel information further comprises the processor being configured to locate the control channel information in the received control channel information associated with the bandwidth of the control channel information that is reduced.

27. The WTRU of claim 23, wherein the first channel comprises a cellular channel, and the second channel comprises a non-cellular channel.

* * * * *